(12) United States Patent
Egawa

(10) Patent No.: US 8,885,084 B2
(45) Date of Patent: Nov. 11, 2014

(54) SOLID-STATE IMAGING DEVICE

(75) Inventor: Yoshitaka Egawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 615 days.

(21) Appl. No.: 13/107,255

(22) Filed: May 13, 2011

(65) Prior Publication Data

US 2011/0304757 A1  Dec. 15, 2011

(30) Foreign Application Priority Data

Jun. 10, 2010  (JP) ................................. 2010-133156

(51) Int. Cl.
- *H04N 3/14* (2006.01)
- *H04N 5/335* (2011.01)
- *H04N 5/357* (2011.01)
- *H04N 5/355* (2011.01)
- *H04N 5/374* (2011.01)

(52) U.S. Cl.
CPC ........... *H04N 5/3742* (2013.01); *H04N 5/3575* (2013.01); *H04N 5/355* (2013.01)
USPC .......................................... 348/300; 348/308

(58) Field of Classification Search
USPC ................................................ 348/300, 308
See application file for complete search history.

(56) References Cited

U.S. PATENT DOCUMENTS

| 7,626,622 | B2 | 12/2009 | Kasuga et al. | |
|---|---|---|---|---|
| 2002/0011554 | A1* | 1/2002 | Brehmer et al. | ............ 250/208.1 |
| 2006/0219866 | A1* | 10/2006 | Egawa et al. | ............... 250/208.1 |
| 2008/0218619 | A1* | 9/2008 | Egawa | ........................... 348/296 |
| 2009/0021619 | A1 | 1/2009 | Kasuga et al. | |

FOREIGN PATENT DOCUMENTS

| CN | 1910910 A | 2/2007 |
|---|---|---|
| JP | 2004-15701 | 1/2004 |
| TW | 200828999 A | 11/2007 |

OTHER PUBLICATIONS

Office Action issued on May 30, 2013 in the corresponding Chinese Patent Application No. 201110072014.0 (with English Translation).
Taiwanese Office Action mailed on May 20, 2014 in corresponding Taiwanese Patent Application No. 100109144, with English translation, 18 pages, citing document AO therein.

* cited by examiner

*Primary Examiner* — James Hannett
(74) *Attorney, Agent, or Firm* — Oblon, Spivak, McClelland, Maier & Neustadt, L.L.P.

(57) ABSTRACT

According to one embodiment, a solid-state imaging device includes a pixel array unit where pixels are disposed in a matrix and a column amplifying circuit that is disposed at an end of the pixel array unit and amplifies a unit signal of a unit pixel read from each pixel with at least first and second amplification factors, and outputs a plurality of amplified signals.

3 Claims, 32 Drawing Sheets

SOLID-STATE IMAGING DEVICE

CROSS-REFERENCE TO RELATED APPLICATIONS

This application is based upon and claims the benefit of priority from the prior Japanese Patent Application No. 2010-133156, filed on Jun. 10, 2010; the entire contents of which are incorporated herein by reference.

FIELD

Embodiments described herein relate generally to a solid-state imaging device.

BACKGROUND

With regard to a solid state imaging device, a method that provides a signal processing circuit to execute A/D conversion or correlated double sampling (CDS) for each column and amplifies a signal read from each pixel on a column basis is known.

For example, there is a method that provides a function of detecting the magnitude of each pixel signal independently and setting gain independently of the magnitude of each pixel signal in a column region portion of an image sensor.

In this method, an amplification factor is switched with respect to a signal component detected by the CDS. For this reason, at the time of the CDS, a reference level is sampled from a signal before switching the amplification factor and a signal level is sampled from a signal after switching the amplification factor. Therefore, an effect of suppressing noise based on the CDS is insufficient.

DETAILED DESCRIPTION

In general, according to one embodiment, a solid-state imaging device includes a pixel array unit and a column amplifying circuit. In the pixel array unit, pixels are disposed in a matrix. The column amplifying circuit is disposed at an end of the pixel array unit, amplifies a unit signal of a unit pixel read from each pixel with at least first and second amplification factors, and outputs the plural amplified signals.

Exemplary embodiments of the solid-state imaging device will be explained below in detail with reference to the accompanying drawings. The present invention is not limited to the following embodiments.

First Embodiment

Figure 1:
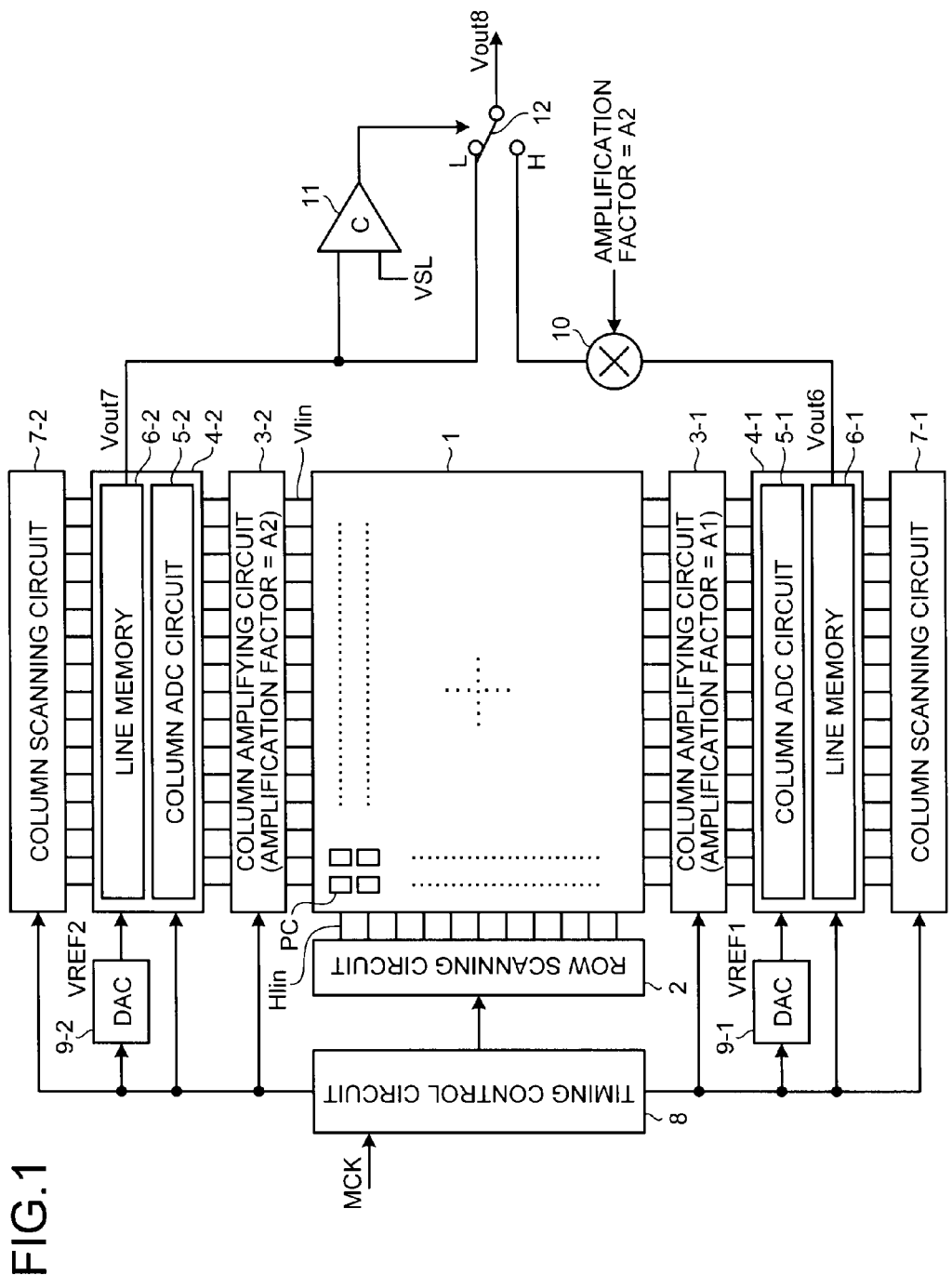
FIG. 1 is a block diagram of a schematic configuration of a solid-state imaging device according to a first embodiment.

FIG. 1 is a block diagram of a schematic configuration of a solid-state imaging device according to a first embodiment.

In FIG. 1, the solid-state imaging device includes a pixel array unit 1 where pixels PC to accumulate photoelectrically converted charges are disposed in a matrix in row and column directions, a row scanning circuit 2 that scans each pixel PC to be read in a vertical direction, a column amplifying circuit 3-1 that amplifies a signal read from each pixel PC with an amplification factor A1 for each column, a column amplifying circuit 3-2 that amplifies a signal read from each pixel PC with an amplification factor A2 for each column, a sample and hold signal converting circuit 4-1 that detects a signal component of each pixel PC amplified with the amplification factor A1 by CDS, a sample and hold signal converting circuit 4-2 that detects a signal component of each pixel PC amplified with the amplification factor A2 by the CDS, a column scanning circuit 7-1 that reads a signal stored in a line memory of the sample and hold signal converting circuit 4-1 in a horizontal direction, a column scanning circuit 7-2 that reads a signal stored in a line memory of the sample and hold signal converting circuit 4-2 in a horizontal direction, a timing control circuit 8 that controls the timing for read or accumulation of each pixel PC, a D/A converter 9-1 that outputs a reference voltage VREF1 to the sample and hold signal converting circuit 4-1, and a D/A converter 9-2 that outputs a reference voltage VREF2 to the sample and hold signal converting circuit 4-2. To the timing control circuit 8, a master clock MCK is input.

In this case, the sample and hold signal converting circuit 4-1 can sample a first reference level and a first signal level from the signal of each pixel PC amplified with the amplification factor A1 and detect a signal component of each pixel PC by the CDS. The sample and hold signal converting circuit 4-2 can sample a second reference level and a second signal level from the signal of each pixel PC amplified with the amplification factor A2 and detect a signal component of each pixel PC by the CDS.

The D/A converters 9-1 and 9-2 can output triangular waves as the reference voltages VREF1 and VREF2, when executing an up-counting operation and a down-counting operation by the column ADC circuits 5-1 and 5-2. For example, when a subject is bright, the amplification factor A1 can be set to 1× and the amplification A2 can be set to 4×. When the subject is dark, the amplification factor A1 can be set to 1× and the amplification factor A2 can be set to 4×. However, the amplification factor A2 is not limited to 4× and may be set to 2×, 8× or 16×.

In the pixel array unit 1, horizontal control lines Hlin that perform read control of the pixels PC are provided in a row direction and vertical signal lines Vlin that transmit signals read from the pixels PC are provided in a column direction.

In the sample and hold signal converting circuit 4-1, a column ADC circuit 5-1 that executes an up-counting operation and a down-counting operation on the basis of the comparison result of the read signal from the pixel PC amplified with the amplification factor A1 and the reference voltage VREF1 and calculates the difference between a reference level and a signal level of the CDS and a line memory 6-1 that stores a count value of the column ADC circuit 5-1 by the amount of horizontal pixels are provided. In the sample and hold signal converting circuit 4-2, a column ADC circuit 5-2 that executes an up-counting operation and a down-counting operation on the basis of the comparison result of the read signal from the pixel PC amplified with the amplification factor A2 and the reference voltage VREF1 and calculates the difference between the reference level and the signal level of the CDS and a line memory 6-2 that stores a count value of the column ADC circuit 5-2 by the amount of horizontal pixels are provided.

In the solid-state imaging device, a multiplier 10 that multiplies an output signal Vout6 from the sample and hold signal converting circuit 4-1 with the amplification factor A2, a comparator 11 that compares an output signal Vout7 from the sample and hold signal converting circuit 4-2 and a reference level VSL, and a switch 12 that switches an output signal Vout8 to the L side or the H side on the basis of the comparison result of the comparator 11 are provided. When the amplification factor of the column amplifying circuit 3-1 is not 1×, the amplification factor A2 of the multiplier 10 can be changed such that a photoelectric conversion characteristic of the output signal Vout8 becomes linear with respect to an optical signal amount.

If the pixels PC are scanned in a vertical direction by the row scanning circuit 2, the pixels PC of a row direction are selected and the signals that are output from the pixels PC are transmitted to the column amplifying circuits 3-1 and 3-2 through the vertical signal lines Vlin. After the signals read from the pixels PC are amplified with the amplification factor A1 by the column amplifying circuit 3-1, the signals are transmitted to the sample and hold signal converting circuit 4-1. After the signals read from the pixels PC are amplified with the amplification factor A2 by the column amplifying circuit 3-2, the signals are transmitted to the sample and hold signal converting circuit 4-2.

In the sample and hold signal converting circuit 4-1, a first reference level and a first signal level are sampled from the signal of each pixel PC amplified with the amplification factor A1, the difference between the first signal level and the first reference level is taken, and a signal component of each pixel PC is detected by the CDS and is output as the output signal Vout6.

In this case, in the column ADC circuit 5-1, after a down-counting operation is executed until the first reference level sampled from the signal of each pixel PC amplified with the amplification factor A1 is matched with the level of the reference voltage VREF1, an up-counting operation is executed until the first signal level sampled from the signal of each pixel PC amplified with the amplification factor A1 is matched with the level of the reference voltage VREF1, and the signal component that is detected by the CDS is converted into a digital value and is stored in the line memory 6-1 by the amount of horizontal pixels.

In the sample and hold signal converting circuit 4-2, a second reference level and a second signal level are sampled from the signal of each pixel PC amplified with the amplification factor A2, the difference between the second signal level and the second reference level is taken, and a signal component of each pixel PC is detected by the CDS and is output as the output signal Vout7.

In this case, in the column ADC circuit 5-2, after a down-counting operation is executed until the second reference level sampled from the signal of each pixel PC amplified with the amplification factor A2 is matched with the level of the reference voltage VREF2, an up-counting operation is executed until the second signal level sampled from the signal of each pixel PC amplified with the amplification factor A2 is matched with the level of the reference voltage VREF2, and the signal component that is detected by the CDS is converted into a digital value and is stored in the line memory 6-2 by the amount of horizontal pixels.

In the comparator 11, when the output signal Vout7 from the sample and hold signal converting circuit 4-2 is compared with the reference level VSL, if the level of the output signal Vout7 is lower than the reference level VSL, the switch 12 is switched to the L side and the output signal Vout7 is output as the output signal Vout8.

Meanwhile, when the level of the output signal Vout7 is equal to or higher than the reference level VSL, the switch 12 is switched to the H side. In the multiplier 10, the output signal Vout6 from the sample and hold signal converting circuit 4-1 is multiplied with the amplification factor A2, a signal component of the output signal Vout6 amplified with the amplification factor A1 becomes linear with respect to the amount of light, and the output signal Vout6 multiplied with the amplification factor A2 is output as the output signal Vout8. With respect to the reference level VSL, at the time of the A/D conversion of 10 bits, 1023 levels that are a maximum value can be set. That is, at the time of the 1023 levels where the output signal Vout2 is saturated, the output signal Vout6 that is multiplied with the amplification factor A2 can be selected.

For example, when the subject is bright, both the amplification factors A1 and A2 are set as 1× and the output signal Vout7 that is not saturated is output as the output signal Vout8. Since the saturated signal have a digital value of 1023, the switch 12 is switched to the H side and a signal that is obtained by amplifying the output signal Vout6 with 1× equal to the amplification factor A2 is output as the output signal Vout8. However, since the amplification factor A1 is 1×, a signal with a digital value of 1023 is output. When the amplification factor A2 is 1×, the switch 12 can be fixed to the L side.

Meanwhile, when the subject is dark, the amplification factor A1 is set as 1× and the amplification factor A2 is set as 4× and the output signal Vout7 that is not saturated is output as the output signal Vout8. When the signal Vout7 is saturated and has a digital value of 1023, the switch 12 is switched to the H side and a signal that is obtained by amplifying the output signal Vout6 with the amplification factor 4× is output as the output signal Vout8. That is, a digital value of 4095 that is approximately the quadruple of 1023 to be the maximum value of the ADC is obtained from the output signal Vout8. A signal whose dynamic range is quadrupled is obtained.

In this case, when the signal component of each pixel PC amplified with the amplification factor A1 is detected by the CDS, an effect of canceling noise based on the CDS in the amplification factor A1 can be improved by sampling the first reference level from the signal of each pixel PC amplified with the amplification factor A1. When the signal component of each pixel PC amplified with the amplification factor A2 is detected by the CDS, an effect of canceling noise based on the CDS in the amplification factor A2 can be improved by sampling the second reference level from the signal of each pixel PC amplified with the amplification factor A2. For this reason, the amplification factor of the signal level can be switched while an effect of suppressing the noise based on the CDS is improved. Therefore, a dynamic range can be enlarged while an S/N ratio is increased.

Second Embodiment

Figure 2:
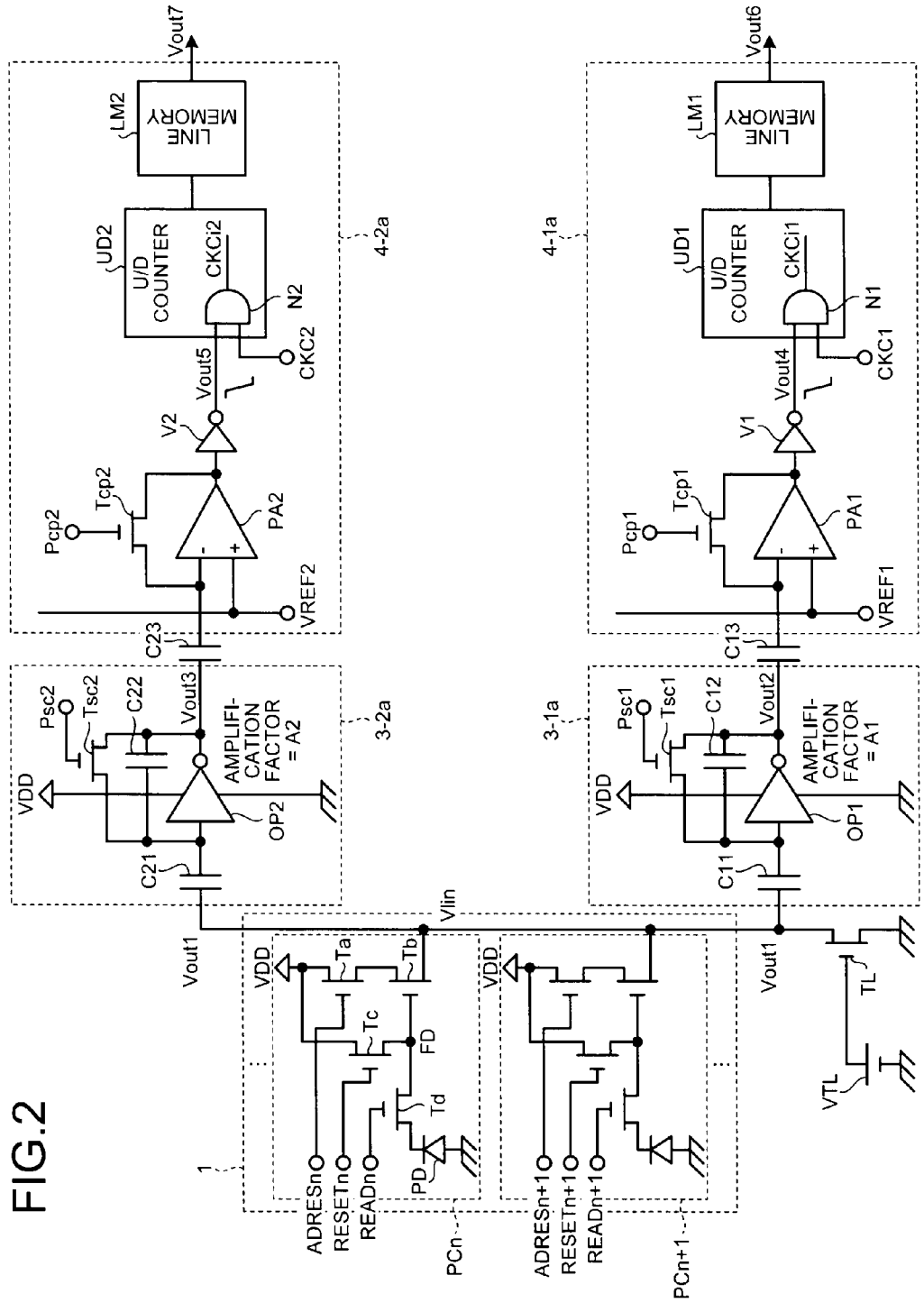
FIG. 2 is a circuit diagram of a schematic configuration of one column of a solid-state imaging device according to a second embodiment.

FIG. 2 is a circuit diagram of a schematic configuration of one column of a solid-state imaging device according to a second embodiment.

In FIG. 2, the solid-state imaging device includes a pixel array unit 1, column amplifying circuits 3-1a and 3-2a, and sample and hold signal converting circuits 4-1a and 4-2a.

In the pixel array unit 1, pixels PCn and PCn+1 are provided. In each of the pixels PCn and PCn+1, a photodiode PD, a row selection transistor Ta, an amplification transistor Tb, a reset transistor Tc, and a read transistor Td are provided. At a connection point of the amplification transistor Tb, the reset transistor Tc, and the read transistor Td, floating diffusion FD that functions as a detection node is formed.

In the pixels PCn and PCn+1, sources of the read transistors Td are connected to the photodiodes PD and read signals READn and READn+1 are input to gates of the read transistors Td. Sources of the reset transistors Tc are connected to drains of the read transistors Td and reset signals RESETn and RESETn+1 are input to gates of the reset transistors Tc, and drains of the reset transistors Tc are connected to a power supply VDD. Row selection signals ADRESn and ADRSn+1 are input to gates of the row selection transistors Ta and drains of the row selection transistors Ta are connected to the power supply VDD. Sources of the amplification transistors Tb are connected to the vertical signal line Vlin, gates of the amplification transistors Tb are connected to drains of the read transistors Td, and drains of the amplification transistors Tb are connected to sources of the row selection transistors Ta.

The horizontal control line Hlin of FIG. 1 can transmit the read signals READn and READn+1, the reset signals RESETn and RESETn+1, and the row selection signals ADRESn and ADRESn+1 to the pixels PC for each row.

A drain of a constant current transistor TL is connected to the vertical signal line Vlin and a gate of the constant current transistor TL is connected to a bias power supply VTL. The constant current transistor TL and the amplification transistor Tb are combined and configure a source follower and can execute a constant current operation.

In the column amplifying circuit 3-1a, capacitors C11 and C12, an operational amplifier OP1, and a switch transistor Tsc1 are provided for each column. The vertical signal line Vlin is connected to an input terminal of the operational amplifier OP1 through the capacitor C11 and the capacitor C12 is connected between the input terminal and an output terminal of the operational amplifier OP1. The switch transistor Tsc1 is connected in parallel to the capacitor C12.

In the column amplifying circuit 3-2a, capacitors C21 and C22, an operational amplifier OP2, and a switch transistor Tsc2 are provided for each column. The vertical signal line Vlin is connected to an input terminal of the operational amplifier OP2 through the capacitor C21 and the capacitor C22 is connected between the input terminal and an output terminal of the operational amplifier OP2. The switch transistor Tsc2 is connected in parallel to the capacitor C22.

As the column amplifying circuits 3-1a and 3-2a, a switched capacitor type inverting amplifier that can control each of the amplification factors A1 and A2 with a capacitance ratio can be used. The amplification factors A1 and A2 can be calculated by C11/C12 and C21/C22, respectively. For example, in the case of C11=0.05 pF and C12=0.05 pF, 1× is obtained as the amplification factor A1, and in the case of C21=0.05 pF and C22=0.2 pF, 4× is obtained as the amplification factor A2.

In the sample and hold signal converting circuit 4-1a, a comparator PA1, a switch transistor Tcp1, an inverter V1, an up-down counter UD1, and a line memory LM1 are provided for each column. In the up-down counter UD1, an AND circuit N1 is provided.

An output terminal of the operational amplifier OP1 is connected to an inverting input terminal of the comparator PA1 through a capacitor C13 and the reference voltage VREF1 is input to a non-inverting input terminal of the comparator PA1. The switch transistor Tcp1 is connected between the inverting input terminal and the output terminal of the comparator PA1. The output terminal of the comparator PA1 is connected to one input terminal of the AND circuit N1 through the inverter V1 and a reference clock CKC1 is input to the other input terminal of the AND circuit N1. An output terminal of the up-down counter UD1 is connected to the line memory LM1.

In the sample and hold signal converting circuit 4-2a, a comparator PA2, a switch transistor Tcp2, an inverter V2, an up-down counter UD2, and a line memory LM2 are provided for each column. In the up-down counter UD2, an AND circuit N2 is provided.

An output terminal of the operational amplifier OP2 is connected to an inverting input terminal of the comparator PA2 through a capacitor C23 and the reference voltage VREF2 is input to a non-inverting input terminal of the comparator PA2. The switch transistor Tcp2 is connected between the inverting input terminal and the output terminal of the comparator PA2. The output terminal of the comparator PA2 is connected to one input terminal of the AND circuit N2 through the inverter V2 and a reference clock CKC2 is input to the other input terminal of the AND circuit N2. An output terminal of the up-down counter UD2 is connected to the line memory LM2.

Figure 3:
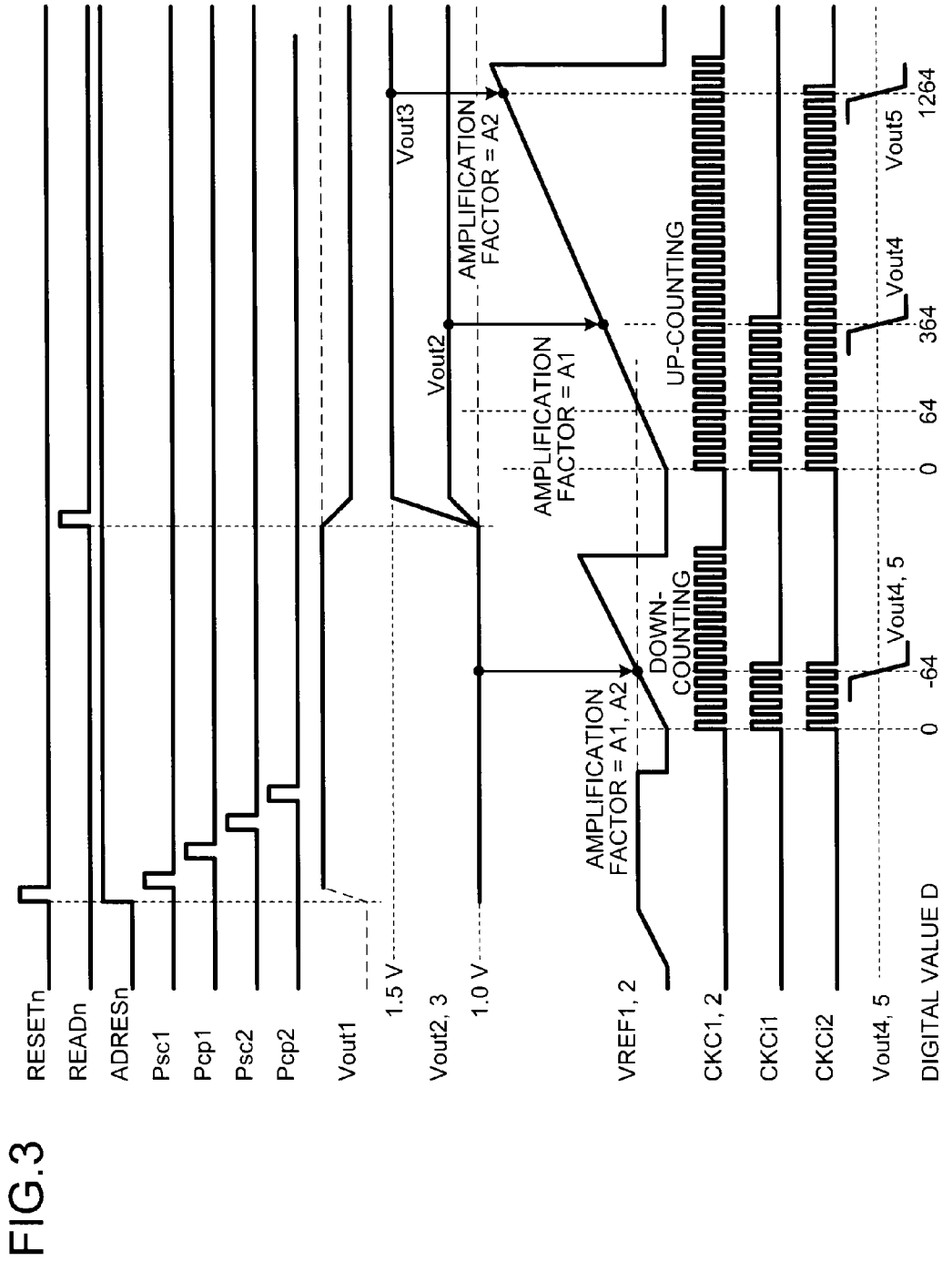
FIG. 3 is a timing chart illustrating a read operation of one pixel of the solid-state imaging device of FIG. 2.

FIG. 3 is a timing chart illustrating a read operation of one pixel of the solid-state imaging device of FIG. 2.

In FIG. 3, when a level of the row selection signal ADRESn is a low level, the row selection transistor Ta is turned off and the source follower operation is not executed. For this reason, a signal is not output to the vertical signal line Vlin. At this time, if a level of each of the read signal READn and the reset signal RESETn become a high level, the read transistor Td is turned on and charges that are accumulated in the photodiode PD are discharged to the floating diffusion FD. The charges are discharged to the power supply VDD through the reset transistor Tc.

After the charges accumulated in the photodiode PD are discharged to the power supply VDD, if the level of the read signal READn becomes a low level, charges of valid signals start to be accumulated in the photodiode PD.

Next, if the level of the row selection signal ADRESn becomes a high level, the row selection transistor Ta of the pixels PC is turned on, the power supply potential VDD is applied to the drain of the amplification transistor Tb, and a source follower is configured by the amplification transistor Tb and the constant current transistor TL.

If the level of the reset signal RESETn becomes a high level with the row selection transistor Ta being turned on, the reset transistor Tc is turned on and the extra charges that are generated in the leak current are reset to the floating diffusion FD. A voltage according to a reference level of the floating diffusion FD is applied to the gate of the amplification transistor Tb. In this case, since the source follower is configured by the amplification transistor Tb and the constant current transistor TL, the voltage of the vertical signal line Vlin follows the voltage applied to the gate of the amplification transistor Tb and is output as the output voltage Vout1 of the reference level to the vertical signal line Vlin.

When the output voltage Vout1 of the reference level is output to the vertical signal line Vlin, if a reset pulse Psc1 is applied to the gate of the switch transistor Tsc1, the input voltage of the operational amplifier OP1 is clamped with the output voltage and an operation point is set. At this time, the voltage difference with respect to the vertical signal line Vlin is held in the capacitor C11 and the input voltage of the operational amplifier OP1 is set to zero.

When the output voltage Vout1 of the reference level is output to the vertical signal line Vlin, if the reset pulse Psc1 is applied to the gate of the switch transistor Tcp1, the input voltage of the inverting input terminal of the comparator PA1 is clamped with the output voltage and an operation point is set. At this time, the voltage difference with respect to the output voltage Vout2 from the operational amplifier OP1 is held in the capacitor C13 and the input voltage of the operational amplifier OP1 is set to zero.

When the output voltage Vout1 of the reference level is output to the vertical signal line Vlin, if a reset pulse Psc2 is applied to the gate of the switch transistor Tsc2, the input voltage of the operational amplifier OP2 is clamped with the output voltage and an operation point is set. At this time, the voltage difference with respect to the vertical signal line Vlin is held in the capacitor C21 and the input voltage of the operational amplifier OP2 is set to zero.

When the output voltage Vout1 of the reference level is output to the vertical signal line Vlin, if the reset pulse Pcp2 is applied to the gate of the switch transistor Tcp2, the input voltage of the inverting input terminal of the comparator PA2 is clamped with the output voltage and an operation point is set. At this time, the voltage difference with respect to the output voltage Vout3 from the operational amplifier OP2 is held in the capacitor C23 and the input voltage of the comparator PA2 is set to zero.

After the switch transistor Tsc1 is turned off, if the input voltage of the operational amplifier OP1 is changed, the voltage is fed back from the capacitor C12, such that the input voltage becomes the zero voltage. As a result, the output voltage Vout2 that is inverted and amplified with the capacitance ratio $C_{11}/C_{12}$ (=amplification factor A1) is output from the operational amplifier OP1 and is applied to the inverting input terminal of the comparator PA1 through the capacitor C13. In this case, a capacitance value of the capacitor C11 is set as $C_{11}$ and a capacitance value of the capacitor C12 is set as $C_{12}$.

After the switch transistor Tsc2 is turned off, if the input voltage of the operational amplifier OP2 is changed, the voltage is fed back from the capacitor C22, such that the input voltage becomes the zero voltage. As a result, the output voltage Vout3 that is inverted and amplified with the capacitance ratio $C_{21}/C_{22}$ (=amplification factor A2) is output from the operational amplifier OP2 and is applied to the inverting input terminal of the comparator PA2 through the capacitor C23. In this case, a capacitance value of the capacitor C21 is set as $C_{21}$ and a capacitance value of the capacitor C22 is set as $C_{22}$.

With the output voltage Vout2 of the reference level being input to the comparator PA1 through the capacitor C13 after the switch transistor Tcp1 is turned off, a triangular wave is applied as the reference voltage VREF1 and the output voltage Vout2 of the reference level and the reference voltage VREF1 are compared with each other. After the output voltage of the comparator PA1 is inverted by the inverter V1, the output voltage is input as the output voltage Vout4 to one input terminal of the AND circuit N1.

The reference clock CKC1 is input to the other input terminal of the AND circuit N1. When the level of the output voltage Vout2 of the reference level is lower than the level of the reference voltage VREF1, the level of the output voltage Vout4 becomes a high level. For this reason, the reference clock CKC1 passes through the AND circuit N1 and a reference clock CKCi1 after the passage is down-counted by the up-down counter UD1. If the level of the output voltage Vout2 of the reference level is matched with the level of the reference voltage VREF1, the output voltage of the comparator PA1 falls and the level of the output voltage Vout4 becomes a low level. For this reason, the reference clock CKC1 is intercepted by the AND circuit N1 and the down-counting operation is stopped by the up-down counter UD1. As a result, the output voltage Vout2 of the reference level is converted into a digital value D and is held as the first reference level of the signal amplified with the amplification factor A1 in the up-down counter UD1.

With the output voltage Vout3 of the reference level being input to the comparator PA2 through the capacitor C23 after the switch transistor Tcp2 is turned off, a triangular wave is applied as the reference voltage VREF2 and the output voltage Vout3 of the reference level and the reference voltage VREF2 are compared with each other. After the output voltage of the comparator PA2 is inverted by the inverter V2, the output voltage is input as the output voltage Vout5 to one input terminal of the AND circuit N2.

The reference clock CKC2 is input to the other input terminal of the AND circuit N2. When the level of the output voltage Vout3 of the reference level is lower than the level of the reference voltage VREF2, the level of the output voltage Vout5 becomes a high level. For this reason, the reference clock CKC2 passes through the AND circuit N2 and a reference clock CKCi2 after the passage is down-counted by the up-down counter UD2. If the level of the output voltage Vout3 of the reference level is matched with the level of the reference voltage VREF2, the output voltage of the comparator PA2 falls and the level of the output voltage Vout5 becomes a low level. For this reason, the reference clock CKC2 is intercepted by the AND circuit N1 and the down-counting operation is stopped by the up-down counter UD2. As a result, the output voltage Vout3 of the reference level is converted into a digital value D and is held as the first reference level of the signal amplified with the amplification factor A2 in the up-down counter UD2.

Next, if the level of the read signal READn becomes a high level with the row selection transistor Ta of the pixel PCn being turned on, the read transistor Td is turned on, the charges that are accumulated in the photodiode PD are transmitted to the floating diffusion FD, a voltage according to a signal level of the floating diffusion FD is applied to the gate of the amplification transistor Tb. In this case, since the source follower is configured by the amplification transistor Tb and the constant current transistor TL, the voltage of the vertical signal line Vlin follows the voltage applied to the gate of the amplification transistor Tb and is output as the output voltage Vout1 of the signal level to the vertical signal line Vlin.

If the output voltage Vout1 of the signal level is applied to the input terminal of the operational amplifier OP1 through the capacitor C11 and the input voltage of the operational amplifier OP1 is changed, the voltage is fed back from the capacitor C12 such that the input voltage becomes a zero voltage. As a result, the output voltage Vout2 of the signal level that is inverted and amplified with the capacitance ratio $C_{11}/C_{12}$ (=amplification factor A1) is output from the operational amplifier OP1 and is applied to the inverting input terminal of the comparator PA1 through the capacitor C13.

If the output voltage Vout1 of the signal level is applied to the input terminal of the operational amplifier OP2 through the capacitor C21 and the input voltage of the operational amplifier OP2 is changed, the voltage is fed back from the capacitor C22 such that the input voltage becomes a zero voltage. As a result, the output voltage Vout3 of the signal level that is inverted and amplified with the capacitance ratio $C_{21}/C_{22}$ (=amplification factor A2) is output from the operational amplifier OP2 and is applied to the inverting input terminal of the comparator PA2 through the capacitor C23.

With the output voltage Vout2 of the signal level being input to the comparator PA1 through the capacitor C13, a triangular wave is applied as the reference voltage VREF1 and the output voltage Vout2 of the signal level and the reference voltage VREF1 are compared with each other. After the output voltage of the comparator PA1 is inverted by the inverter V1, the output voltage is input as the output voltage Vout4 to one input terminal of the AND circuit N1.

When the level of the output voltage Vout2 of the signal level is lower than the level of the reference voltage VREF1, the level of the output voltage Vout4 becomes a high level. For this reason, the reference clock CKC1 passes through the AND circuit N1 and a reference clock CKCi1 after the passage is up-counted by the up-down counter UD1. If the level of the output voltage Vout2 of the signal level is matched with the level of the reference voltage VREF1, the output voltage of the comparator PA1 falls and the level of the output voltage Vout4 becomes a low level. For this reason, the reference clock CKC1 is intercepted by the AND circuit N1, the up-counting operation is stopped by the up-down counter UD1, and the difference between the output voltage Vout2 of the signal level and the output voltage Vout2 of the reference level is converted into a digital value D and is transmitted to the line memory LM1. As a result, in the line memory LM1, the difference between the first signal level and the first reference level that are sampled from the signal amplified with the amplification factor A1 is held as a signal component of the amplification factor A1 detected by the CDS.

With the output voltage Vout3 of the signal level being input to the comparator PA2 through the capacitor C23, a triangular wave is applied as the reference voltage VREF2 and the output voltage Vout3 of the signal level and the reference voltage VREF2 are compared with each other. After the output voltage of the comparator PA2 is inverted by the inverter V2, the output voltage is input as the output voltage Vout4 to one input terminal of the AND circuit N2.

When the level of the output voltage Vout3 of the signal level is lower than the level of the reference voltage VREF2, the level of the output voltage Vout5 becomes a high level. For this reason, the reference clock CKC2 passes through the AND circuit N2 and a reference clock CKCi2 after the passage is up-counted by the up-down counter UD2. If the level of the output voltage Vout3 of the signal level is matched with the level of the reference voltage VREF2, the output voltage of the comparator PA2 falls and the level of the output voltage Vout5 becomes a low level. For this reason, the reference clock CKC2 is intercepted by the AND circuit N2, the up-counting operation is stopped by the up-down counter UD2, and the difference between the output voltage Vout3 of the signal level and the output voltage Vout3 of the reference level is converted into a digital value D and is transmitted to the line memory LM2. As a result, in the line memory LM2, the difference between the second signal level and the second reference level that are sampled from the signal amplified with the amplification factor A2 is held as a signal component of the amplification factor A2 detected by the CDS.

In this case, even when the up-counting operation is executed on the basis of the output voltage Vout2 of the signal level of the amplification factor A1 after the down-counting operation is executed on the basis of the output voltage Vout2 of the reference level of the amplification factor A1 and the reference level is overlapped when reading the signal level, the overlapped reference level can be cancelled and the signal component of the amplification factor A1 can be effectively detected by the CDS.

Even when the up-counting operation is executed on the basis of the output voltage Vout3 of the signal level of the amplification factor A2 after the down-counting operation is executed on the basis of the output voltage Vout3 of the reference level of the amplification factor A2 and the reference level is overlapped when reading the signal level, the overlapped reference level can be cancelled and the signal component of the amplification factor A2 can be effectively detected by the CDS.

In an example of FIG. 3, since an average value of an imaging area when imaging the dark subject is small, the amplification factor A2 is set to 4×. However, since the signal of the subject is different for each pixel, in a certain pixel, the output signal Vout4 of the amplification factor A1 of 1× that has a digital value of 364 and the output signal Vout5 of the amplification factor A2 of 4× that has a digital value of 1264 are output. By the operation of the up-down counter UD1 at the rear stage, the output signal Vout6 has a digital value of 300 from which a digital value of 64 of the black level is subtracted. By the operation of the up-down counter UD2, the output signal Vout7 has a digital value of 1200 from which a digital value of 64 of the black level is subtracted. However, the output signal Vout7 has a digital value of 1023 by a clip operation to clip an output of the up-down counter, for an operation of 10 bits. At this time, by setting the VSL level to 1023, an output of the comparator C becomes H. The output signal Vout8 has a digital value of 1200 where the digital value of the output signal Vout6 to be 300 is amplified to the quadruple of the digital value of 300. The signal that is saturated with the digital value of 1023 in the related art is obtained without being saturated, and a signal where a dynamic range is enlarged can be obtained. When the down-counter executes a down-counting operation of a maximum of 255, the up-counter executes an up-counting operation of a maximum of 1024+255=1279.

Figure 4:
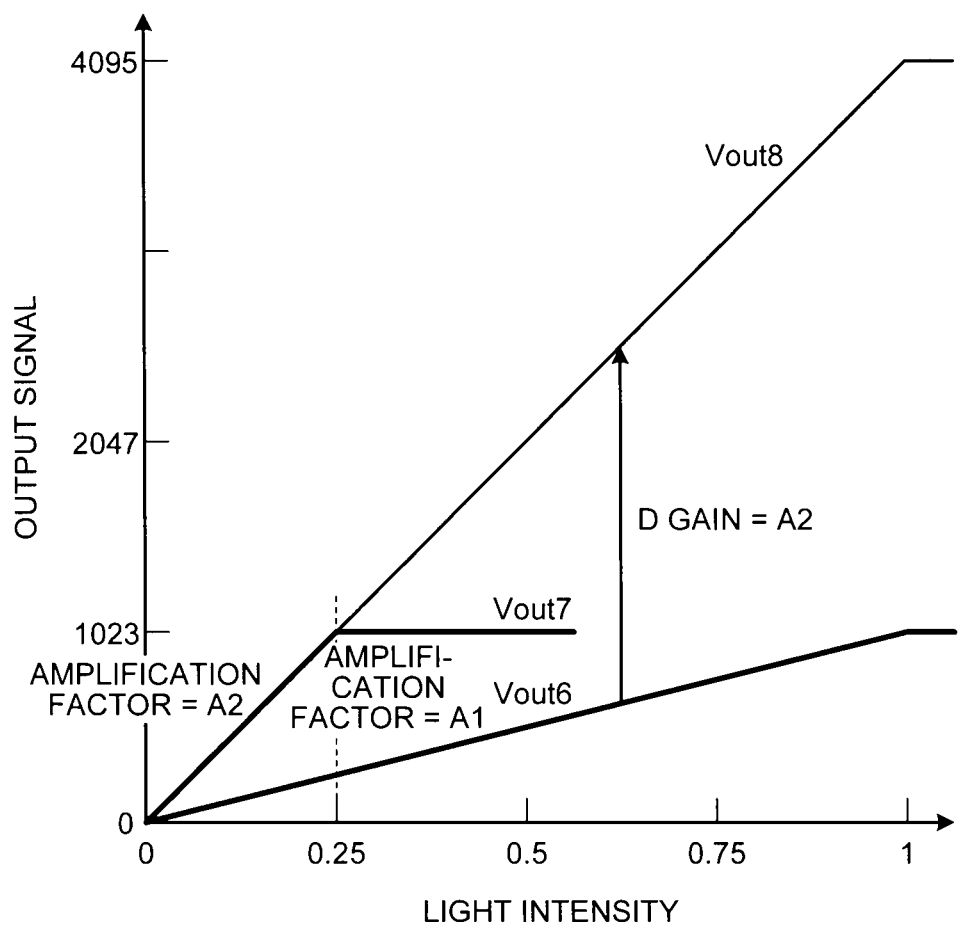
FIG. 4 is a diagram illustrating a dynamic range of the solid-state imaging device of FIG. 2 in comparison with a dynamic range according to the related art.

FIG. 4 is a diagram comparing a dynamic range of the solid-state imaging device of FIG. 2 and a dynamic range according to the related art.

In FIG. 4, the level of the output signal Vout6 of when the amplification factor A1 is 1× becomes a level of 1023 to be a saturation level, in the case in which the light intensity is 1. Meanwhile, the level of the output signal Vout7 of when the amplification factor A2 is 4× becomes a level of 1023 to be a maximum value of the A/D conversion, in the case in which the light intensity is 0.25.

When the light intensity is 0.25 or less, the output signal Vout8 that is obtained by synthesizing the output signals Vout6 and Vout7 becomes the output signal Vout7. When the light intensity is more than 0.25, the output signal Vout8 becomes a signal that has a digital value to be the quadruple of a digital value of the output signal Vout6.

For this reason, the output signal Vout8 becomes a signal where a signal component becomes linear with respect to the light intensity of a level of a maximum of 4095. In a low-illumination region (light intensity is 0.25 or less) where noise is observed, by amplifying the signal to the quadruple by the column amplifying circuit 3-2a, a signal having a high S/N ratio where circuit noise of the column ADC circuit 5-2 is reduced to ¼ of the original noise can be obtained. By changing the amplification factor, a low-illumination level can be changed. As the output signal Vout8, a signal that corresponds to 12 bits of the A/D conversion is obtained. In the low-illumination region, a signal having a high S/N ratio can be obtained, and a dynamic range can be enlarged by reducing the low-illumination noise. By making a signal component of the output signal Vout8 linear with respect to the amount of light, even when the amplification factor is switched, signal processing of a rear stage can be executed without changing the circuit configuration of the rear stage.

Third Embodiment

Figure 5:
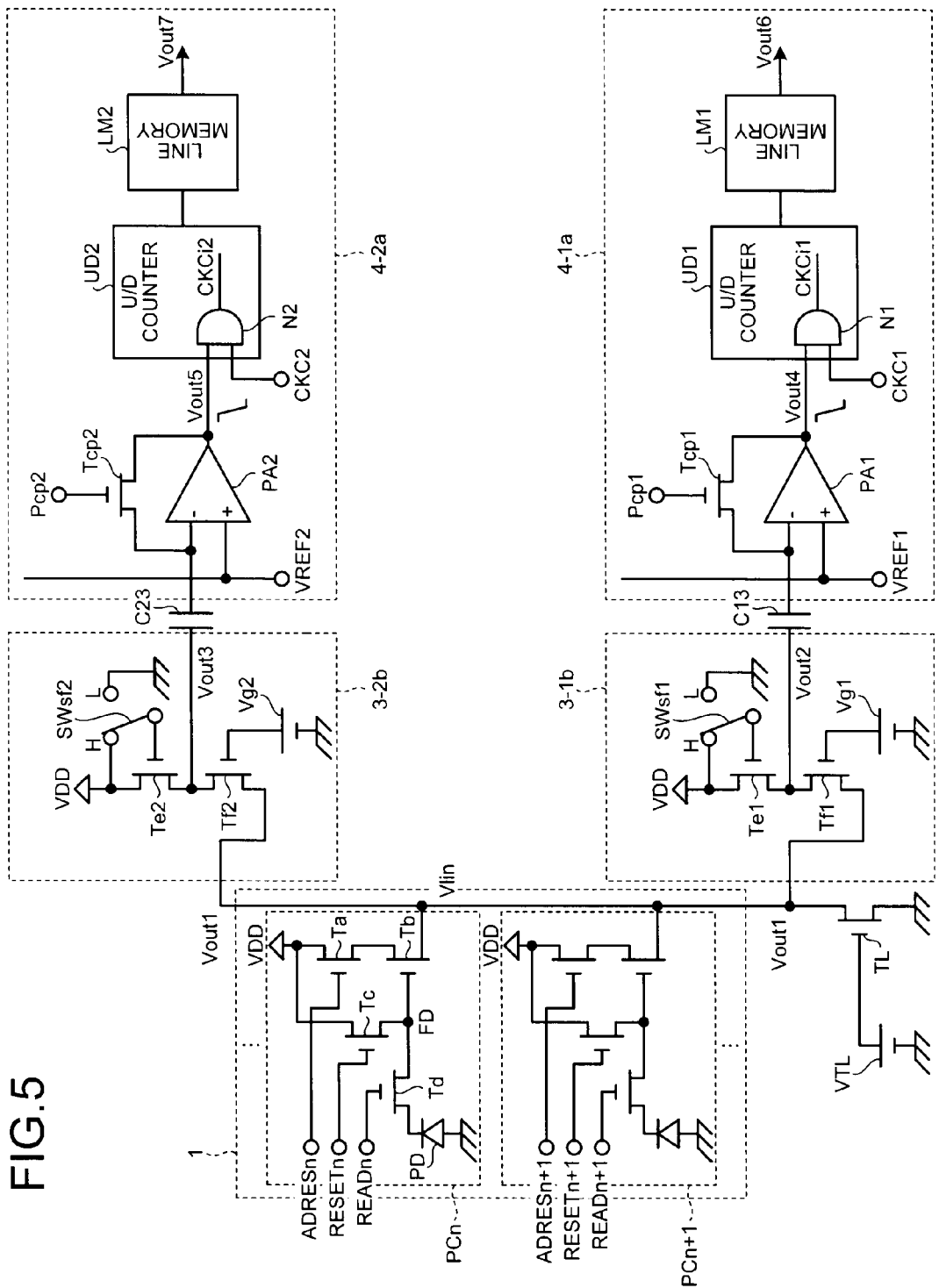
FIG. 5 is a circuit diagram of a schematic configuration of one column of a solid-state imaging device according to a third embodiment.

FIG. 5 is a circuit diagram of a schematic configuration of one column of a solid-state imaging device according to a third embodiment.

In FIG. 5, the solid-state imaging device includes column amplifying circuits 3-1b and 3-2b, instead of the column amplifying circuits 3-1a and 3-2a of FIG. 2.

In the column amplifying circuit 3-1b, an amplification transistor Tf1 and a load transistor Te1 are provided for each column. A source of the amplification transistor Tf1 is connected to the vertical signal line Vlin, a gate of the amplification transistor Tf1 is connected to a bias power supply Vg1, and a drain of the amplification transistor Tf1 is connected to a source of the load transistor Te1. A drain of the load transistor Te1 is connected to the power supply VDD and a gate of the load transistor Te1 is connected to a switch SWsf1.

In this case, the amplification transistors Tb and Tf1, the row selection transistor Ta, the load transistor Te1, and the constant current transistor TL configure a differential amplifying circuit. The switch SWsf1 can switch the connection destination of the gate of the load transistor Te1 between the power supply VDD and the ground.

In the column amplifying circuit 3-2b, an amplification transistor Tf2 and a load transistor Te2 are provided for each column. A source of the amplification transistor Tf2 is connected to the vertical signal line Vlin and a gate of the amplification transistor Tf2 is connected to a bias power supply Vg2, and a drain of the amplification transistor Tf2 is connected to a source of the load transistor Te2. A drain of the load transistor Te2 is connected to the power supply VDD and a gate of the load transistor Te2 is connected to a switch SWsf2.

In this case, the amplification transistors Tb and Tf2, the row selection transistor Ta, the load transistor Te2, and the constant current transistor TL configure a differential amplifying circuit. The switch SWsf2 can switch the connection destination of the gate of the load transistor Te2 between the power supply VDD and the ground.

If the switch SWsf1 is switched to the H side, the gate potential of the load transistor Te1 is set to the power supply potential VDD and a differential operation can be executed by the amplification transistors Tb and Tf1. Meanwhile, if the switch SWsf1 is switched to the L side, the load transistor Te1 is turned off and the output voltage Vout1 is output as the output voltage Vout2 through the amplification transistor Tf1.

If the switch SWsf2 is switched to the H side, the gate potential of the load transistor Te2 is set to the power supply potential VDD and a differential operation can be executed by the amplification transistors Tb and Tf2. Meanwhile, if the switch SWsf2 is switched to the L side, the load transistor Te2 is turned off and the output voltage Vout2 is output as the output voltage Vout3 through the amplification transistor Tf2.

Figure 6:
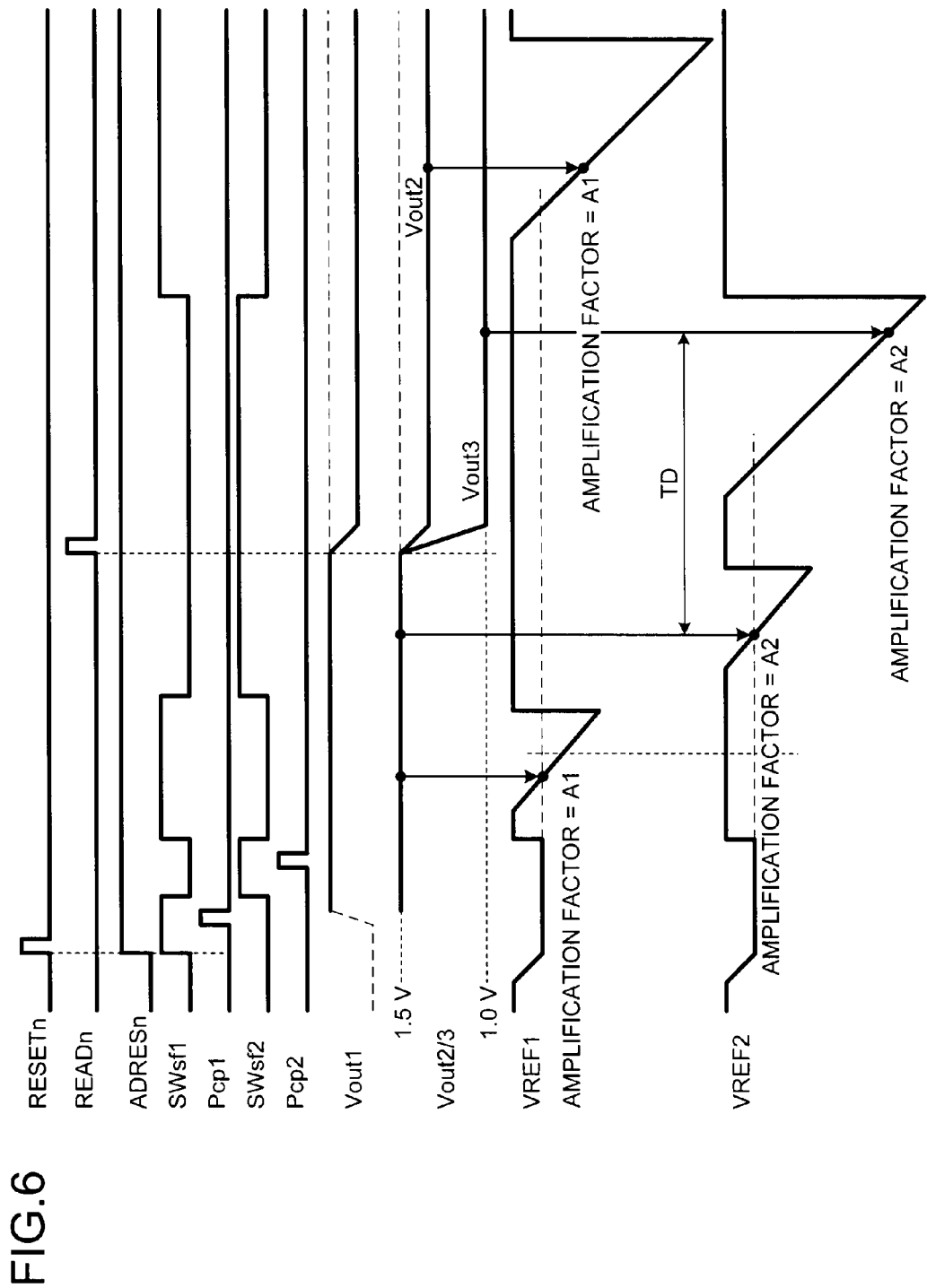
FIG. 6 is a timing chart illustrating a read operation of one pixel of the solid-state imaging device of FIG. 5.

FIG. 6 is a timing chart illustrating a read operation of one pixel of the solid-state imaging device of FIG. 5.

In FIG. 6, if the level of the row selection signal ADRESn becomes a high level, the row selection transistor Ta of the pixel PC is turned on, the power supply potential VDD is applied to the drain of the amplification transistor Tb, and a source follower is configured by the amplification transistor Tb and the constant current transistor TL.

If the level of the reset signal RESETn becomes a high level with the row selection transistor Ta being turned on, the reset transistor Tc is turned on and a voltage according to the reference level of the floating diffusion FD is applied to the gate of the amplification transistor Tb. In this case, since the source follower is configured by the amplification transistor Tb and the constant current transistor TL, the voltage of the vertical signal line Vlin follows the voltage that is applied to the gate of the amplification transistor Tb and is output as the output voltage Vout1 of the reference level to the vertical signal line Vlin.

If the output voltage Vout1 of the reference level is applied to the source of the amplification transistor Tf1 with the switch SWsf1 being switched to the H side, the output voltage Vout2 of the reference level is output from the drain of the amplification transistor Tf1. In this case, the polarity of the signal that is input to the gate of the amplification transistor Tb becomes equal to the polarity of the output voltage Vout2 and the polarity of the signal that is input to the gate of the amplification transistor Tf1 becomes opposite to the polarity of the output voltage Vout2.

Since the gate of the load transistor Te1 is connected to the power supply VDD, the load transistor Te1 operates as a resistor. When a signal is read from the pixel PCn, the row selection transistor Ta is turned on and the gate of the row selection transistor Ta is substantially connected to the power supply VDD and the row selection transistor Ta operates as a resistor. The constant current transistor TL executes an operation to flow a constant current determined by a transistor size and a gate voltage.

For this reason, the current that flows to the constant current transistor TL becomes a sum of a source current of the amplification transistor Tb and a source current of the amplification transistor Tf1. If the source current of the amplification transistor Tb increases, the source current of the amplification transistor Tf1 decreases. If the source current of the amplification transistor Tb decreases, the source current of the amplification transistor Tf1 increases. For this reason, a differential pair is configured by the amplification transistor Tb and the amplification transistor Tf1 and the column amplifying circuit 3-1$b$ can execute a differential operation.

By changing the sizes of the amplification transistor Tf1 and the load transistor Te1, the amplification factor A1 of the column amplifying circuit 3-1$b$ can be set to 1 or less, or 1 or more. For example, by setting a resistance value of the load transistor Te1 to be larger than a resistance value of the amplification transistor Tf1, the amplification factor A1 can be increased.

When the signal of the reference level is output to the vertical signal line Vlin, if the reset pulse Pcp1 is input to the gate of the switch transistor Tcp1, the input voltage of the comparator PA1 is clamped with the output voltage and an operation point is set.

Then, with the output voltage Vout2 of the reference level being input to the comparator PA1 through the capacitor C13, a triangular wave is applied as the reference voltage VREF1 and the output voltage Vout2 of the reference level and the reference voltage VREF1 are compared with each other. The high level of the output voltage Vout4 is maintained until the output voltage Vout2 of the reference level is matched with the level of the reference voltage VREF1, the up-down counter UD1 executes the down-counting operation until the level of the output voltage Vout4 is inverted into a low level, and the output voltage Vout2 of the reference level is converted into a digital value D and is held as the first level of the signal amplified with the amplification factor A1 in the up-down counter UD1.

If the output voltage Vout1 of the reference level is applied to the source of the amplification transistor Tf2 with the switch SWsf2 being switched to the H side, the output voltage Vout3 of the reference level is output from the drain of the amplification transistor Tf2. In this case, the polarity of the signal that is input to the gate of the amplification transistor Tb becomes equal to the polarity of the output voltage Vout3 and the polarity of the signal that is input to the gate of the amplification transistor Tf2 becomes opposite to the polarity of the output voltage Vout3.

Since the gate of the load transistor Te2 is connected to the power supply VDD, the load transistor Te2 operates as a resistor. When a signal is read from the pixel PCn, the row selection transistor Ta is turned on, the gate of the row selection transistor Ta is substantially connected to the power supply VDD, and the row selection transistor Ta operates as a resistor.

For this reason, the current that flows to the constant current transistor TL becomes a sum of a source current of the amplification transistor Tb and a source current of the amplification transistor Tf2. If the source current of the amplification transistor Tb increases, the source current of the amplification transistor Tf2 decreases. If the source current of the amplification transistor Tb decreases, the source current of the amplification transistor Tf2 increases. For this reason, a differential pair is configured by the amplification transistor Tb and the amplification transistor Tf2 and the column amplifying circuit 3-2$b$ can execute a differential operation.

By changing the sizes of the amplification transistor Tf2 and the load transistor Te2, the amplification factor A2 of the column amplifying circuit 3-2$b$ can be set to 1 or less, or 1 or more. For example, by setting a resistance value of the load transistor Te2 to be larger than a resistance value of the amplification transistor Tf2, the amplification factor A2 can be increased.

When the signal of the reference level is output to the vertical signal line Vlin, if the reset pulse Pcp2 is input to the gate of the switch transistor Tcp2, the input voltage of the comparator PA2 is clamped with the output voltage and an operation point is set.

Then, with the output voltage Vout3 of the reference level being input to the comparator PA2 through the capacitor C23, a triangular wave is applied as the reference voltage VREF2 and the output voltage Vout3 of the reference level and the reference voltage VREF2 are compared with each other. The high level of the output voltage Vout5 is maintained until the output voltage Vout3 of the reference level is matched with the level of the reference voltage VREF2, the up-down counter UD2 executes the down-counting operation until the level of the output voltage Vout5 is inverted into a low level, and the output voltage Vout3 of the reference level is converted into a digital value D and is held as the second level of the signal amplified with the amplification factor A2 in the up-down counter UD2.

Next, if the level of the read signal READn becomes a high level with the row selection transistor Ta of the pixel PCn being turned on, the read transistor Td is turned on, the charges that are accumulated in the photodiode PD are transmitted to the floating diffusion FD, and a voltage according to the reference level of the floating diffusion FD is applied to the gate of the amplification transistor Tb. In this case, since the source follower is configured by the amplification transistor Tb and the constant current transistor TL, the voltage of the vertical signal line Vlin follows the voltage that is applied to the gate of the amplification transistor Tb and is output as the output voltage Vout1 of the signal level to the vertical signal line Vlin.

The output voltage Vout1 of the signal level is applied to the source of the amplification transistor Tf1 and the output voltage Vout2 of the signal level is output from the drain of the amplification transistor Tf1.

Then, with the output voltage Vout2 of the signal level being input to the comparator PA1 through the capacitor C13, a triangular wave is applied as the reference voltage VREF1 and the output voltage Vout2 of the signal level and the reference voltage VREF1 are compared with each other. The high level of the output voltage Vout4 is maintained until the level of the output voltage Vout2 of the signal level is matched with the level of the reference voltage VREF1, the up-down counter UD1 executes the up-counting operation until the level of the output voltage Vout4 is inverted into a low level, and a differential voltage of the output voltage Vout2 of the signal level and the output voltage Vout2 of the reference level is converted into a digital value D and is transmitted to the line memory LM1. As a result, in the line memory LM1, the difference between the first signal level and the first reference level that are sampled from the signal amplified with the amplification factor A1 is held as the signal component of the amplification factor A1 detected by the CDS.

With the output voltage Vout3 of the signal level being input to the comparator PA2 through the capacitor C23, a triangular wave is applied as the reference voltage VREF2 and the output voltage Vout3 of the signal level and the reference voltage VREF2 are compared with each other. The high level of the output voltage Vout5 is maintained until the level of the output voltage Vout3 of the signal level is matched with the level of the reference voltage VREF2, the up-down counter UD2 executes the up-counting operation until the level of the output voltage Vout5 is inverted into a low level, and the difference between the output voltage Vout3 of the signal level and the output voltage Vout3 of the reference level is converted into a digital value D and is transmitted to the line memory LM2. As a result, in the line memory LM2, the difference between the second signal level and the second reference level that are sampled from the signal amplified with the amplification factor A2 is held as the signal component of the amplification factor A2 detected by the CDS.

In this case, even when the up-counting operation is executed on the basis of the output voltage Vout2 of the signal level of the amplification factor A1 after the down-counting operation is executed on the basis of the output voltage Vout2 of the reference level of the amplification factor A1 and the reference level is overlapped when reading the signal level, the overlapped reference level can be cancelled and the signal component of the amplification factor A1 can be effectively detected by the CDS.

Even when the up-counting operation is executed on the basis of the output voltage Vout3 of the signal level of the amplification factor A2 after the down-counting operation is executed on the basis of the output voltage Vout3 of the reference level of the amplification factor A2 and the reference level is overlapped when reading the signal level, the overlapped reference level can be cancelled and the signal component of the amplification factor A2 can be effectively detected by the CDS.

Since the amplification factors A1 and A2 are adjusted by configuring the differential amplifying circuit by the column amplifying circuits 3-1b and 3-2b, the capacitor does not need to be used. As compared with the case in which the switched capacity type amplifying circuits are used as the column amplifying circuits 3-1a and 3-2a of FIG. 2, an area can be reduced.

By configuring the differential amplifying circuit by the column amplifying circuits 3-1b and 3-2b, the current that flows to the constant current transistor TL can be used as the bias current of the column amplifying circuits 3-1b and 3-2b, and the bias current of the column amplifying circuits 3-1b and 3-2b does not need to be set independently from the source follower circuit configured by the amplification transistor Tb and the constant current transistor TL. Therefore, power consumption can be reduced.

By configuring the differential amplifying circuit by the column amplifying circuits 3-1b and 3-2b, the same-phase component of the differential input can be cancelled. Therefore, an S/N ratio of each column can be improved.

If the amplification factor A2 is set to be larger than the amplification factor A1, preferably, sampling is executed in the order of sampling of the reference level of the amplification factor A1→sampling of the reference level of the amplification factor A2→sampling of the signal level of the amplification factor A2→sampling of the signal level of the amplification factor A1 and the sampling of the reference level of the amplification factor A2 and the sampling of the signal level of the amplification factor A2 are continuously executed.

Thereby, as compared with the case in which sampling is executed in the order of sampling of the reference level of the amplification factor A1→sampling of the reference level of the amplification factor A2→sampling of the signal level of the amplification factor A1→sampling of the signal level of the amplification factor A2, a digital CDS time TD with respect to a signal having the low signal level can be reduced. For this reason, 1/f noise or RTS noise with respect to the signal having the low signal level can be reduced and an image quality can be improved.

Fourth Embodiment

Figure 7:
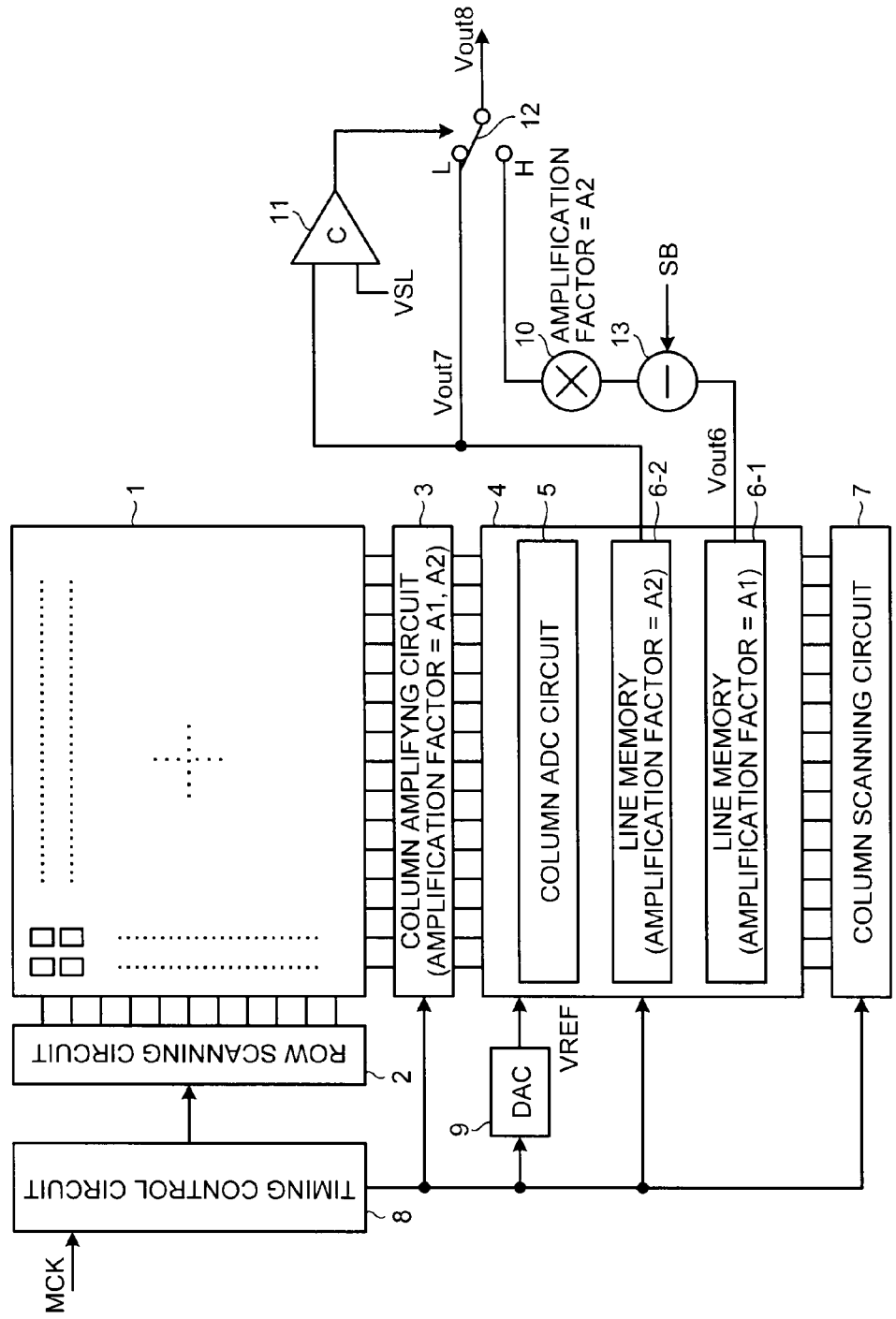
FIG. 7 is a block diagram of a schematic configuration of a solid-state imaging device according to a fourth embodiment.

FIG. 7 a block diagram of a schematic configuration of a solid-state imaging device according to a fourth embodiment.

In FIG. 7, the solid-state imaging device includes a column amplifying circuit 3, a sample and hold signal converting circuit 4, a column scanning circuit 7, and a D/A converter 9, instead of the column amplifying circuits 3-1 and 3-2, the sample and hold signal converting circuits 4-1 and 4-2, the column scanning circuits 7-1 and 7-2, and the D/A converters 9-1 and 9-2 of FIG. 1. In the solid-state imaging device, a subtractor 13 that adjusts a black level with respect to a signal component of each pixel PCn may be provided.

The column amplifying circuit 3 can switch the amplification factors of the signals read from each pixel PC with the amplification factors A1 and A1 and amplify the signals for each column. The sample and hold signal converting circuit 4 can detect the signal component of each pixel PC amplified with the amplification factors A1 and A2 by the CDS. The column scanning circuit 7 can execute a scanning operation in a horizontal direction to read the signals stored in the line memories 6-1 and 6-1 of the sample and hold signal converting circuit 4. The D/A converter 9 can output the reference voltage VREF to the sample and hold signal converting circuit 4.

The sample and hold signal converting circuit 4 can sample the first reference level and the first signal level from the signal of each pixel PC amplified with the amplification factor A1 and can detect the signal component of each pixel PC by the CDS. The sample and hold signal converting circuit 4 can sample the second reference level and the second signal level from the signal of each pixel PC amplified with the amplification factor A2 and can detect the signal component of each pixel PC by the CDS.

The sample and hold signal converting circuit 4 includes a column ADC circuit 5 that executes the up-counting operation and the down-counting operation on the basis of the comparison result of the read signal from the pixel PC amplified with the amplification factors A1 and A2 and the reference voltage VREF and calculates the difference between the reference level and the signal level of the CDS, a line memory 6-1 that stores a count value of the column ADC circuit 5 with respect to the signal amplified with the amplification factor A1 by the amount of horizontal pixels, and a line memory 6-2 that stores a count value of the column ADC circuit 5 with respect to the signal amplified with the amplification factor A2 by the amount of horizontal pixels.

If the pixels PC are scanned in a vertical direction by the row scanning circuit 2, the pixels PC of the row direction are selected and the signals that are read from the pixels PC are transmitted to the column amplifying circuit 3 through the vertical signal line Vlin. After the signals read from the pixels PC are amplified with the amplification factors A1 and A2 by the column amplifying circuit 3, the signals are transmitted to the sample and hold signal converting circuit 4.

In the sample and hold signal converting circuit 4, the first reference level and the first signal level are sampled from the signal of each pixel PC amplified with the amplification factor A1, the difference between the first signal level and the first reference level is taken, and the signal component of each pixel PC is detected by the CDS and is output as the output signal Vout6.

In the sample and hold signal converting circuit 4, the second reference level and the second signal level are sampled from the signal of each pixel PC amplified with the amplification factor A2, the difference between the second signal level and the second reference level is taken, and the signal component of each pixel PC is detected by the CDS and is output as the output signal Vout7.

In this case, in the column ADC circuit 5, after the down-counting operation is executed until the first reference level sampled from the signal of each pixel PC amplified with the amplification factor A1 is matched with the level of the reference voltage VREF, the up-counting operation is executed until the first signal level sampled from the signal of each pixel PC amplified with the amplification factor A1 is matched with the level of the reference voltage VREF, and the signal component of the amplification factor A1 that is detected by the CDS is converted into a digital value and is held in the line memory 6-1 by the amount of horizontal pixels.

In the column ADC circuit 5, after the down-counting operation is executed until the second reference level sampled from the signal of each pixel PC amplified with the amplification factor A2 is matched with the level of the reference voltage VREF, the up-counting operation is executed until the second signal level sampled from the signal of each pixel PC amplified with the amplification factor A2 is matched with the level of the reference voltage VREF, and the signal component of the amplification factor A2 that is detected by the CDS is converted into a digital value and is held in the line memory 6-2 by the amount of horizontal pixels.

In the subtractor 13, the black level SB is subtracted from the output signal Vout6 according to necessity, the black level of the output signal Vout6 is adjusted, and the output signal is output to the multiplier 10.

In this case, even when the reference level is sampled for each of the amplification factors A1 and A2 by the sample and hold signal converting circuit 4 and the amplification factors A1 and A2 are switched, the noise can be effectively suppressed by the CDS.

By switching the amplification factors A1 and A2 by the column amplifying circuit 3, the column amplifying circuits 3-1 and 3-2 and the sample and hold signal converting circuits 4-1 and 4-2 of FIG. 1 do not need to be provided for each of the amplification factors A1 and A2, and a circuit scale can be suppressed from increasing.

Fifth Embodiment

Figure 8:
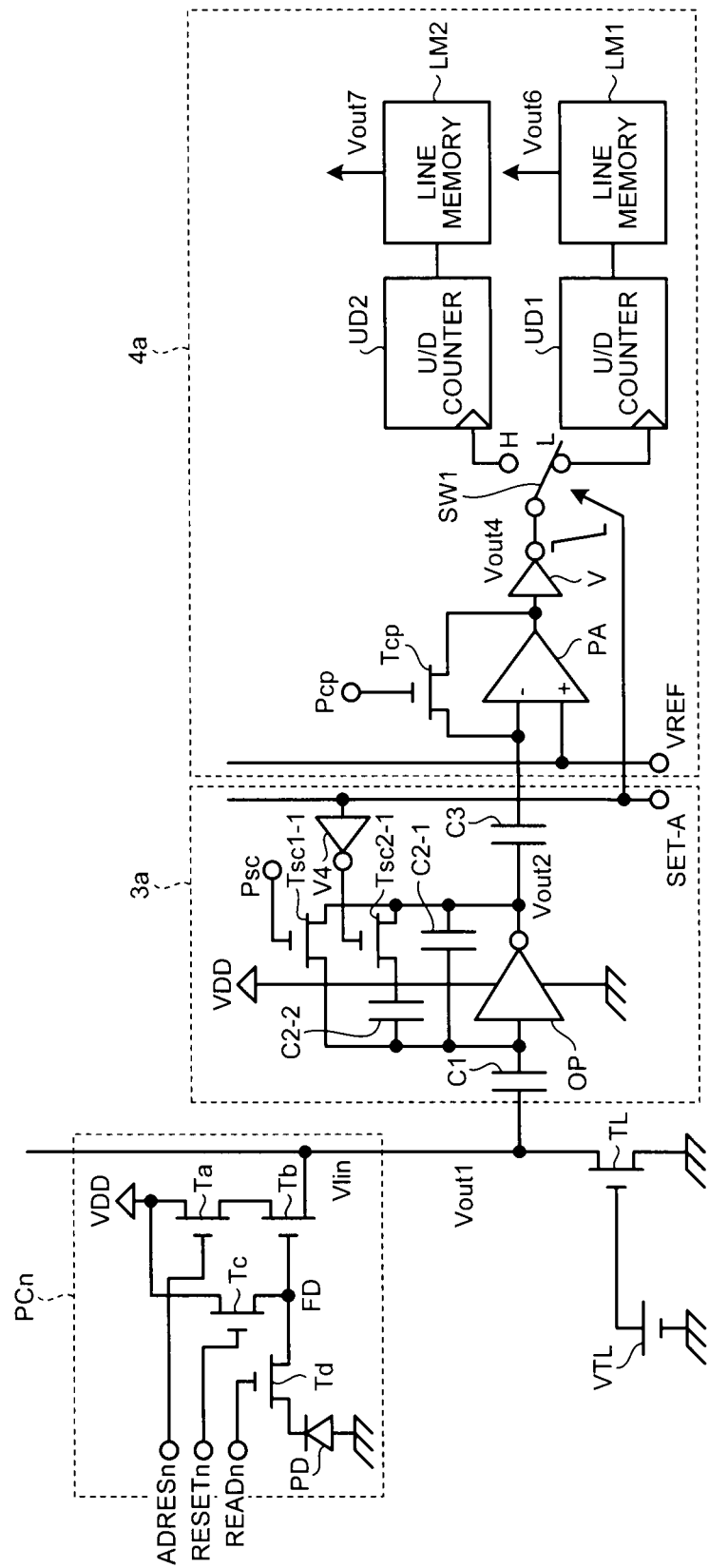
FIG. 8 is a circuit diagram of a schematic configuration of one column of a solid-state imaging device according to a fifth embodiment.

FIG. 8 is a circuit diagram of a schematic configuration of one column of a solid-state imaging device according to a fifth embodiment.

In FIG. 8, the solid-state imaging device includes a column amplifying circuit 3a and a sample and hold signal converting circuit 4a, instead of the column amplifying circuits 3-1a and 3-2a and the sample and hold signal converting circuits 4-1a and 4-2a of FIG. 2.

In the column amplifying circuit 3a, capacitors C1, C2-1, C2-2, and C3, an operational amplifier OP, an inverter V4, and switch transistors Tsc1-1 and Tsc2-1 are provided for each column. The vertical signal line Vlin is connected to an input terminal of the operational amplifier OP through the capacitor C1 and the capacitor C2-1 is connected between the input terminal and an output terminal of the operational amplifier OP. The switch transistor Tsc1-1 is connected in parallel to the capacitor C2-1. A series circuit of the switch transistor Tsc2-1 and the capacitor C2-2 is connected in parallel to the capacitor C2-1. The reset pulse Psc is input to the gate of the switch transistor Tsc1-1 and a switching signal SET-A is input to the gate of the switch transistor Tsc2-1 through an inverter V4.

In the column amplifying circuit 3a, the amplification factors A1 and A2 can be switched by turning on/off the switch transistor Tsc2-1. For example, when the switch transistor Tsc2-1 is turned on, the amplification factor A1 of the column amplifying circuit 3a is applied as $C_1/(C_{2-1}+C_{2-2})$. When the switch transistor Tsc2-1 is turned off, the amplification factor A2 of the column amplifying circuit 3a is applied as $C_1/C_{2-1}$. In this case, a capacitance value of the capacitor C1 is set as $C_1$, a capacitance value of the capacitor C2-1 is set as $C_{2-1}$, and a capacitance value of the capacitor C2-2 is set as $C_{2-2}$.

In the sample and hold signal converting circuit 4a, a comparator PA, a switch transistor Tcp, an inverter V, a switch SW1, up-counters UD1 and UD2, and line memories LM1 and LM2 are provided for each column.

An output terminal of the operational amplifier OP is connected to an inverting input terminal of the comparator PA through a capacitor C3 and the reference voltage VREF is input to a non-inverting input terminal of the comparator PA. The switch transistor Tcp is connected between the inverting input terminal and the output terminal of the comparator PA. The output terminal of the comparator PA is connected to the switch SW1 through the inverter V, and the L side of the switch SW1 is connected to the up-down counter UD1 and the H side thereof is connected to the up-down counter UD2.

Figure 9:
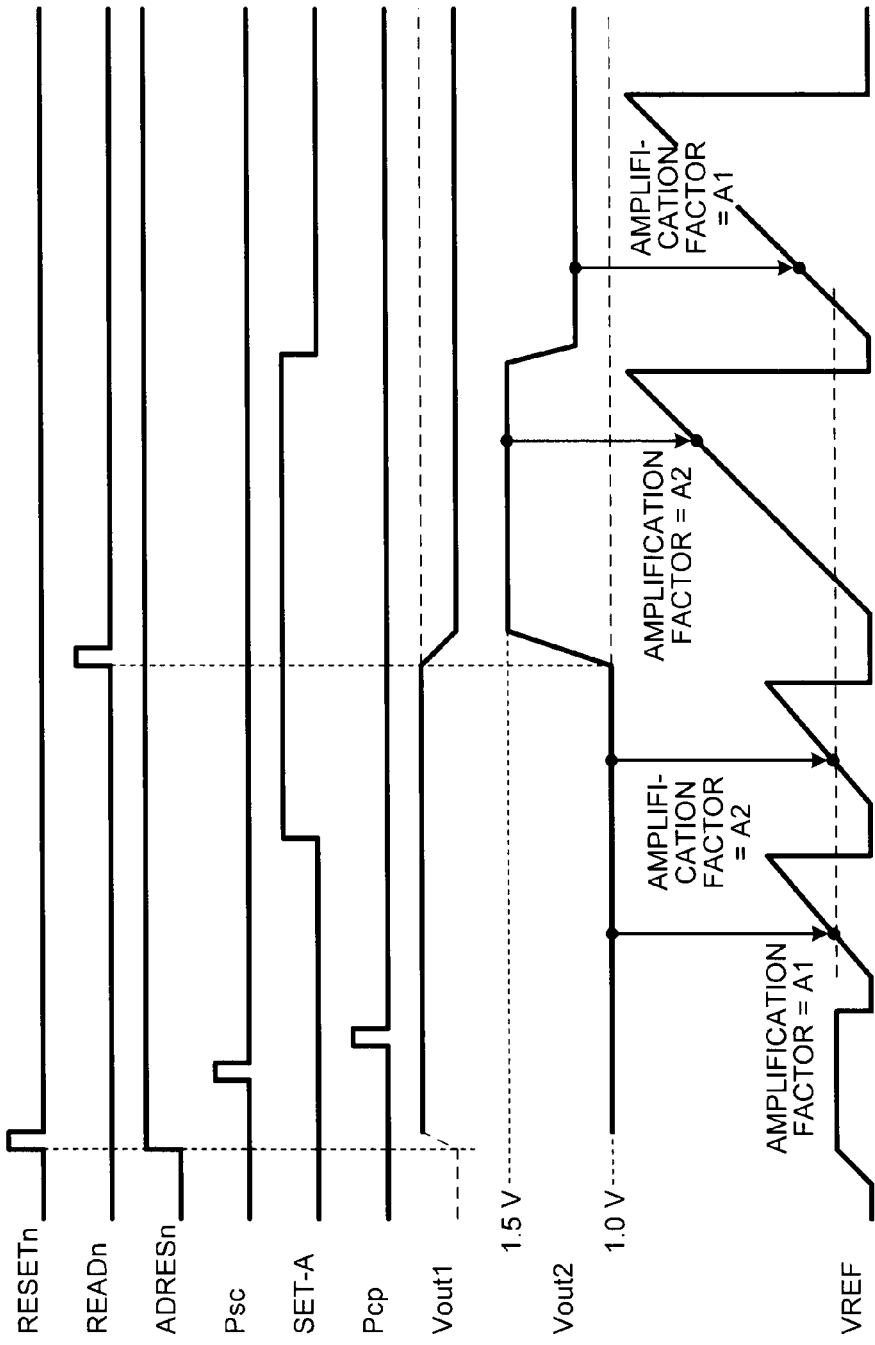
FIG. 9 is a timing chart illustrating a read operation of one pixel of the solid-state imaging device of FIG. 8.

FIG. 9 is a timing chart illustrating a read operation of one pixel of the solid-state imaging device of FIG. 8.

In FIG. 9, when a level of the switching signal SET-A is set to a low level, the switching signal SET-A is inverted by the inverter V4 and the level thereof becomes a high level. If the switch transistor Tsc2-1 is turned on, the amplification factor of the column amplifying circuit 3a is set to A1. When the level of the switching signal SET-A is set to a low level, the switch SW1 is switched to the L side.

If a level of the row selection signal ADRESn becomes a high level, the row selection transistor Ta of the pixel PCn is turned on, the power supply potential VDD is applied to the drain of the amplification transistor Tb, and a source follower is configured by the amplification transistor Tb and the constant current transistor TL.

If the level of the reset signal RESETn becomes a high level with the row selection transistor Ta being turned on, the reset transistor Tc is turned on, and a voltage according to a reference level of the floating diffusion FD is applied to the gate of the amplification transistor Tb and is output as the output voltage Vout1 of the reference level to the vertical signal line Vlin.

When the output voltage Vout1 of the reference level is output to the vertical signal line Vlin, if the reset pulse Psc is applied to the gate of the switch transistor Tsc1-1, the input voltage of the operational amplifier OP is clamped with the output voltage and an operation point is set. At this time, the voltage difference with respect to the vertical signal line Vlin is held in the capacitor C1 and an input voltage of the operational amplifier OP is set to zero.

When the output voltage Vout1 of the reference level is output to the vertical signal line Vlin, if the reset pulse Pcp is applied to the gate of the switch transistor Tcp, the input voltage of the inverting input terminal of the comparator PA is clamped with the output voltage and an operation point is set. At this time, the voltage difference with respect to the output voltage Vout2 from the operational amplifier OP is held in the capacitor C3 and an input voltage of the comparator PA is set to zero.

After the switch transistor Tsc1-1 is turned off, if the input voltage of the operational amplifier OP is changed, the voltage is fed back from the capacitors C2-1 and C2-2, such that the input voltage becomes the zero voltage. As a result, the output voltage Vout2 that is inverted and amplified with the amplification factor A1 is output from the operational amplifier OP and is applied to the inverting input terminal of the comparator PA through the capacitor C3.

With the output voltage Vout2 of the reference level of the amplification factor A1 being input to the comparator PA through the capacitor C3 after the switch transistor Tcp is turned off, a triangular wave is applied as the reference voltage VREF and the output voltage Vout2 of the reference level of the amplification factor A1 and the reference voltage VREF are compared with each other. After the output voltage of the comparator PA is inverted by the inverter V, the output voltage is input as the output voltage Vout4 to the up-down counter UD1 through the switch SW1.

The high level of the output voltage Vout4 is maintained until the output voltage Vout2 of the reference level of the amplification factor A1 is matched with the level of the reference voltage VREF, the up-down counter UD1 executes the down-counting operation until the level of the output voltage Vout4 is inverted into a low level, and the output voltage Vout2 of the reference level of the amplification factor A1 is converted into a digital value D and is held as the first reference level of the signal amplified with the amplification factor A1 in the up-down counter UD1.

Next, if the level of the switching signal SET-A changes to a high level, the switching signal SET-A is inverted by the inverter V4 and the level thereof becomes a low level. If the switch transistor Tsc2-1 is turned off, the amplification factor of the column amplifying circuit 3a is set to A2. When the level of the switching signal SET-A is set to a high level, the switch SW1 is switched to the H side.

After the level of the switching signal SET-A changes to a high level, if the input voltage of the operational amplifier OP changes, the voltage is fed back from the capacitor C2-1, such that the input voltage becomes the zero voltage. As a result, the output voltage Vout2 that is inverted and amplified with the amplification factor A2 is output from the operational amplifier OP and is applied to the inverting input terminal of the comparator PA through the capacitor C3.

With the output voltage Vout2 of the reference level of the amplification factor A2 being input to the comparator PA through the capacitor C3, a triangular wave is applied as the reference voltage VREF and the output voltage Vout2 of the reference level of the amplification factor A2 and the reference voltage VREF are compared with each other. After the output voltage of the comparator PA is inverted by the inverter V, the output voltage is input as the output voltage Vout4 to the up-down counter UD2 through the switch SW1.

The high level of the output voltage Vout4 is maintained until the output voltage Vout2 of the reference level of the amplification factor A2 is matched with the level of the reference voltage VREF, the up-down counter UD2 executes the down-counting operation until the level of the output voltage Vout4 is inverted into a low level, and the output voltage Vout2 of the reference level of the amplification factor A2 is converted into a digital value D and is held as the second reference level of the signal amplified with the amplification factor A2 in the up-down counter UD2.

Next, if the level of the read signal READn becomes a high level with the row selection transistor Ta of the pixel PCn being turned on, the read transistor Td is turned on, the charges that are accumulated in the photodiode PD are transmitted to the floating diffusion FD. A voltage according to a signal level of the floating diffusion FD is applied to the gate of the amplification transistor Tb and is output as the output voltage Vout1 of the signal level to the vertical signal line Vlin.

If the output voltage Vout1 of the signal level is applied to the input terminal of the operational amplifier OP through the capacitor C1 and the input voltage of the operational amplifier OP changes, the voltage is fed back from the capacitor C2-1 such that the input voltage becomes a zero voltage. As a result, the output voltage Vout2 of the signal level that is inverted and amplified with the amplification factor A2 is output from the operational amplifier OP and is applied to the inverting input terminal of the comparator PA through the capacitor C3.

With the output voltage Vout2 of the signal level of the amplification factor A2 being input to the comparator PA through the capacitor C3, a triangular wave is applied as the reference voltage VREF and the output voltage Vout2 of the signal level and the output voltage Vout2 of the signal level of the amplification factor A2 and the reference voltage VREF are compared with each other. After the output voltage of the capacitor PA is inverted by the inverter V, the output voltage is input as the output voltage Vout4 to the up-down counter UD2 through the switch SW1.

The high level of the output voltage Vout4 is maintained until the level of the output voltage Vout2 of the signal level of the amplification factor A2 is matched with the level of the reference voltage VREF, the up-down counter UD2 executes the up-counting operation until the level of the output voltage Vout4 is inverted into a low level, and the difference between the output voltage Vout2 of the signal level of the amplification factor A2 and the output voltage Vout2 of the reference level is converted into a digital value D and is transmitted to the line memory LM2. As a result, in the line memory LM2, the difference between the second signal level and the second reference level that are sampled from the signal amplified with the amplification factor A2 is held as the signal component of the amplification factor A2 detected by the CDS.

Next, if the level of the switching signal SET-A changes to a low level, the switching signal SET-A is inverted by the inverter V4 and the level thereof becomes a high level. The switch transistor Tsc2-1 is turned on and the amplification factor of the column amplifying circuit 3a is set to A1. If the level of the switching signal SET-A changes to a low level, the switch SW1 is switched to the L side.

With the output voltage Vout2 of the signal level of the amplification factor A1 being input to the comparator PA through the capacitor C3, a triangular wave is applied as the reference voltage VREF and the output voltage Vout2 of the signal level of the amplification factor A1 and the reference voltage VREF are compared with each other. After the output voltage of the comparator PA is inverted by the inverter V, the output voltage is input as the output voltage Vout4 to the up-down counter UD1 through the switch SW1.

The high level of the output voltage Vout4 is maintained until the output voltage Vout2 of the signal level of the amplification factor A1 is matched with the level of the reference voltage VREF, the up-down counter UD1 executes the up-counting operation until the level of the output voltage Vout4 is inverted into a low level, and the difference between the output voltage Vout2 of the signal level of the amplification factor A1 and the output voltage Vout2 of the reference voltage is converted into a digital value D and is transmitted to the line memory LM1. As a result, in the line memory LM1, the difference between the first signal level and the first reference level that are sampled from the signal amplified with the amplification factor A1 is held as the signal component of the amplification factor A1 detected by the CDS.

In this case, even when the first reference level and the first signal level are sampled before the amplification factor of the signal read from the pixel PCn is switched and the second reference level and the second signal level are sampled after the amplification factor of the signal read from the pixel PCn is switched and the amplification factor of the signal read from the pixel PCn is switched, the reference level according to the amplification factor can be cancelled and an effect of suppressing noise based on the CDS can be improved.

In the fifth embodiment, since the black level is cancelled in both the signal component of the amplification factor A1 and the signal component of the amplification factor A2, the black level does not need to be adjusted by the subtractor 13 of FIG. 7.

Sixth Embodiment

Figure 10:
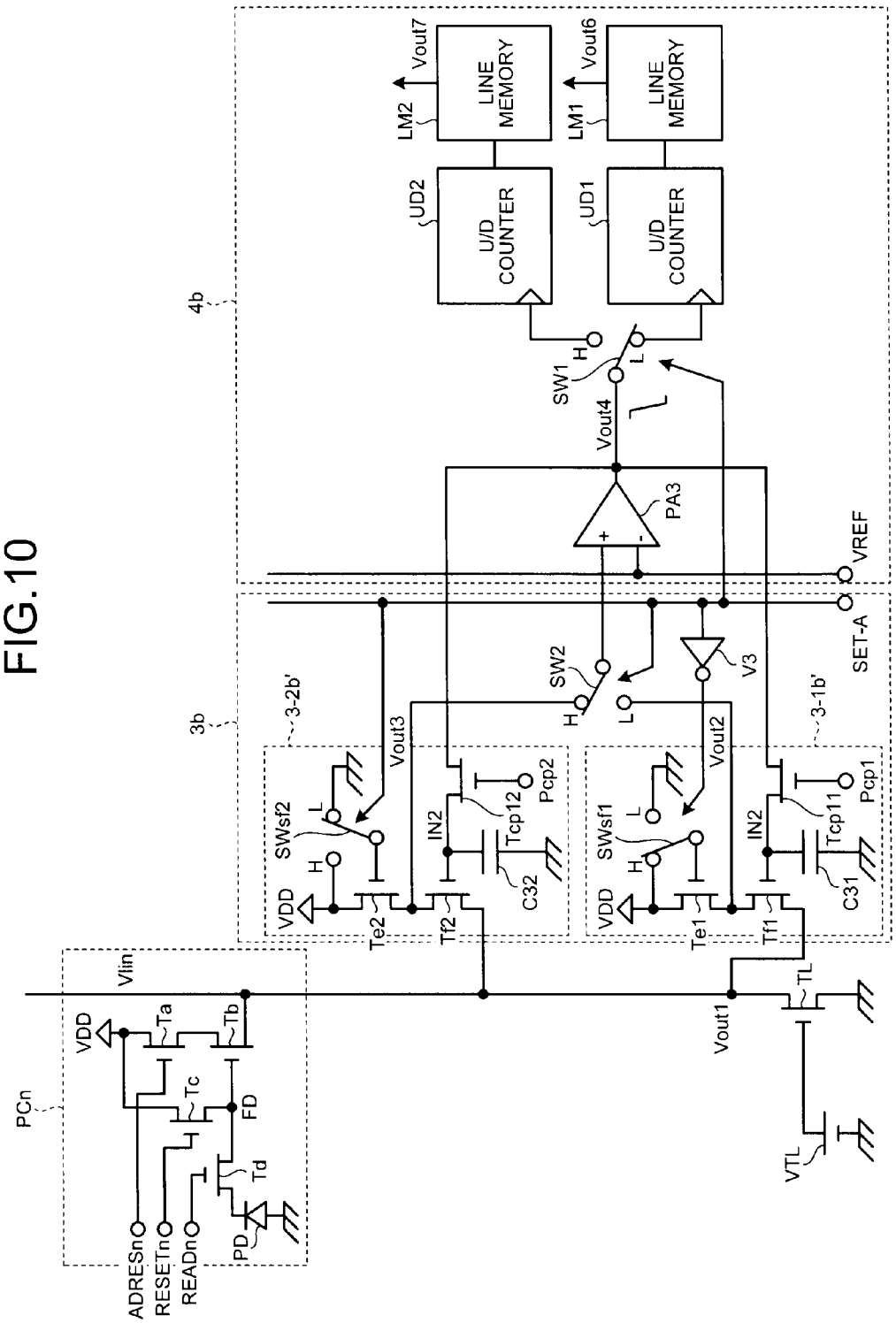
FIG. 10 is a circuit diagram of a schematic configuration of one column of a solid-state imaging device according to a sixth embodiment.

FIG. 10 is a circuit diagram of a schematic configuration of one column of a solid-state imaging device according to a sixth embodiment.

In FIG. 10, the solid-state imaging device includes a column amplifying circuit 3*b* and a sample and hold signal converting circuit 4*b*, instead of the column amplifying circuit 3*a* and the sample and hold signal converting circuit 4*a* of FIG. 8.

In the column amplifying circuit 3*b*, column amplifying circuits 3-1*b*' and 3-2*b*', a switch SW2, and an inverter V3 are provided. In this case, the amplification factor of the column amplifying circuit 3-1*b*' is set to A1 and the amplification factor of the column amplifying circuit 3*b*-2' is set to A2.

In the column amplifying circuit 3-1*b*', an amplification transistor Tf1 and a load transistor Te1 are provided for each column. A source of the amplification transistor Tf1 is connected to the vertical signal line Vlin and a drain thereof is connected to a source of the load transistor Te1. A gate of the amplification transistor Tf1 is connected to the ground through the capacitor C31 and is connected to an output terminal of a comparator PA3 through the switch transistor Tcp11. A drain of the load transistor Te1 is connected to the power supply VDD and a gate thereof is connected to a switch SWsf1.

In the column amplifying circuit 3-2*b*', an amplification transistor Tf2 and a load transistor Te2 are provided for each column. A source of the amplification transistor Tf2 is connected to the vertical signal line Vlin and a drain thereof is connected to a source of the load transistor Te2. A gate of the amplification transistor Tf2 is connected to the ground through the capacitor C32 and is connected to the output terminal of the comparator PA3 through the switch transistor Tcp12. A drain of the load transistor Te2 is connected to the power supply VDD and a gate thereof is connected to a switch SWsf2.

The switch SWsf1 is switched by a signal obtained by inverting the switching signal SET-A by the inverter V3 and the switch SWsf2 is switched by the switching signal SET-A. The L side of the switch SW2 is connected to the drain of the amplification transistor Tf1 and the H side thereof is connected to the drain of the amplification transistor Tf2. The reset pulse Pcp1 is input to the gate of the switch transistor Tcp11 and the reset pulse Pcp2 is input to the gate of the switch transistor Tcp12.

In the sample and hold signal converting circuit 4*b*, instead of the comparator PA, the switch transistor Tcp, and the inverter V of the sample and hold signal converting circuit 4*a* of FIG. 8, the comparator PA3 is provided.

In this case, a non-inverting terminal of the comparator PA3 is connected to the switch SW2, a reference voltage VREF is applied to an inverting input terminal of the comparator PA3, and an output terminal of the comparator PA3 is connected to the switch SW1.

Figure 11:
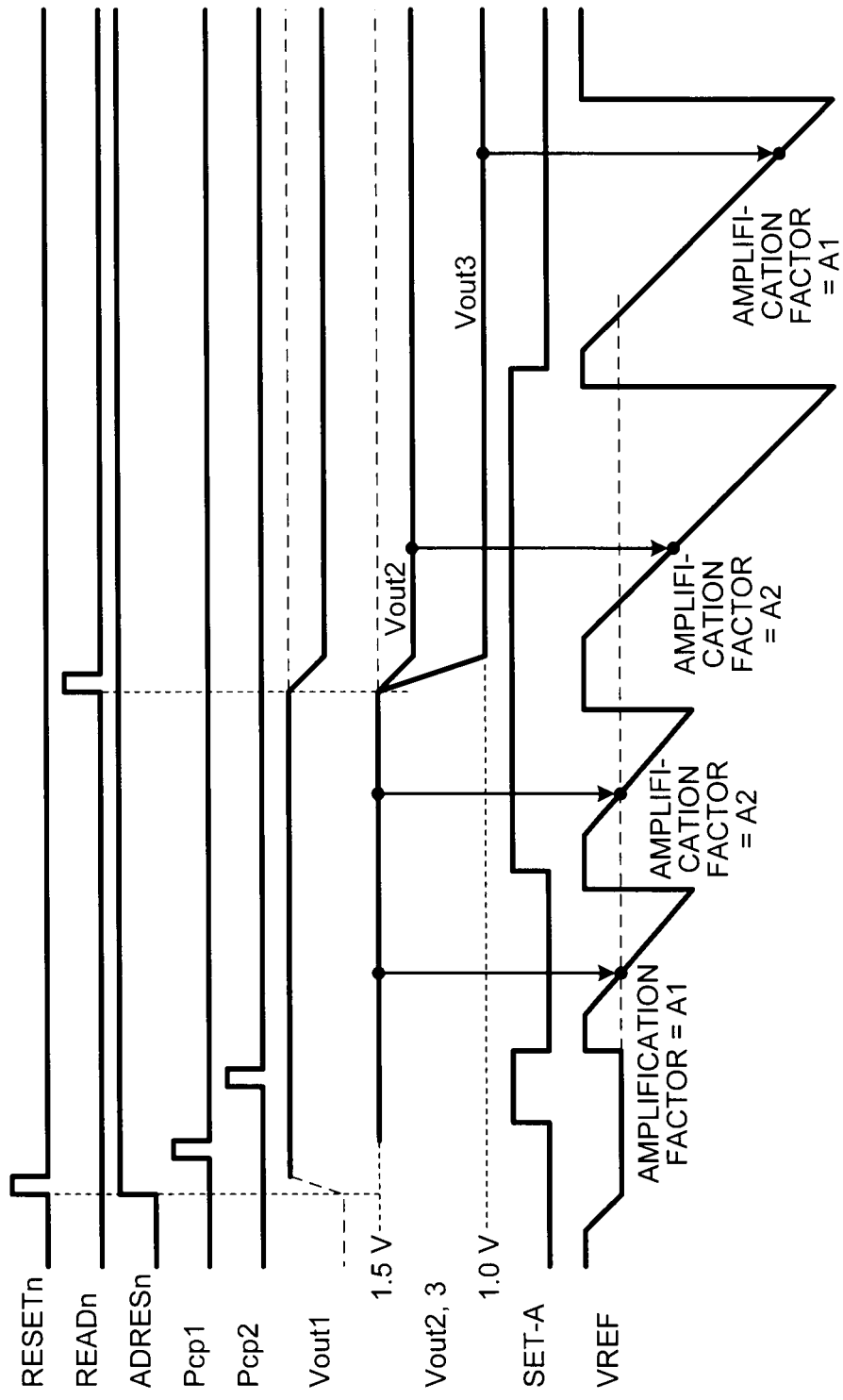
FIG. 11 is a timing chart illustrating a read operation of one pixel of the solid-state imaging device of FIG. 10.

FIG. 11 is a timing chart illustrating a read operation of one pixel of the solid-state imaging device of FIG. 10.

In FIG. 11, when the level of the switching signal SET-A is set to a low level, the switch SWsf2 is switched to the L side, the switching signal SET-A is inverted by the inverter V3 and the level thereof becomes a high level, and the switch SWsf1 is switched to the H side. When the level of the switching signal SET-A is set to a low level, the switches SW1 and SW2 are switched to the L side.

If the level of the row selection signal ADRESn becomes a high level, the row selection transistor Ta of the pixel PC is turned on, the power supply potential VDD is applied to the drain of the amplification transistor Tb, and a source follower is configured by the amplification transistor Tb and the constant current transistor TL.

If the level of the reset signal RESETn becomes a high level with the row selection transistor Ta being turned on, the reset transistor Tc is turned on and a voltage according to the reference level of the floating diffusion FD is applied to the gate of the amplification transistor Tb and is output as the output voltage Vout1 of the reference level to the vertical signal line Vlin.

If the output voltage Vout1 of the reference level is applied to the source of the amplification transistor Tf1 with the switch SWsf1 being switched to the H side, the output voltage Vout2 of the reference level of the amplification factor A1 is output from the drain of the amplification transistor Tf1.

When the signal of the reference level is output to the vertical signal line Vlin, if the reset pulse Pcp1 is input to the gate of the switch transistor Tcp11, the output voltage Vout4 of the comparator PA3 is held in the capacitor C31 and is applied to the gate of the amplification transistor Tf1, and a bias voltage is applied.

Next, if the level of the switching signal SET-A changes to a high level, the switch SWsf2 is switched to the H side, the switching signal SET-A is inverted by the inverter V3 and the level thereof becomes a low level, and the switch SWsf1 is switched to the L side. If the level of the switching signal SET-A changes to a high level, the switches SW1 and SW2 are switched to the H side.

If the output voltage Vout1 of the reference level is applied to the source of the amplification transistor Tf2 with the switch SWsf2 being switched to the H side, the output voltage Vout3 of the reference level of the amplification factor A2 is output from the drain of the amplification transistor Tf2.

When the signal of the reference level is output to the vertical signal line Vlin, if the reset pulse Pcp2 is input to the gate of the switch transistor Tcp12, the output voltage Vout4 of the comparator PA3 is held in the capacitor C32 and is applied to the gate of the amplification transistor Tf2, and a bias voltage is applied.

Next, if the level of the switching signal SET-A changes to a low level, the switch SWsf2 is switched to the L side, the switching signal SET-A is inverted by the inverter V3 and the level thereof becomes a high level, and the switch SWsf1 is switched to the H side. If the level of the switching signal SET-A changes to a low level, the switches SW1 and SW2 are switched to the L side.

Then, with the output voltage Vout2 of the reference level of the amplification factor A1 being input to the comparator PA3 through the switch SW2, a triangular wave is applied as the reference voltage VREF and the output voltage Vout2 of the reference level of the amplification factor A1 and the reference voltage VREF are compared with each other. The high level of the output voltage Vout4 is maintained until the level of the output voltage Vout2 of the reference level of the amplification factor A1 is matched with the level of the reference voltage VREF, the up-down counter UD1 executes the down-counting operation until the level of the output voltage Vout4 is inverted into a low level, and the output voltage Vout2 of the reference level of the amplification factor A1 is converted into a digital value D and is held as the first reference level of the signal amplified with the amplification factor A1 in the up-down counter UD1.

Next, if the level of the switching signal SET-A changes to the high level, the switch SWsf2 is switched to the H side, the switching signal SET-A is inverted by the inverter V3 and the level thereof becomes a low level, and the switch SWsf1 is switched to the L side. If the level of the switching signal SET-A changes to a high level, the switches SW1 and SW2 are switched to the H side.

Then, with the output voltage Vout3 of the reference level of the amplification factor A2 being input to the comparator PA3 through the switch SW2, a triangular wave is applied as the reference voltage VREF and the output voltage Vout3 of the reference level of the amplification factor A2 and the reference voltage VREF are compared with each other. The high level of the output voltage Vout4 is maintained until the output voltage Vout3 of the reference level of the amplification factor A2 is matched with the level of the reference voltage VREF, the up-down counter UD2 executes the down-counting operation until the level of the output voltage Vout4 is inverted into a low level, and the output voltage Vout3 of the reference level of the amplification factor A2 is converted into a digital value D and is held as the second reference level of the signal amplified with the amplification factor A2 in the up-down counter UD2.

If the level of the read signal READn becomes a high level with the row selection transistor Ta of the pixel PCn being turned on, the read transistor Td is turned on and the charges that are accumulated in the photodiode PD are transmitted to the floating diffusion FD. In addition, a voltage according to the signal level of the floating diffusion FD is applied to the gate of the amplification transistor Tb and is output as the output voltage Vout1 of the signal level to the vertical signal line Vlin.

If the output voltage Vout1 of the signal level is applied to the source of the amplification transistor Tf1, the output voltage Vout2 of the signal level of the amplification factor A2 is output from the drain of the amplification transistor Tf1.

Then, with the output voltage Vout3 of the signal level of the amplification factor A2 being input to the comparator PA through the switch SW2, a triangular wave is applied as the reference voltage VREF and the output voltage Vout3 of the signal level of the amplification factor A2 and the reference voltage VREF are compared with each other. The high level of the output voltage Vout4 is maintained until the level of the output voltage Vout3 of the signal level of the amplification factor A2 is matched with the level of the reference voltage VREF, the up-down counter UD2 executes the up-counting operation until the level of the output voltage Vout4 is inverted into a low level, and the difference between the output voltage Vout3 of the signal level of the amplification factor A2 and the output voltage Vout3 of the reference level is converted into a digital value D and is transmitted to the line memory LM2. As a result, in the line memory LM2, the difference between the second signal level and the second reference level that are sampled from the signal amplified with the amplification factor A2 is held as the signal component of the amplification factor A2 detected by the CDS.

Next, if the level of the switching signal SET-A changes to a low level, the switch SWsf2 is switched to the L side, the switching signal SET-A is inverted by the inverter V3 and the level thereof becomes a high level, and the switch SWsf1 is switched to the H side. If the level of the switching signal SET-A changes to a low level, the switches SW1 and SW2 are switched to the L side.

Then, with the output voltage Vout2 of the reference level of the amplification factor A1 being input to the comparator PA through the switch SW2, a triangular wave is applied as the reference voltage VREF and the output voltage Vout2 of the signal level of the amplification factor A1 and the reference voltage VREF are compared with each other. The high level of the output voltage Vout4 is maintained until the level of the output voltage Vout2 of the signal level of the amplification factor A1 is matched with the level of the reference voltage VREF, the up-down counter UD1 executes the up-counting operation until the level of the output voltage Vout4 is inverted into a low level, and the difference between the output voltage Vout2 of the signal level of the amplification factor A1 and the output voltage Vout2 of the reference level is converted into a digital value D and is transmitted to the line memory LM1. As a result, in the line memory LM1, the difference between the first signal level and the first reference level that are sampled from the signal amplified with the amplification factor A1 is held as the signal component of the amplification factor A1 detected by the CDS.

In this case, even when the first reference level and the first signal level of the amplification factor A1 of the signal read from the pixel PCn are sampled and the second reference level and the second signal level of the amplification factor A2 of the signal read from the pixel PCn are sampled and the amplification factor of the signal read from the pixel PCn is switched, the reference level according to the amplification factor can be cancelled and an effect of suppressing noise based on the CDS can be improved.

In the sixth embodiment, since the black level is cancelled in both the signal component of the amplification factor A1 and the signal component of the amplification factor A2, the black level does not need to be adjusted by the subtractor 13 of FIG. 7.

Seventh Embodiment

Figure 12:
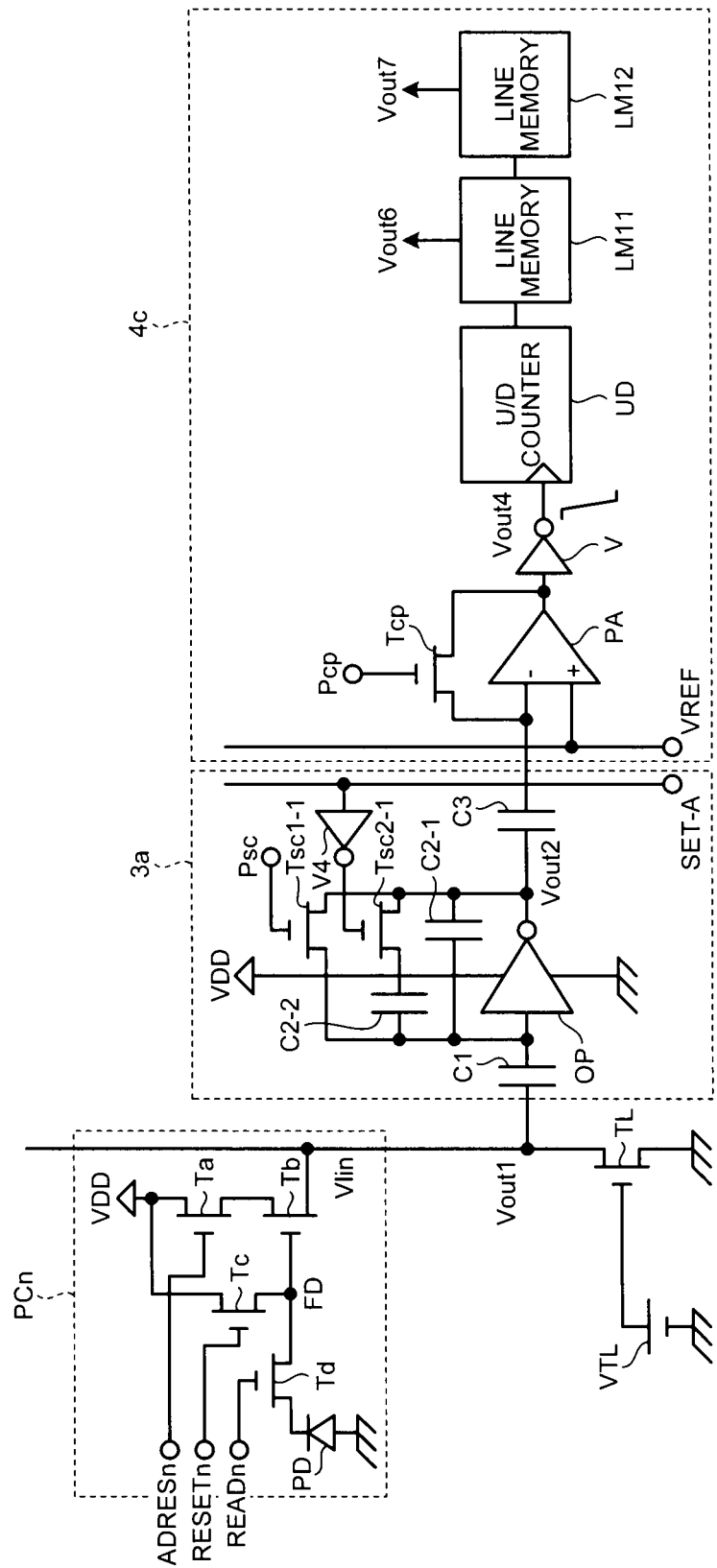
FIG. 12 is a circuit diagram of a schematic configuration of one column of a solid-state imaging device according to a seventh embodiment.

FIG. 12 is a circuit diagram of a schematic configuration of one column of a solid-state imaging device according to a seventh embodiment.

In FIG. 12, a solid-state imaging device includes a sample and hold signal converting circuit 4c, instead of the sample and hold signal converting circuit 4a of FIG. 8.

In this case, in the sample and hold signal converting circuit 4c, instead of the switch SW1, the up-down counters UD1 and UD2, and the line memories LM1 and LM2 of FIG. 8, an up-down counter UD and line memories LM11 and LM12 are provided.

Figure 13:
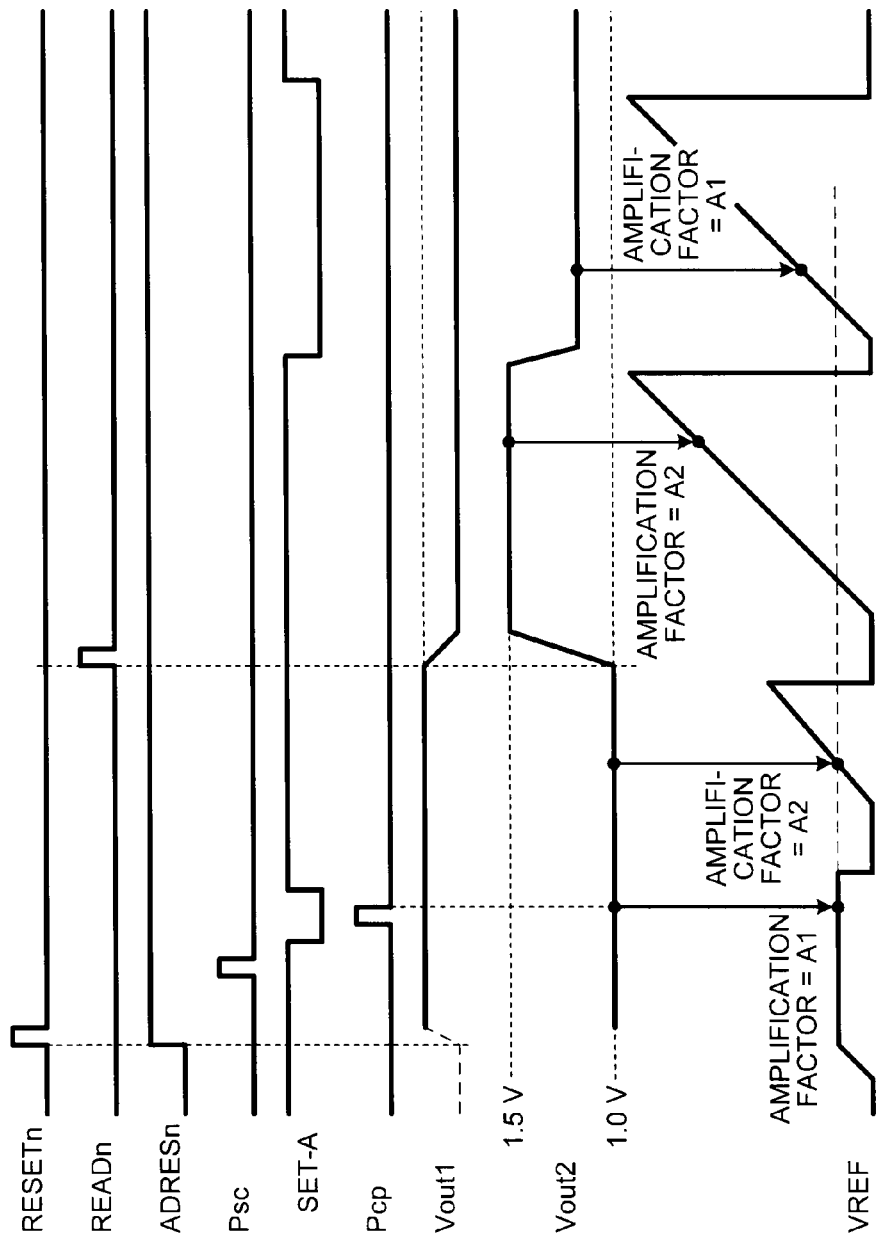
FIG. 13 is a timing chart illustrating a read operation of one pixel of the solid-state imaging device of FIG. 12.

FIG. 13 is a timing chart illustrating a read operation of one pixel of the solid-state imaging device of FIG. 12.

In FIG. 13, when the level of the switching signal SET-A is set to a high level, the switching signal SET-A is inverted by the inverter V4 and the level thereof becomes a low level. The switch transistor Tsc2-1 is turned off and the amplification factor of the column amplifying circuit 3a is set to A2.

If the level of the row selection signal ADRESn becomes a high level, the row selection transistor Ta of the pixel PCn is turned on, the power supply potential VDD is applied to the drain of the amplification transistor Tb, and a source follower is configured by the amplification transistor Tb and the constant current transistor TL.

If the level of the reset signal RESETn becomes a high level with the row selection transistor Ta being turned on, the reset transistor Tc is turned on and a voltage according to the reference level of the floating diffusion FD is applied to the gate of the amplification transistor Tb and is output as the output voltage Vout1 of the reference level to the vertical signal line Vlin.

When the output voltage Vout1 of the reference level of the amplification factor A2 is output to the vertical signal line Vlin, if the reset pulse Psc is applied to the gate of the switch transistor Tsc1-1, the input voltage of the operational amplifier OP is clamped with the output voltage and an operation point is set. At this time, the voltage difference with respect to the vertical signal line Vlin is held in the capacitor C1 and the input voltage of the operational amplifier OP is set to zero.

Next, if the level of the switching signal SET-A changes to a low level, the switching signal SET-A is inverted by the inverter V4 and the level thereof becomes a high level. The switch transistor Tsc2-1 is turned on and the amplification factor of the column amplifying circuit 3a is set to A1.

When the output voltage Vout1 of the reference level of the amplification factor A1 is output to the vertical signal line Vlin, if the reset pulse Pcp is input to the gate of the switch transistor Tcp, the input voltage of the inverting input terminal of the comparator PA is clamped with the output voltage and an operation point is set. At this time, the voltage difference with respect to the output voltage Vout2 from the operational amplifier OP is held in the capacitor C3 and the input voltage of the comparator PA is set to zero. At this time, in the capacitors C1 and C3, a reference level at the time of an analog CDS operation is held.

Next, if the level of the switching signal SET-A changes to a high level, the switching signal SET-A is inverted by the inverter V4 and the level thereof becomes a low level. The switch transistor Tsc2-1 is turned off and the amplification factor of the column amplifying circuit 3a is set to A2.

With the output voltage Vout2 of the reference level of the amplification factor A2 being input to the comparator PA through the capacitor C3, a triangular wave is applied as the reference voltage VREF and the output voltage Vout2 of the reference level of the amplification factor A2 and the reference voltage VREF are compared with each other. After the output voltage of the comparator PA is inverted by the inverter V, the output voltage is input as the output voltage Vout4 to the up-down counter UD.

The high level of the output voltage Vout4 is maintained until the output voltage Vout2 of the reference level of the amplification factor A2 is matched with the level of the reference voltage VREF, the up-down counter UD executes the down-counting operation until the level of the output voltage Vout4 is inverted into a low level, and the output voltage Vout2 of the reference level of the amplification factor A2 is converted into a digital value D and is held as the second reference level of the signal amplified with the amplification factor A2 in the up-down counter UD.

Next, if the level of the read signal READn becomes a high level with the row selection transistor Ta of the pixel PCn being turned on, the read transistor Td is turned on and the charges that are accumulated in the photodiode PD are transmitted to the floating diffusion FD. In addition, a voltage according to the signal level of the floating diffusion FD is applied to the gate of the amplification transistor Tb and is output as the output voltage Vout1 of the signal level to the vertical signal line Vlin.

If the output voltage Vout1 of the signal level is applied to the input terminal of the operational amplifier OP through the capacitor C1 and the input voltage of the operational amplifier OP changes, the voltage is fed back from the capacitor C2-1, such that the input voltage becomes the zero voltage. As a result, the output voltage Vout2 of the signal level that is inverted and amplified with the amplification factor A2 is output from the operational amplifier OP and is applied to the inverting input terminal of the comparator PA through the capacitor C3.

With the output voltage Vout2 of the reference level of the amplification factor A2 being input to the comparator PA through the capacitor C3, a triangular wave is applied as the reference voltage VREF and the output voltage Vout2 of the reference level of the amplification factor A2 and the reference voltage VREF are compared with each other. After the output voltage of the comparator PA is inverted by the inverter V, the output voltage is input as the output voltage Vout4 to the up-down counter UD.

The high level of the output voltage Vout4 is maintained until the output voltage Vout2 of the signal level of the amplification factor A2 is matched with the level of the reference voltage VREF, the up-down counter UD executes the up-counting operation until the level of the output voltage Vout4 is inverted into a low level, and the difference between the output voltage Vout2 of the signal level of the amplification factor A2 and the output voltage Vout2 of the reference level is converted into a digital value D and is transmitted to the line memory LM12. As a result, in the line memory LM12, the difference between the second signal level and the second reference level that are sampled from the signal amplified with the amplification factor A2 is stored as the signal component of the amplification factor A2 detected by the CDS. If the signal component of the amplification factor A2 detected by the CDS is held in the line memory LM12, the up-down counter UD is reset.

Next, if the level of the switching signal SET-A changes to a low level, the switching signal SET-A is inverted by the inverter V4 and the level thereof becomes a high level. The switch transistor Tsc2-1 is turned on and the amplification factor of the column amplifying circuit 3a is set to A1.

With the output voltage Vout2 of the signal level of the amplification factor A1 being input to the comparator PA through the capacitor C3, a triangular wave is applied as the reference voltage VREF and the output voltage Vout2 of the signal level of the amplification factor A1 and the reference voltage VREF are compared with each other. After the output voltage of the comparator PA is inverted by the inverter V, the output voltage is input as the output voltage Vout4 to the up-down counter UD.

The high level of the output voltage Vout4 is maintained until the level of the output voltage Vout2 of the signal level of the amplification factor A1 is matched with the level of the reference voltage VREF, the up-down counter UD executes the up-counting operation until the level of the output voltage Vout4 is inverted into a low level, and the output voltage Vout2 of the signal level of the amplification factor A1 is converted into a digital value D and is transmitted to the line memory LM11. As a result, in the line memory LM11, the analog CDS processed difference between the first signal level and the first reference level stored in the capacitors C1 and C3 is stored.

In this case, even when the first reference level and the first signal level of the amplification factor A1 of the signal read from the pixel PCn are sampled and the second reference level and the second signal level of the amplification factor A2 of the signal read from the pixel PCn are sampled and the amplification factor of the signal read from the pixel PCn is switched, the reference level according to the amplification factor can be cancelled and an effect of suppressing noise based on the CDS can be improved.

By stopping the count operation by the up-down counter UD when sampling the first reference level, the number of up-down counters UD can be reduced and a circuit scale can be reduced.

In the seventh embodiment, since the black level of the signal component of the amplification factor A1 and the black level of the signal component of the amplification factor A2 are matched with each other, the black level is preferably adjusted by the subtractor 13 of FIG. 7.

When the signal level is low (amplification factor=A2), an output of the comparator PA is changed due to the change of the threshold value Vth of the comparator PA disposed for each vertical signal line Vlin or the coupling change when turning off the switch transistor Tcp. For this reason, vertical stripe noise is generated.

In order to suppress the vertical stripe noise from being generated, if the reference level is obtained by down-counting and the signal level is obtained by up-counting, the vertical stripe noise can be cancelled. At this time, the black level becomes 0. This processing is called a digital CDS operation, because the noise (change) of the reference level is stored by the up-down counter UD in a digital manner and the noise is suppressed.

Meanwhile, when the signal level is high (amplification factor=A1), the reference level is held in the capacitors C1 and C3. In the reference level, the reset noise of when the floating diffusion FD is reset or the change of the output of the column amplifying circuit 3a is included. At this time, the reference level of the reference voltage VREF can be set to become 64 levels.

Next, if the signal charges are read from the photodiode PD, the charges are converted into a voltage by the floating diffusion FD and the signal level changes. The output signal Vout2 of the column amplifying circuit 3a also changes in the same way. The change amount is A/D converted as the signal level. As a result, only a signal component where the noise of the reference level is suppressed can be obtained. This processing is called an analog CDS operation, because the noise (change) of the reference level is stored in the capacitors C1 and C3 in an analog manner and the noise is suppressed. During this operation, the black level becomes 64 levels.

When the signal level is high (amplification factor=A1), the noise is not displayed in an image, even though the noise is slightly increased. Therefore, when the signal level is high, by executing only the analog CDS operation, an operation time of the A/D conversion can be reduced, and a high-speed operation can be realized.

When the signal level is high, the analog CDS operation is executed and when the signal level is low, the digital CDS operation is executed. In this case, in order to match the black levels of the output signals Vout6 and Vout7, by setting the black level SB of FIG. 7 to 64 levels, the 64 levels can be subtracted from the output signal Vout6.

Eighth Embodiment

Figure 14:
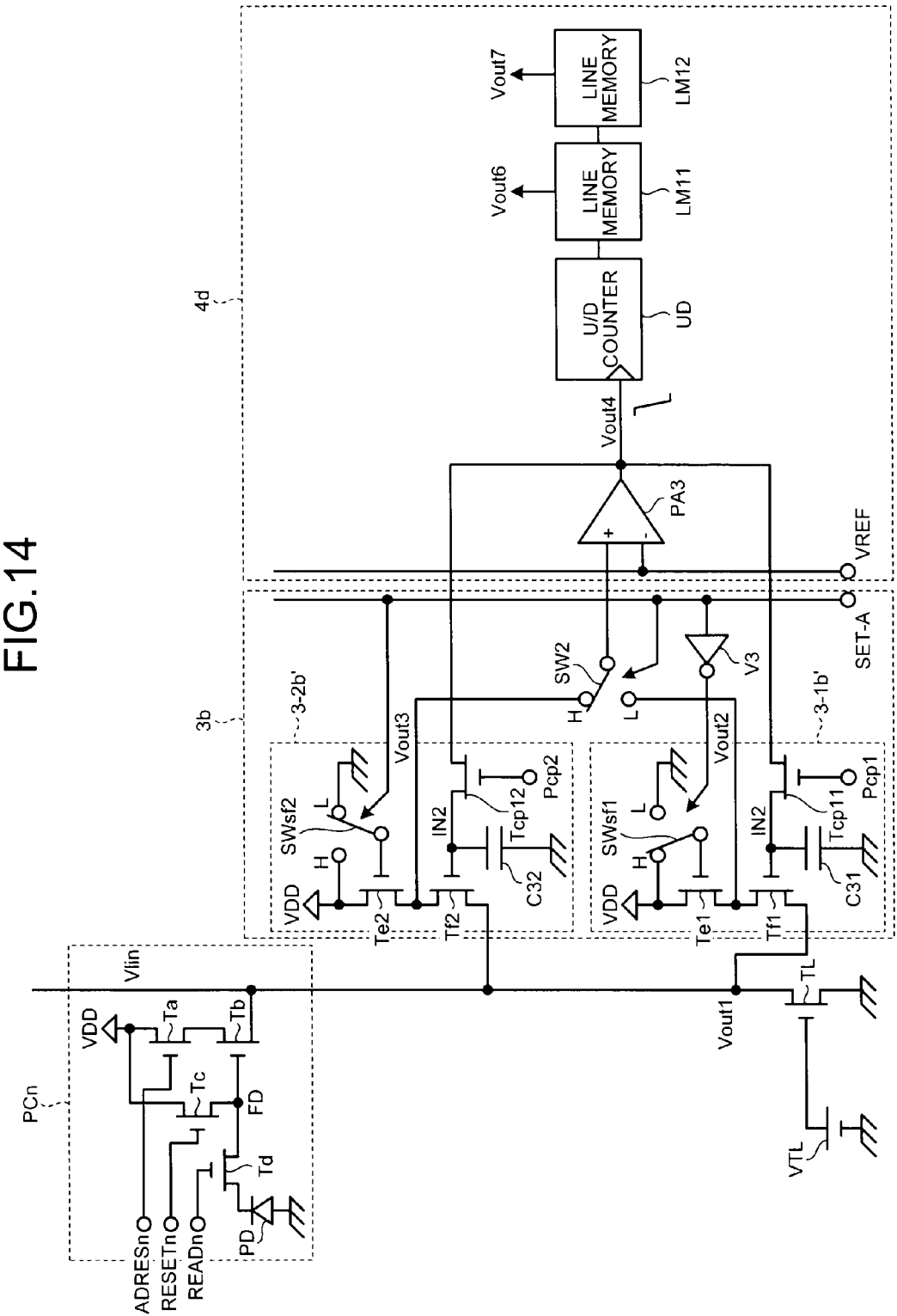
FIG. 14 is a circuit diagram of a schematic configuration of one column of a solid-state imaging device according to an eighth embodiment.

FIG. 14 is a circuit diagram of a schematic configuration of one column of a solid-state imaging device according to an eighth embodiment.

In FIG. 14, the solid-state imaging device includes a sample and hold signal converting circuit 4d, instead of the sample and hold signal converting circuit 4b of FIG. 10.

In this case, in the sample and hold signal converting circuit 4d, instead of the switch SW1, the up-down counters UD1 and UD2, and the line memories LM1 and LM2 of FIG. 10, an up-down counter UD and line memories LM11 and LM12 are provided.

Figure 15:
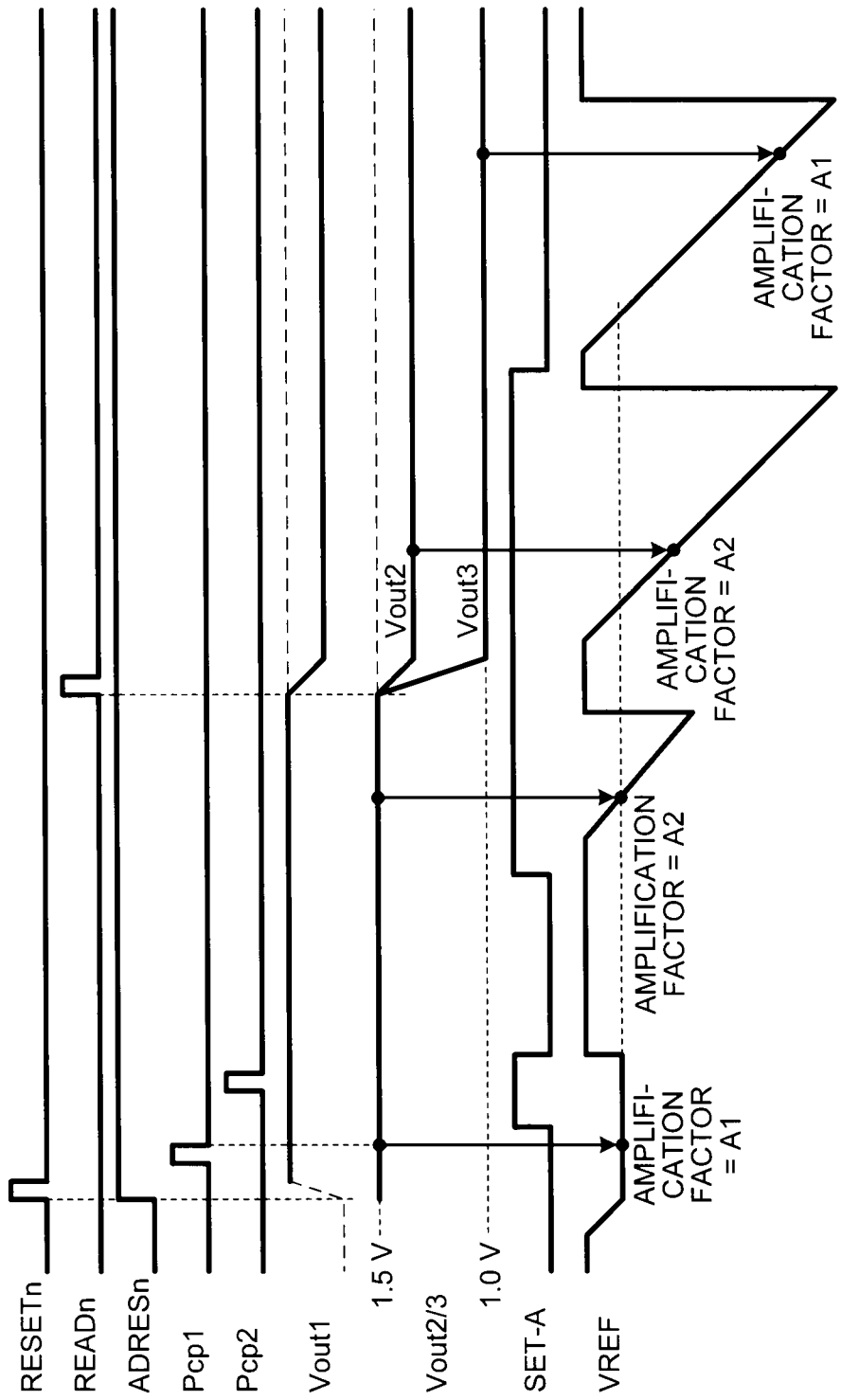
FIG. 15 is a timing chart illustrating a read operation of one pixel of the solid-state imaging device of FIG. 14.

FIG. 15 is a timing chart illustrating a read operation of one pixel of the solid-state imaging device of FIG. 14.

In FIG. 15, when the level of the switching signal SET-A is set to a low level, the switch SWsf2 is switched to the L side, the switching signal SET-A is inverted by the inverter V3 and the level thereof becomes a high level, and the switch SWsf1 is switched to the H side. When the level of the switching signal SET-A is set to a low level, the switch SW2 is switched to the L side.

If the level of the row selection signal ADRESn becomes a high level, the row selection transistor Ta of the pixel PC is turned on, the power supply potential VDD is applied to the drain of the amplification transistor Tb, and a source follower is configured by the amplification transistor Tb and the constant current transistor TL.

If the level of the reset signal RESETn becomes a high level with the row selection transistor Ta being turned on, the reset transistor Tc is turned on and a voltage according to the reference level of the floating diffusion FD is applied to the gate of the amplification transistor Tb and is output as the output voltage Vout1 of the reference level to the vertical signal line Vlin.

If the output voltage Vout1 of the reference level is applied to the source of the amplification transistor Tf1 with the switch SWsf1 being switched to the H side, the output voltage Vout2 of the reference level of the amplification factor A1 is output from the drain of the amplification transistor Tf1.

When the signal of the reference level is output to the vertical signal line Vlin, if the reset pulse Pcp1 is input to the gate of the switch transistor Tcp11, the output voltage Vout4 of the comparator PA3 is held in the capacitor C31 and is applied to the gate of the amplification transistor Tf1, and a bias voltage is applied.

If the switch transistor Tcp11 is turned off, the output voltage Vout4 of the comparator PA3 is held as the first reference level of the signal amplified with the amplification factor A1 in the capacitor C31. In this case, when the output voltage Vout2 of the reference level of the amplification factor A1 is output, the reference voltage VREF is maintained to have a constant value. The up-down counter UD is reset.

Next, if the level of the switching signal SET-A changes to a high level, the switch SWsf2 is switched to the H side, the switching signal SET-A is inverted by the inverter V3 and the level thereof becomes a low level, and the switch SWsf1 is switched to the L side. When the level of the switching signal SET-A changes to a high level, the switch SW2 is switched to the H side.

If the output voltage Vout1 of the reference level is applied to the source of the amplification transistor Tf2 with the switch SWsf2 being switched to the H side, the output voltage Vout3 of the reference level of the amplification factor A2 is output from the drain of the amplification transistor Tf2.

When the signal of the reference level is output to the vertical signal line Vlin, if the reset pulse Pcp2 is input to the gate of the switch transistor Tcp12, the output voltage Vout4 of the comparator PA3 is held in the capacitor C32 and is applied to the gate of the amplification transistor Tf2, and a bias voltage is applied.

With the output voltage Vout3 of the reference level of the amplification factor A2 being input to the comparator PA3 through the switch SW2, a triangular wave is applied as the reference voltage VREF and the output voltage Vout3 of the reference level of the amplification factor A2 and the reference voltage VREF are compared with each other. The high level of the output voltage Vout4 is maintained until the output voltage Vout3 of the reference level of the amplification factor A2 is matched with the level of the reference voltage VREF, the up-down counter UD executes the down-counting operation until the level of the output voltage Vout4 is inverted into a low level, and the output voltage Vout3 of the reference level of the amplification factor A2 is converted into a digital value D and is held as the second reference level of the signal amplified with the amplification factor A2 in the up-down counter UD.

Next, if the level of the read signal READn becomes a high level with the row selection transistor Ta of the pixel PCn being turned on, the read transistor Td is turned on and the charges that are accumulated in the photodiode PD are transmitted to the floating diffusion FD. In addition, a voltage according to the signal level of the floating diffusion FD is applied to the gate of the amplification transistor Tb and is output as the output voltage Vout1 of the signal level to the vertical signal line Vlin.

If the output voltage Vout1 of the signal level is applied to the source of the amplification transistor Tf2, the output voltage Vout3 of the signal level of the amplification factor A2 is output from the drain of the amplification transistor Tf2.

Then, with the output voltage Vout3 of the signal level of the amplification factor A2 being input to the comparator PA through the switch SW2, a triangular wave is applied as the reference voltage VREF and the output voltage Vout3 of the reference level of the amplification factor A2 and the reference voltage VREF are compared with each other. The high level of the output voltage Vout4 is maintained until the level of the output voltage Vout3 of the signal level of the amplification factor A2 is matched with the level of the reference voltage VREF, the up-down counter UD executes the up-counting operation until the level of the output voltage Vout4 is inverted into a low level, and the difference between the output voltage Vout3 of the signal level of the amplification factor A2 and the output voltage Vout3 of the reference level is converted into a digital value D and is transmitted to the line memory LM12. As a result, in the line memory LM12, the difference between the second signal level and the second reference level that are sampled from the signal amplified with the amplification factor A2 is held as the signal component of the amplification factor A2 detected by the CDS. If the signal component of the amplification factor A2 detected by the CDS is held in the line memory LM12, the up-down counter UD is reset.

Next, if the level of the switching signal SET-A changes to a low level, the switch SWsf2 is switched to the L side, the switching signal SET-A is inverted by the inverter V3 and the level thereof becomes a high level, and the switch SWsf1 is switched to the H side. If the level of the switching signal SET-A changes to a low level, the switch SW2 is switched to the L side.

Then, with the output voltage Vout2 of the signal level of the amplification factor A1 being input to the comparator PA through the switch SW2, a triangular wave is applied as the reference voltage VREF and the output voltage Vout2 of the signal level of the amplification factor A1 and the reference voltage VREF are compared with each other. The high level of the output voltage Vout4 is maintained until the level of the output voltage Vout2 of the signal level of the amplification factor A1 is matched with the level of the reference voltage VREF, the up-down counter UD executes the up-counting operation until the level of the output voltage Vout4 is inverted into a low level, and the output voltage Vout2 of the signal level of the amplification factor A1 is converted into a digital value D and is transmitted to the line memory LM11. As a result, in the line memory LM11, the analog CDS processed difference between the first signal level and the first reference level stored in the capacitors C1 and C3 is held.

In this case, even when the first reference level and the first signal level of the amplification factor A1 of the signal read from the pixel PCn are sampled and the second reference level and the second signal level of the amplification factor A2 of the signal read from the pixel PCn are sampled and the amplification factor of the signal read from the pixel PCn is switched, the reference level according to the amplification factor can be cancelled and an effect of suppressing noise based on the CDS can be improved.

By stopping the count operation by the up-down counter UD when sampling the first reference level, the number of up-down counters UD can be reduced and a circuit scale can be reduced.

In the eighth embodiment, since the black level of the signal component of the amplification factor A1 and the black level of the signal component of the amplification factor A2 are matched with each other, the black level is preferably adjusted by the subtractor 13 of FIG. 7.

Ninth Embodiment

Figure 16:
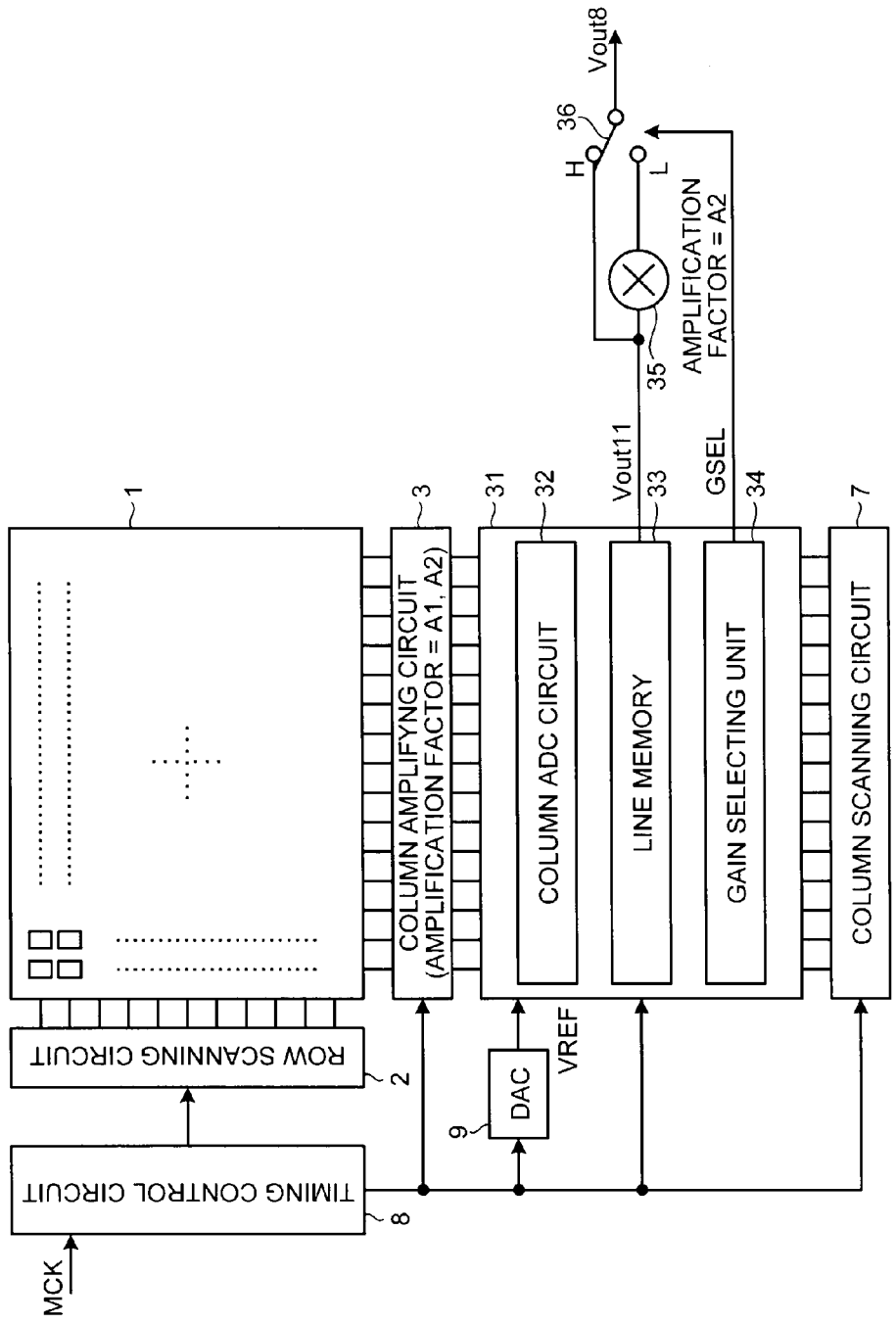
FIG. 16 is a block diagram of a schematic configuration of a solid-state imaging device according to a ninth embodiment.

FIG. 16 is a block diagram of a schematic configuration of a solid-state imaging device according to a ninth embodiment.

In FIG. 16, the solid-state imaging device includes a sample and hold signal converting circuit 31, instead of the sample and hold signal converting circuit 4 of FIG. 7. Further, the solid-state imaging device includes a multiplier 35 and a switch 36, instead of the multiplier 10, the comparator 11, the switch 12, and the subtractor 13 of FIG. 7.

After the sample and hold signal converting circuit 31 samples the first reference level from the signal amplified with the amplification factor A1 and samples the second reference level from the signal amplified with the amplification factor A2, the sample and hold signal converting circuit 31 samples the signal level from the signal amplified with the amplification factors A1 and A2, on the basis of the signal level of the signal read from each pixel PCn, and can detect the signal component of each pixel PC by the CDS.

In this case, the sample and hold signal converting circuit 31 includes a column ADC circuit 32 that executes the up-counting operation and the down-counting operation on the basis of the comparison result of the read signal from the pixel PC amplified with the amplification factors A1 and A2 and the reference voltage VREF and calculates the difference between the reference level and the signal level of the CDS, a line memory 33 that stores a count value of the column ADC circuit 32 with respect to the signal amplified with the amplification factors A1 and A2 by the amount of horizontal pixels, and a gain selecting unit 34 that selects one of the amplification factors A1 and A2 to amplify the signal read from each pixel PC.

The multiplier 35 can multiply the output signal Vout11 from the sample and hold signal converting circuit 31 with the amplification factor A2. The switch 36 can switch the output signal Vout8 to the L side or the H side, on the basis of the selection result obtained by the gain selecting unit 34.

If the pixels PC are scanned in a vertical direction by the row scanning circuit 2, the pixels PC of the row direction are selected and the signals that are read from the pixels PC are transmitted to the column amplifying circuit 3 through the vertical signal line Vlin. After the signals read from the pixels PC are amplified with the amplification factors A1 and A2 by the column amplifying circuit 3, the signals are transmitted to the sample and hold signal converting circuit 31.

In the sample and hold signal converting circuit 31, the first reference level is sampled from the signal of each pixel PC amplified with the amplification factor A1 and the second reference level is sampled from the signal of each pixel PC amplified with the amplification factor A2. On the basis of the signal level of the signal read from each pixel PC, it is determined whether the amplification factor of the signal level is the amplification factor A1 or the amplification factor A2. On the determination result, the difference between the first signal level and the first reference level or the difference between the second signal level and the second reference level is taken and are output as the output signal Vout11.

In this case, in the column ADC circuit 32, the down-counting operation is executed until the first reference level sampled from the signal of each pixel PC amplified with the amplification factor A1 is matched with the level of the reference voltage VREF, and the count value with respect to the first reference level is held. In the column ADC circuit 32, the down-counting operation is executed until the second signal level sampled from the signal of each pixel PC amplified with the amplification factor A2 is matched with the level of the reference voltage VREF, and the count value with respect to the second reference level is held.

When A1 is selected as the amplification factor of the signal level of the signal read from each pixel PC, the up-counting operation is executed with respect to the count value of the first reference level until the first signal level sampled from the signal of each pixel PC amplified with the amplification factor A1 is matched with the level of the reference voltage VREF, and the signal component of the amplification factor A1 that is detected by the CDS is converted into a digital value and is held in the line memory 33 by the amount of horizontal pixels.

Meanwhile, when A2 is selected as the amplification factor of the signal level of the signal read from each pixel PC, the up-counting operation is executed with respect to the count value of the second reference level until the second signal level sampled from the signal of each pixel PC amplified with the amplification factor A2 is matched with the level of the reference voltage VREF, and the signal component of the amplification factor A2 that is detected by the CDS is converted into the digital value and is held in the line memory 33 by the amount of horizontal pixels.

When A2 is selected as the amplification factor of the signal level of the signal read from each pixel PC, the switch 36 is switched to the H side and the output signal Vout11 is output as the output signal Vout8.

Meanwhile, when A1 is selected as the amplification factor of the signal level of the signal read from each pixel PC, the switch 36 is switched to the L side. The multiplier 35 multiplies the output signal Vout1 from the sample and hold signal converting circuit 31 with the amplification factor A2, the a signal component of the output signal Vout11 that is amplified with the amplification factor A1 becomes linear with respect to the amount of light, and the output signal Vout11 that is multiplied with the amplification factor A2 is output as the output signal Vout8.

In this case, by sampling the reference level by the sample and hold signal converting circuit 31 for each of the amplification factors A1 and A2, even when the amplification factors A1 and A2 are switched, the noise can be effectively suppressed by the CDS.

By sampling the signal level from the signal amplified with the amplification factor A1 and the amplification factor A2 on the basis of the signal level of the signal read from each pixel PC, the signal level does not need to be held simultaneously for each of the amplification factors A1 and A2, and the line memory 33 does not need to be provided individually for each of the amplification factors A1 and A2. Therefore a circuit scale can be suppressed from increasing.

Tenth Embodiment

Figure 17:
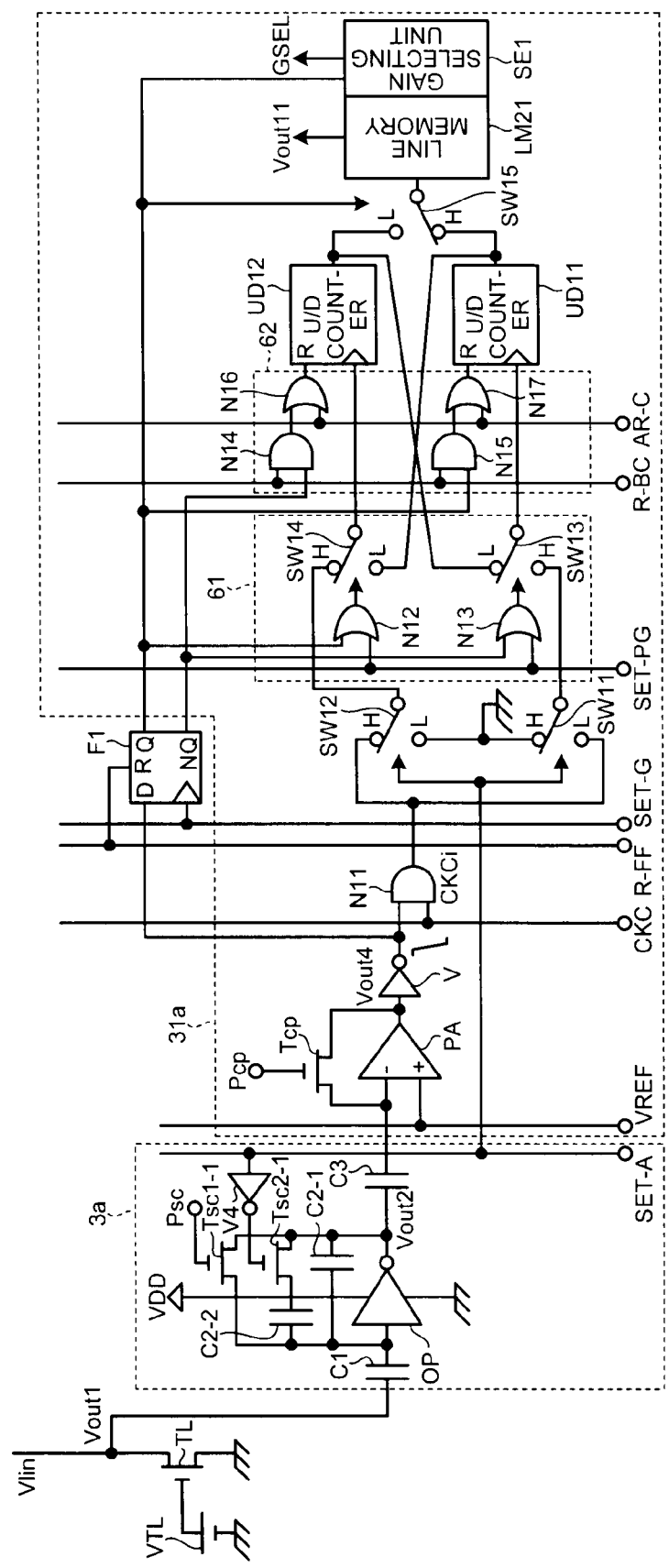
FIG. 17 is a circuit diagram of a schematic configuration of one column of a solid-state imaging device according to a tenth embodiment.

FIG. 17 is a circuit diagram of a schematic configuration of one column of a solid-state imaging device according to a tenth embodiment.

In FIG. 17, the solid-state imaging device includes a sample and hold signal converting circuit 31a and a flip-flop F1, instead of the sample and hold signal converting circuit 4a of FIG. 8.

In this case, in the sample and hold signal converting circuit 31a, a comparator PA, a switch transistor Tcp, an inverter V, switches SW11, SW12, and SW15, up-down counters UD11 and UD12, a line memory LM21, a gain selecting unit SE1, and an AND circuit N11 are provided for each column. The bit number of the up-down counters UD11 and UD12 may be smaller than the bit number of the up-down counters UD1 and UD2 of FIG. 8. For example, if the up-down counters UD1 and UD2 of FIG. 8 need the bit number of 10 bits, the bit number of the up-down counters UD11 and UD12 may be set to bits. If the bit number of the up-down counters UD11 and UD12 is set to 5 bits, the change of the reference level until a maximum of 32 levels can be cancelled. When the change of the reference level is large, if the bit number of the up-down counters UD11 and UD12 is set to 7 bits, the change of the reference level until a maximum of 128 levels can be cancelled.

In the sample and hold signal converting circuit 31a, a counter coupling unit 61 that couples the up-down counters UD11 and UD12 and a reset circuit 62 that resets the up-down counters UD11 and UD12 are provided.

In the counter coupling unit 61, OR circuits N12 and N13 and switches SW13 and SW14 are provided. In the reset circuit 62, AND circuits N14 and N15 and OR circuits N16 and N17 are provided.

An one input terminal of the AND circuit N11 is connected to an output terminal of the inverter V and a reference clock CKC is input to the other input terminal of the AND circuit N11. The H side of the switch SW11 is connected to the ground and the L side of the switch SW11 is connected to an output terminal of the AND circuit N11. The H side of the switch SW12 is connected to an output terminal of the AND circuit N11 and the L side of the switch SW12 is connected to the ground. The switches SW11 and SW12 are switched by a switching signal SET-A.

One input terminal of the OR circuit N12 is connected to an output terminal Q of a flip-flop F1 and a switching signal SET-PG is input to the other input terminal of the OR circuit N12. One input terminal of the OR circuit N13 is connected to an inverting output terminal NQ of the flip-flop F1 and the switching signal SET-PG is input to the other input terminal of the OR circuit N13.

The L side of the switch SW13 is connected to an output terminal of the switch SW11 and the H side of the switch SW13 is connected to an output terminal of the up-down counter UD12. The H side of the switch SW14 is connected to an output terminal of the switch SW12 and the L side of the switch SW14 is connected to an output terminal of the up-down counter UD11. An output terminal of the switch SW13 is connected to an input terminal of the up-down counter UD11 and an output terminal of the switch SW14 is connected to an input terminal of the up-down counter UD12. The switch SW13 is switched by an output of the OR circuit N13 and the switch SW14 is switched by an output of the OR circuit N12.

A reset pulse R-BC is input to one input terminal of the AND circuit N14 and the other input terminal of the AND circuit N14 is connected to an inverting output terminal NQ of the flip-flop F1. The reset pulse R-BC is input to one input terminal of the AND circuit N15 and the other input terminal of the AND circuit N14 is connected to an output terminal Q of the flip-flop F1.

One input terminal of the OR circuit N16 is connected to an output terminal of the AND circuit N14 and a reset pulse AR-C is input to the other input terminal of the AND circuit N16. One input terminal of the OR circuit N17 is connected to an output terminal of the AND circuit 15 and the reset pulse AR-C is input to the other input terminal of the OR circuit N17. An output terminal of the OR circuit N16 is connected to a reset terminal of the up-down counter UD12 and an output terminal of the OR circuit N17 is connected to a reset terminal of the up-down counter UD11.

The H side of the switch SW15 is connected to the output terminal of the up-down counter UD11 and the L side of the switch SW15 is connected to an output terminal of the up-down counter UD12. The switch SW15 is switched by an output from the output terminal Q of the flip-flop F1.

The gain selecting unit SE1 is connected to the output terminal Q of the flip-flop F1. An input terminal D of the flip-flop F1 is connected to the output terminal of the inverter V, a reset signal R-FF is input to the reset terminal R of the flip-flop F1, and a set pulse SET-G is input to a set terminal of the flip-flop F1.

Figure 18:
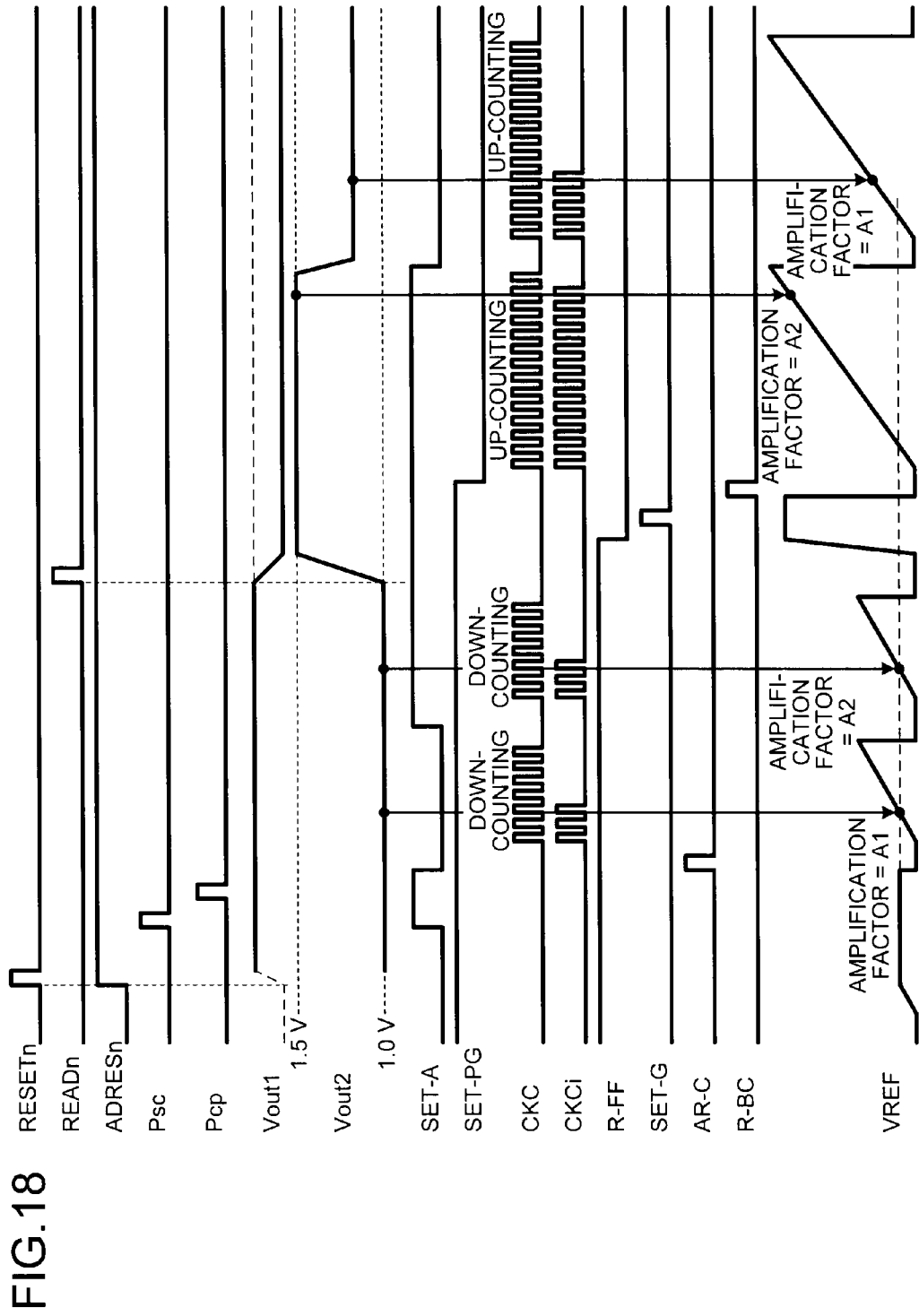
FIG. 18 is a timing chart illustrating a read operation of one pixel of the solid-state imaging device of FIG. 17.

FIG. 18 is a timing chart illustrating a read operation of one pixel of the solid-state imaging device of FIG. 17.

In FIG. 18, when a level of the switching signal SET-A is set to a low level, the switching signal SET-A is inverted by the inverter V4 and the level thereof becomes a high level. The switch transistor Tsc2-1 is turned on and the amplification factor of the column amplifying circuit 3a is set to A1.

If the level of the row selection signal ADRESn becomes a high level, the row selection transistor Ta of the pixel PCn is turned on, the power supply potential VDD is applied to the rain of the amplification transistor Tb, and a source follower is configured by the amplification transistor Tb and the constant current transistor TL.

If the level of the reset signal RESETn becomes a high level with the row selection transistor Ta is turned on, the reset transistor Tc being turned on and a voltage according to the reference level of the floating diffusion FD is applied to the gate of the amplification transistor Tb and is output as the output voltage Vout1 of the reference level to the vertical signal line Vlin.

In this case, if the level of the switching signal SET-A changes to a high level with the reset pulses Psc and Pcp being applied, the switch transistor Tsc2-1 is turned off and the amplification factor of the column amplifying circuit 3a is set to A2.

When the output voltage Vout1 of the reference level is output to the vertical signal line Vlin, if the reset pulse Psc is applied to the gate of the switch transistor Tsc1-1, the input voltage of the operational amplifier OP is clamped with the output voltage and an operation point is set. At this time, the voltage difference with respect to the vertical signal line Vlin is held in the capacitor C1 and the input voltage of the operational amplifier OP is set to zero.

When the output voltage Vout1 of the reference level is output to the vertical signal line Vlin, if the reset pulse Pcp is applied to the gate of the switch transistor Tcp, the input voltage of the inverting input terminal of the comparator PA is clamped with the output voltage and an operation point is set. At this time, the voltage difference with respect to the output voltage Vout2 from the operational amplifier OP is held in the capacitor C3 and the input voltage of the comparator PA is set to zero.

If the reset pulses AR-C are input to the reset terminals of the up-down counters UD11 and UD12 through the OR circuits N15 and N14, respectively, the up-down counters UD11 and UD12 are reset.

Next, if the level of the switching signal SET-A changes to a low level, the switching signal SET-A is inverted by the inverter V and the level thereof becomes a high level. The switch transistor Tsc2-1 is turned on and the amplification factor of the column amplifying circuit 3a is set to A1.

If the level of the switching signal SET-A changes to a low level, the switches SW11 and SW12 are switched to the L side. A level of the switching signal SET-PG is set to a high level and the switches SW13 and SW14 are switched to the H side. As a result, an output terminal of the AND circuit N11 is connected to an input terminal of the up-down counter UD11 though the switches SW11 and SW13. At this time, the level of the reset signal R-FF is set to a high level and the potential level of the output terminal Q of the flip-flop F1 becomes a low level.

With the output voltage Vout2 of the reference level of the amplification factor A1 being input to the comparator PA through the capacitor C3 after the switch transistor Tcp is turned off, a triangular wave is applied as the reference voltage VREF and the output voltage Vout2 of the reference level of the amplification factor A1 and the reference voltage VREF1 are compared with each other. After the output voltage of the comparator PA is inverted by the inverter V, the output voltage is input as the output voltage Vout4 to one input terminal of the AND circuit N11, the reference clock CKC passes through the AND circuit N11, and a reference clock CKCi after the passage is down-counted by the up-down counter UD11.

The high level of the output voltage Vout4 is maintained until the output voltage Vout2 of the reference level of the amplification factor A1 is matched with the level of the reference voltage VREF, the up-down counter UD11 executes the down-counting operation until the level of the output voltage Vout4 is inverted into a low level, and the output voltage Vout2 of the reference level of the amplification factor A1 is converted into a digital value D and is held as the first level of the signal amplified with the amplification factor A1 in the up-down counter UD11.

Next, if the level of the switching signal SET-A changes to a high level, the switching signal SET-A is inverted by the inverter V4 and the level thereof becomes a low level. The switch transistor Tsc2-1 is turned off and the amplification factor of the column amplifying circuit 3a is set to A2.

If the level of the switching signal SET-A changes to a high level, the switches SW11 and SW12 are switched to the H side. A level of the switching signal SET-PG is set to a high level and the switches SW13 and SW14 are switched to the H side. As a result, an output terminal of the AND circuit N11 is connected to an input terminal of the up-down counter UD12 though the switches SW12 and SW14.

With the output voltage Vout2 of the reference level of the amplification factor A2 being input to the comparator PA through the capacitor C3, a triangular wave is applied as the reference voltage VREF and the output voltage Vout2 of the reference level of the amplification factor A2 and the reference voltage VREF are compared with each other. After the output voltage of the comparator PA is inverted by the inverter V, the output voltage is input as the output voltage Vout4 to one input terminal of the AND circuit N11, the reference clock CKC passes through the AND circuit N11, and a reference clock CKCi after the passage is down-counted by the up-down counter UD12.

The high level of the output voltage Vout4 is maintained until the output voltage Vout2 of the reference level of the amplification factor A2 is matched with the level of the reference voltage VREF, the up-down counter UD12 executes the down-counting operation until the level of the output voltage Vout4 is inverted into a low level, and the output voltage Vout2 of the reference level of the amplification factor A2 is converted into a digital value D and is held as the second reference level of the signal amplified with the amplification factor A2 in the up-down counter UD12.

Next, if the level of the read signal READn becomes a high level with the row selection transistor Ta of the pixel PCn being turned on, the read transistor Td is turned on and the charges that are accumulated in the photodiode PD are transmitted to the floating diffusion FD. In addition, a voltage according to the signal level of the floating diffusion FD is applied to the gate of the amplification transistor Tb and is output as the output voltage Vout1 of the signal level to the vertical signal line Vlin.

If the output voltage Vout1 of the signal level is applied to the input terminal of the operational amplifier OP through the capacitor C1 and the input voltage of the operational amplifier OP changes, the voltage is fed back from the capacitor C2-1, such that the input voltage becomes the zero voltage. As a result, the output voltage Vout2 of the signal level that is inverted and amplified with the amplification factor A2 is output from the operational amplifier OP and is applied to the inverting input terminal of the comparator PA through the capacitor C3.

The level of the reference voltage VREF is set to a level slightly lower than a saturation level of the A/D conversion (for example, 1023 in the case of 10 bits). In order to change the level of the reference voltage VREF to the above level at a high speed, a different power supply that sets the level of the reference voltage VREF to the above level may be provided in the column ADC circuit 32 of FIG. 16.

After the level of the reset signal R-FF changes to a low level, if the set pulse SET-G is applied to a set terminal of the flip-flop F1, the output voltage Vout4 is input to the flip-flop F1.

In this case, since the level of the reference voltage VREF is set to a level slightly lower than the saturation level of the A/D conversion, if the output voltage Vout2 of the signal level of the amplification factor A2 is saturated, the level of the output voltage Vout3 becomes a low level and a logical value '0' is input to the flip-flop F1. Meanwhile, if the output voltage Vout2 of the signal level of the amplification factor A2 is not saturated, the level of the output voltage Vout4 becomes a high level and a logical value '1' is input to the flip-flop F1.

When the logical value '0' is input to the flip-flop F1, the output voltage Vout2 of the signal level of the amplification factor A2 is saturated. Therefore, it can be assumed that the signal level is high and the amplification factor of the signal level can be determined as A1. When the logical value '1' is input to the flip-flop F1, the output voltage Vout2 of the signal level of the amplification factor A2 is not saturated. Therefore, it can be assumed that the signal level is low and the amplification factor of the signal level can be determined as A2.

Next, if the reset pulse R-BC is input to one input terminal of the AND circuit N14 and one input terminal of the AND circuit N15, any one of the up-down counters UD1 and UD2 is reset.

Hereinafter, each of the case which the logical value '1' is input to the flip-flop F1 and the case which the logical value '0' is input to the flip-flop F1 will be described.

(Case in which the Logical Value '1' is Input to the Flip-Flop F1)

Since the potential level of the output terminal Q of the flip-flop F1 becomes a high level, the reset pulse R-BC is applied to the reset terminal of the up-down counter UD1 through the AND circuit N15 and a count value that is held in the up-down counter UD1 and corresponds to the first reference level of the amplification factor A1 is deleted.

Next, if the level of the switching signal SET-PG changes to a low level, the switch SW13 is switched by the OR circuit N13 and the switch SW14 is switched by the OR circuit N12. As a result, the up-down counter UD11 is coupled to the rear stage of the up-down counter UD12 and the output terminal of the AND circuit N11 is connected to the input terminal of the up-down counter UD12 through the switches SW12 and SW14. When the potential level of the output terminal Q of the flip-flop F1 is a high level, the switch SW15 is switched to the H side and the output terminal of the up-down counter UD11 is connected to the line memory LM21.

With the output voltage Vout2 of the signal level of the amplification factor A2 being input to the comparator PA through the capacitor C3, a triangular wave is applied as the reference voltage VREF and the output voltage Vout2 of the signal level of the amplification factor A2 and the reference voltage VREF are compared with each other. After the output voltage of the comparator PA is inverted by the inverter V, the output voltage is input as the output voltage Vout4 to one input terminal to one input terminal of the AND circuit N11, the reference clock CKC passes through the AND circuit N11, and a reference clock CKCi after the passage is up-counted by the up-down counters UD11 and UD12.

The high level of the output voltage Vout4 is maintained until the output voltage Vout2 of the signal level of the amplification factor A2 is matched with the level of the reference voltage VREF, the up-counters UD11 and UD12 execute the down-counting operation until the level of the output voltage Vout4 is inverted into a low level, and the difference between the output voltage Vout2 of the signal level of the amplification factor A2 and the output voltage Vout2 of the reference level is converted into a digital value D and is transmitted to the line memory LM21 through the switch SW15. As a result, in the line memory LM21, the difference between the second signal level and the second reference level that are sampled from the signal amplified with the amplification factor A2 is held as the signal component of the amplification factor A2 detected by the CDS.

When the potential level of the output terminal Q of the flip-flop F1 is a high level, a value of a gain selection signal GSEL is set to 'H' by the gain selecting unit 34 of FIG. 16. If the value of the gain selection signal GSEL is set to 'H', the switch 36 is switched to the H side and the output signal Vout11 is output as the output signal Vout8.

Next, if the level of the switching signal SET-A changes to a low level, the switches SW11 and SW12 are switched to the L side. However, since the switch SW13 is set to the L side, the output terminal of the AND circuit N11 is not connected to the input terminals of the up-down counters UD11 and UD12 and the up-down counters UD11 and UD12 do not operate.

(Case in which the Logical Value '0' is Input to the Flip-Flop F1)

Since the potential level of the inverting output terminal NQ of the flip-flop F1 becomes a high level, the reset pulse R-BC is applied to the reset terminal of the up-down counter UD2 through the AND circuit N14 and a count value that is held in the up-down counter UD2 and corresponds to the second reference level of the amplification factor A2 is deleted.

At this time, since the level of the switching signal SET-A is set to a high level, the switches SW11 and SW12 are switched to the H side. However, since the switch SW14 is set to the L side, the output terminal of the AND circuit N11 is not connected to the input terminals of the up-down counters UD11 and UD12 and the up-down counters UD11 and UD12 do not operate.

Next, if the level of the switching signal SET-A changes to a low level, the switching signal SET-A is inverted by the inverter V4 and the level thereof becomes a high level. The switch transistor Tsc2-1 is turned on and the amplification factor of the column amplifying circuit 3a is set to A1.

If the level of the switching signal SET-A changes to a low level, the switches SW11 and SW12 are switched to the L side. Since the level of the switching signal SET-PG is set to a low level, if the potential level of the inverting output terminal NQ of the flip-flop F1 becomes a high level, the switch SW13 is switched to the H side by the OR circuit N13 and the switch SW14 is switched to the L side by the OR circuit N12. As a result, the up-down counter UD12 is coupled to the rear stage of the up-down counter UD11 and the output terminal of the AND circuit N11 is connected to the input terminal of the up-down counter UD11 through the switches SW11 and SW13. When the potential level of the inverting output terminal NQ of the flip-flop F1 is a high level, the switch SW15 is switched to the L side and the output terminal of the up-down counter UD12 is connected to the line memory LM21.

With the output voltage Vout2 of the signal level of the amplification factor A1 being input to the comparator PA through the capacitor C3, a triangular wave is applied as the reference voltage VREF and the output voltage Vout2 of the signal level of the amplification factor A1 and the reference voltage VREF are compared with each other. After the output voltage of the comparator PA is inverted by the inverter V, the output voltage is input as the output voltage Vout4 to one input terminal of the AND circuit N11, the reference clock CKC passes through the AND circuit N11, and a reference clock CKCi after the passage is up-counted by the up-down counters UD11 and UD12.

The high level of the output voltage Vout4 is maintained until the output voltage Vout2 of the signal level of the amplification factor A1 is matched with the level of the reference voltage VREF, the up-counters UD11 and UD12 execute the up-counting operation until the level of the output voltage Vout4 is inverted into a low level, and the difference between the output voltage Vout2 of the signal level of the amplification factor A1 and the output voltage Vout2 of the reference level is converted into a digital value D and is transmitted to the line memory LM21 through the switch SW15. As a result, in the line memory LM21, the difference between the first signal level and the first reference level that are sampled from the signal amplified with the amplification factor A1 is held as the signal component of the amplification factor A1 detected by the CDS.

When the potential level of the output terminal Q of the flip-flop F1 is a low level, a value of a gain selection signal GSEL is set to 'L' by the gain selecting unit 34 of FIG. 16. If the value of the gain selection signal GSEL is set to 'L', the switch 36 is switched to the H side and the output signal Vout11 that is amplified with the amplification factor A2 is output as the output signal Vout8.

In this case, even when the first reference level and the second reference level are sampled before the amplification factors A1 and A2 of the signals read from the pixels PCn are switched and the first signal level and the second signal level are sampled after the amplification factors A1 and A2 of the signals read from the pixels PCn are switched and the amplification factors A1 and A2 of the signals read from the pixels PCn are switched, the reference levels according to the amplification factors A1 and A2 can be cancelled and an effect of suppressing noise based on the CDS can be improved. Since the line memory LM21 does not need to be provided individually for each of the amplification factors A1 and A2, a circuit scale can be reduced.

Eleventh Embodiment

Figure 19:
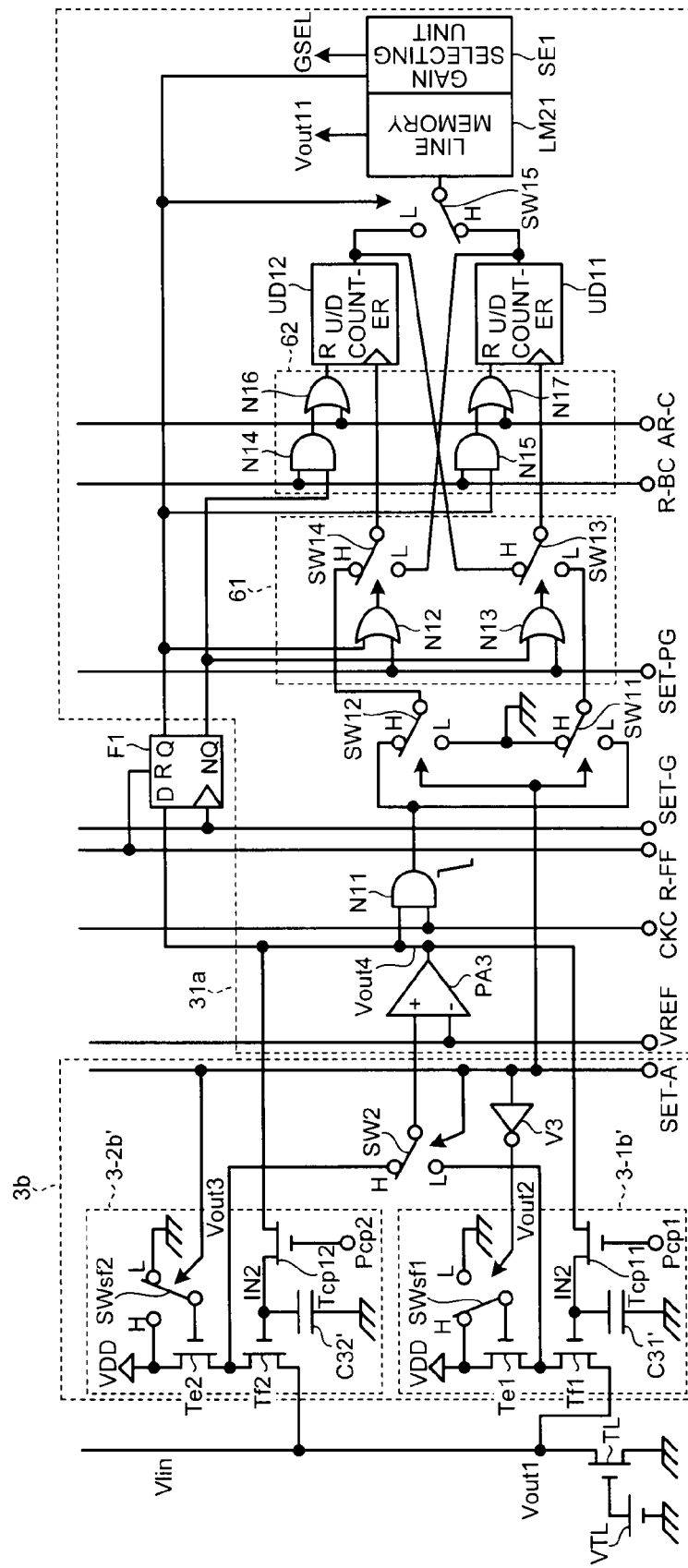
FIG. 19 is a circuit diagram of a schematic configuration of one column of a solid-state imaging device according to an eleventh embodiment.

FIG. 19 is a circuit diagram of a schematic configuration of one column of a solid-state imaging device according to an eleventh embodiment.

In FIG. 19, in the solid-state imaging device, the sample and hold signal converting circuit 31a of FIG. 17 is connected to the rear stage of the column amplifying circuit 3b of FIG. 10.

Figure 20:
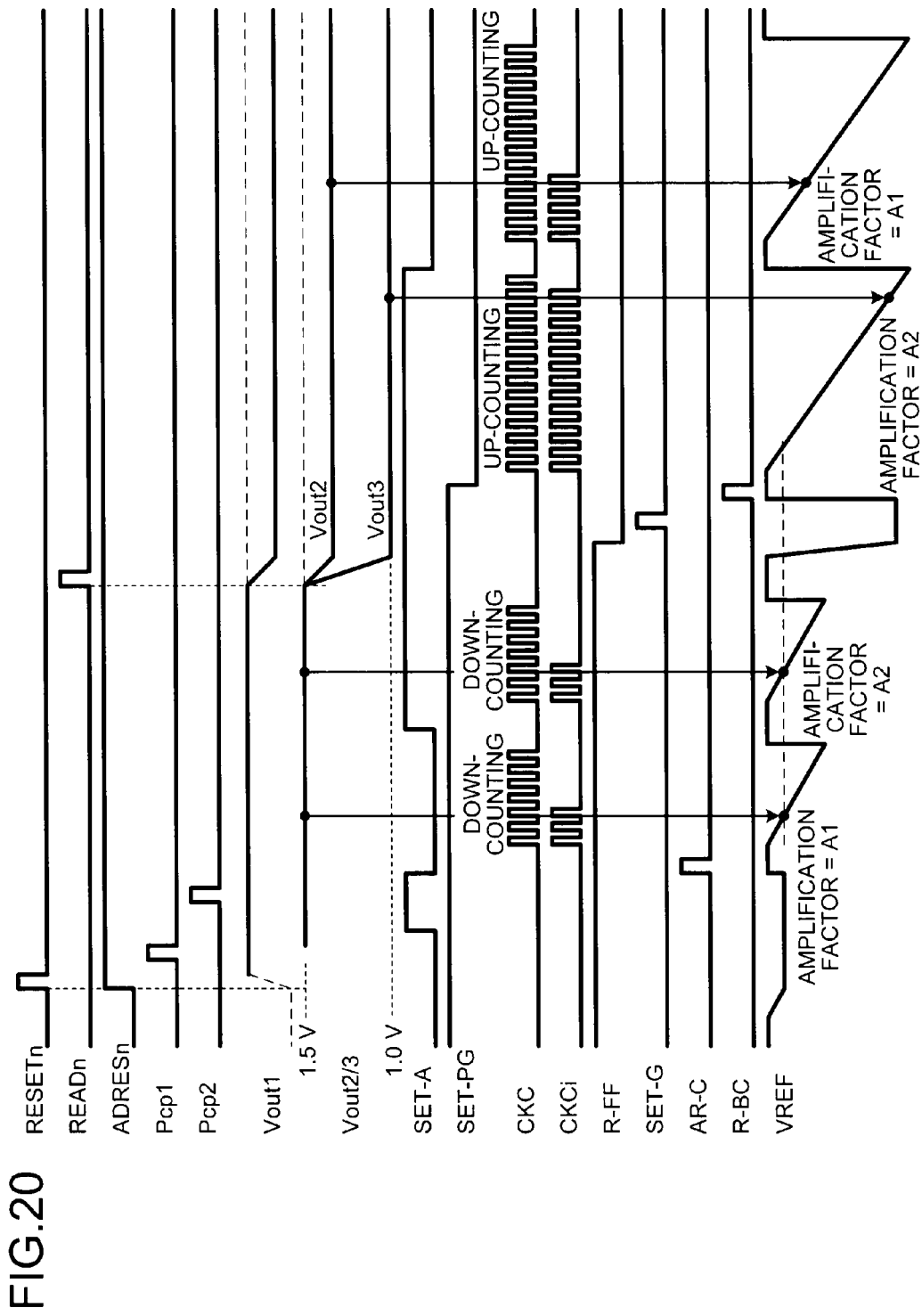
FIG. 20 is a timing chart illustrating a read operation of one pixel of the solid-state imaging device of FIG. 19.

FIG. 20 is a timing chart illustrating a read operation of one pixel of the solid-state imaging device of FIG. 19.

In FIG. 20, the operations of FIGS. 11 and 18 are combined, and the switched capacitor type amplifying circuit is not used and a differential amplifying circuit is used as the column amplifying circuit 3b.

Twelfth Embodiment

Figure 21:
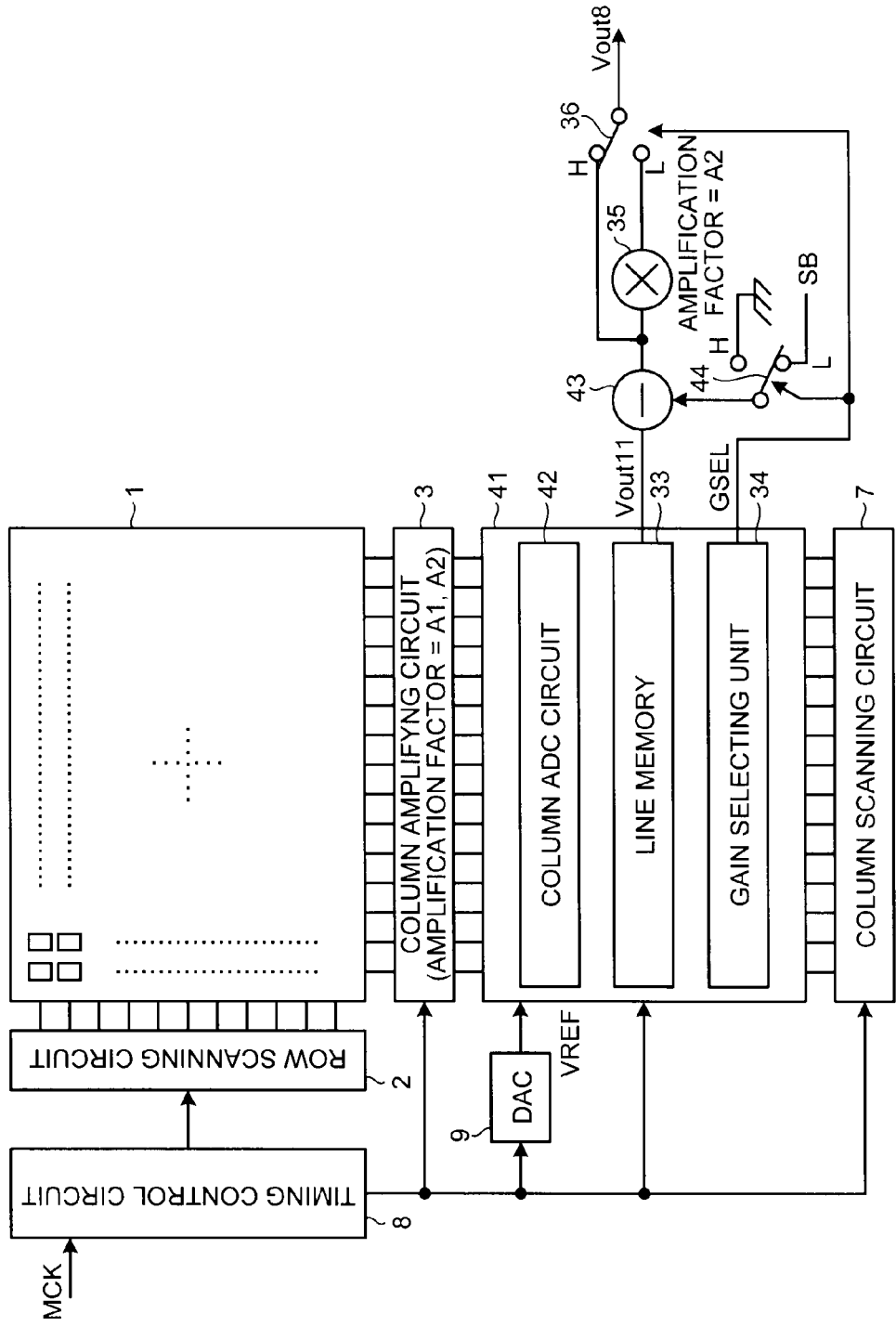
FIG. 21 is a block diagram of a schematic configuration of a solid-state imaging device according to a twelfth embodiment.

FIG. 21 is a block diagram of a schematic configuration of a solid-state imaging device according to a twelfth embodiment.

In FIG. 21, the solid-state imaging device includes a sample and hold signal converting circuit 41, instead of the sample and hold signal converting circuit 31 of FIG. 16. The solid-state imaging device includes a subtractor 43 that adjusts a black level with respect to a signal component of each pixel PCn and a switch 44 that supplies a black level SB to the subtractor 43, on the basis of a gain selection signal GSEL.

The sample and hold signal converting circuit 41 samples a first reference level from a signal amplified with the amplification factor A1, samples a second reference level from a signal amplified with the amplification factor A2, and samples a signal level from a signal amplified with the amplification factor A1 or A2 on the basis of the signal level of the signal read from each pixel PC, and can detects a signal component of each pixel PC by the CDS. In this case, a signal component of the signal that is amplified with the amplification factor A1 can be detected by the analog CDS and a signal component of the signal that is amplified with the amplification factor A2 can be detected by the digital CDS.

In the sample and hold signal converting circuit 41, a column ADC circuit 42 is provided. The column ADC circuit 42 can execute the up-counting operation on the basis of the comparison result of the signal of the signal level amplified with the amplification factor A1 and read from the pixel PC and the reference voltage VREF and calculate the difference between the reference level and the signal level of the analog CDS. The column ADC circuit 42 can execute the up-counting operation and the down-counting operation on the basis of the comparison result of the signal of the signal level amplified with the amplification factor A2 and read from the pixel PC and the reference voltage VREF and calculate the difference between the reference level and the signal level of the digital CDS.

When A1 is selected as the amplification factor of the signal level of the signal read from each pixel PC, the switches 36 and 44 are switched to the L side. In the sample and hold signal converting circuit 41, the signal component is detected from the signal read from each pixel PC by the analog CDS and is output as the output voltage Vout11. The subtractor 43 subtracts the black level SB from the output signal, the multiplier 35 multiplies the output signal with the amplification factor A2, and the output signal is output as the output signal Vout8.

Meanwhile, when A2 is selected as the amplification factor of the signal level of the signal read from each pixel PC, the switches 36 and 44 are switched to the H side. In the sample and hold signal converting circuit 41, the signal component is detected from the signal read from each pixel PC by the digital CDS and the output signal Vout11 is output as the output signal Vout8.

In this case, even when the first reference level and the second reference level are sampled before the amplification factors A1 and A2 of the signals read from the pixels PCn are switched and the first signal level and the second signal level are sampled after the amplification factors A1 and A2 of the signals read from the pixels PCn are switched and the amplification factors A1 and A2 of the signals read from the pixels PCn are switched, the reference levels according to the amplification factors A1 and A2 can be cancelled and an effect of suppressing noise based on the CDS can be improved. Since the line memory 33 does not need to be provided individually for each of the amplification factors A1 and A2, a circuit scale can be reduced.

The signal component of the signal that is amplified with the amplification factor A1 is detected by the analog CDS and the signal component of the signal that is amplified with the amplification factor A2 is detected by the digital CDS, and the up-down counter does not need to be provided individually for each of the amplification factors A1 and A2. Therefore, a circuit scale can be reduced.

Thirteenth Embodiment

Figure 22:
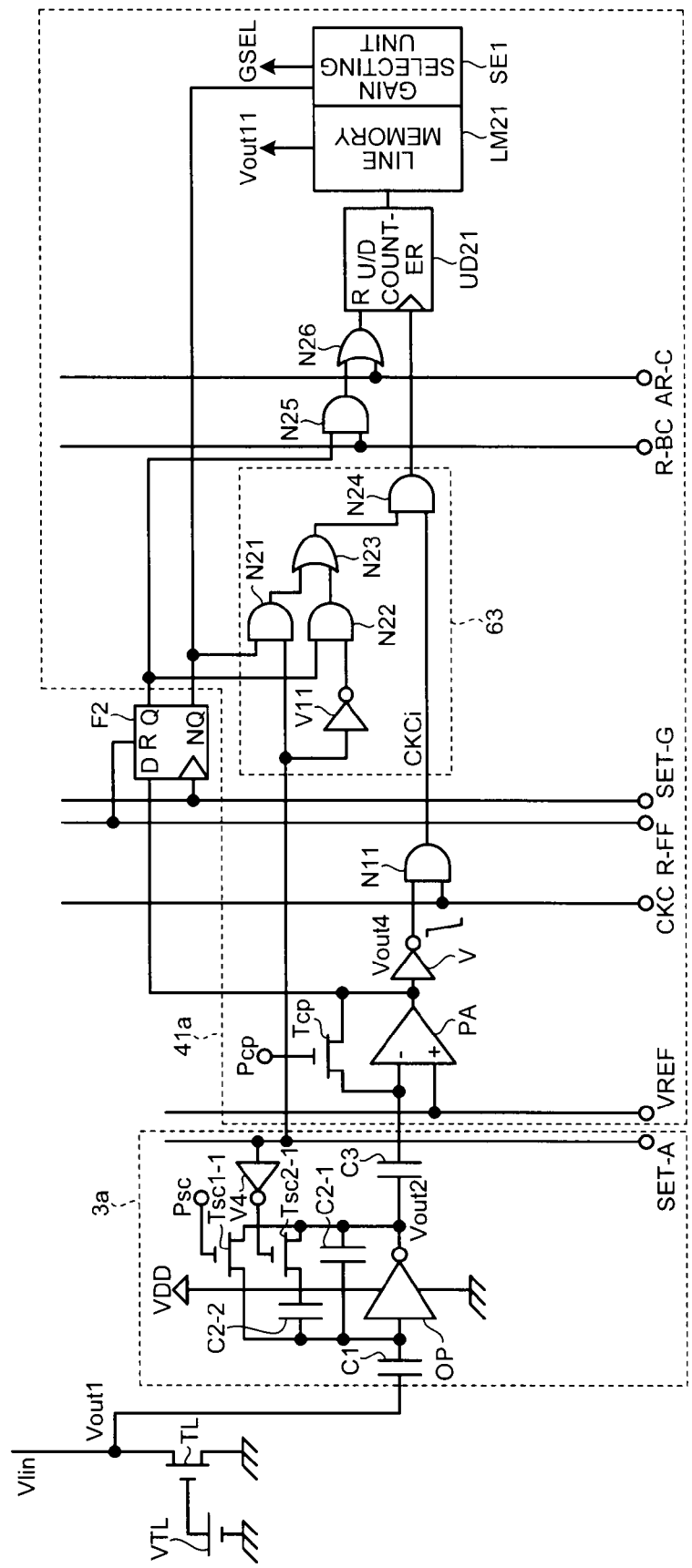
FIG. 22 is a circuit diagram of a schematic configuration of one column of a solid-state imaging device according to a thirteenth embodiment.

FIG. 22 is a circuit diagram of a schematic configuration of one column of a solid-state imaging device according to a thirteenth embodiment.

In FIG. 22, the solid-state imaging device includes a sample and hold signal converting circuit 41*a* and a flip-flop F2, instead of the sample and hold signal converting circuit 31*a* and the flip-flop F1 of FIG. 17.

In this case, in the sample and hold signal converting circuit 41*a*, a comparator PA, a switch transistor Tcp, an inverter V, an up-down counter UD21, a line memory LM21, a gain selecting unit SE1, AND circuits N11 and N25, and an OR circuit N26 are provided for each column.

In the sample and hold signal converting circuit 41*a*, a counter input intercepting circuit 63 that intercepts an input of the up-down counter UD21 on the basis of a value held in the flip-flop F2 is provided. In the counter input intercepting circuit 63, an inverter V11, AND circuits N21, N22, and N24, and an OR circuit N23 are provided.

One input terminal of the AND circuit N22 is connected to an output terminal Q of the flip-flop F2 and a switching signal SET-A is input to the other input terminal of the AND circuit N22 through the inverter V11. One input terminal of the AND circuit N21 is connected to an inverting output terminal NQ of the flip-flop F2 and the switching signal SET-A is input to the other input terminal of the AND circuit N21.

One input terminal of the OR circuit N23 is connected to an output terminal of the AND circuit N21 and the other input terminal thereof is connected to an output terminal of the AND circuit N22. One input terminal of the AND circuit 24 is connected to an output terminal of the OR circuit N23 and the other input terminal thereof is connected to an output terminal of the AND circuit N11. An output terminal of the AND circuit N24 is connected to an input terminal of the up-down counter UD21.

One input terminal of the AND circuit N25 is connected to an output terminal Q of the flip-flop F1 and a reset pulse R-BC is input to the other input terminal of the AND circuit N25. One input terminal of the OR circuit N26 is connected to an output terminal of the AND circuit N25 and a reset pulse AR-C is input to the other input terminal of the OR circuit N26. An output terminal of the OR circuit N26 is connected to a reset terminal of the up-down counter UD21.

The gain selecting unit SE1 is connected to an inverting output terminal NQ of the flip-flop F2. An input terminal D of the flip-flop F2 is connected to an output terminal of the comparator PA, a reset signal R-FF is input to a reset terminal R of the flip-flop F2, and a set pulse SET-G is input to a set terminal of the flip-flop F2.

Figure 23:
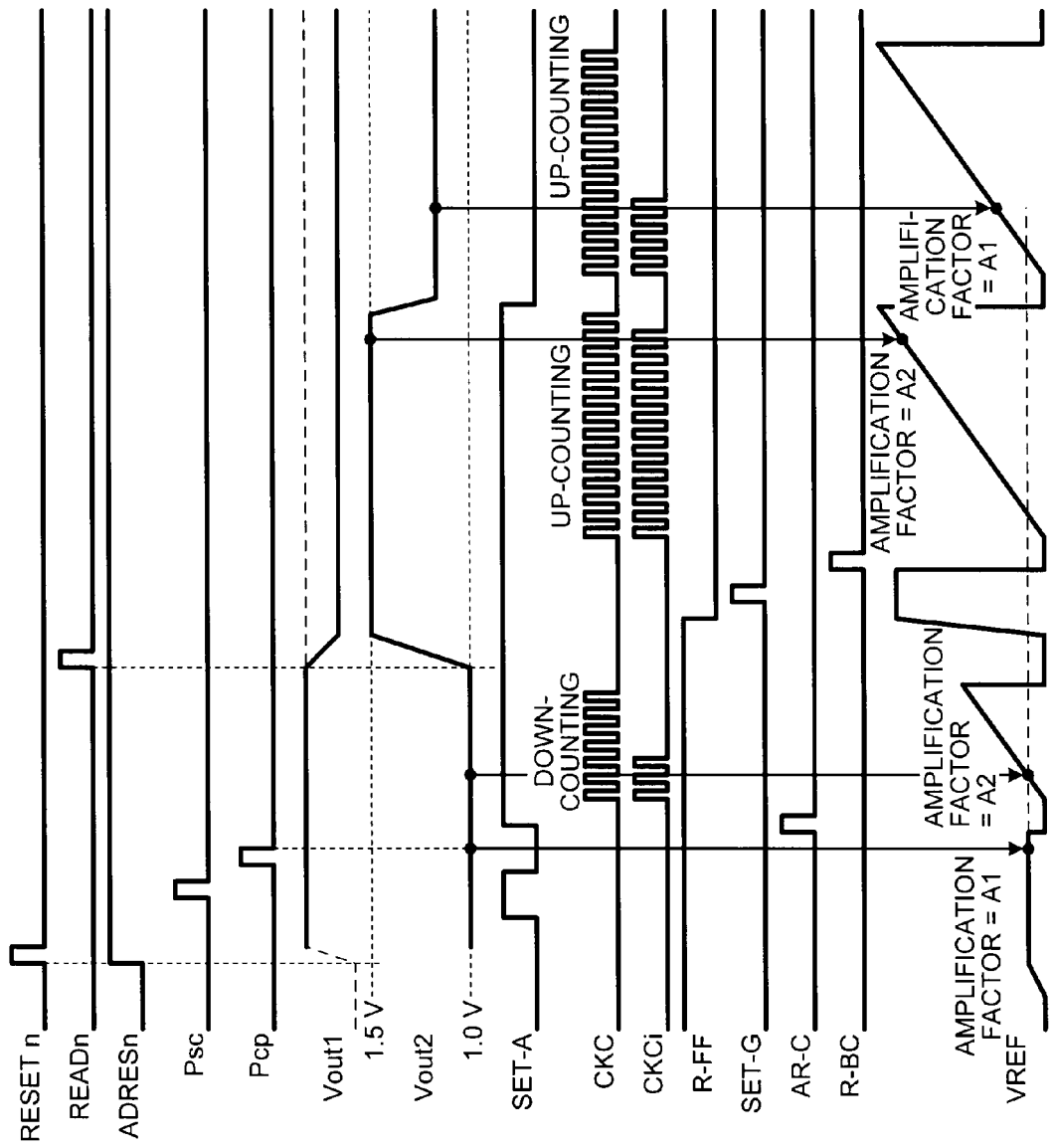
FIG. 23 is a timing chart illustrating a read operation of one pixel of the solid-state imaging device of FIG. 22.

FIG. 23 is a timing chart illustrating a read operation of one pixel of the solid-state imaging device of FIG. 22.

In FIG. 23, when a level of the switching signal SET-A is set to a high level, the switching signal SET-A is inverted by the inverter V4 and the level thereof becomes a low level. The switch transistor Tsc2-1 is turned off and the amplification factor of the column amplifying circuit 3*a* is set to A2.

If the level of the row selection signal ADRESn becomes a high level, the row selection transistor Ta of the pixel PCn is turned on, the power supply potential VDD is applied to a drain of the amplification transistor Tb, and a source follower is configured by the amplification transistor Tb and the constant current transistor TL.

If the level of the reset signal RESETn becomes a high level with the row selection transistor Ta being turned on, the reset transistor Tc is turned on and a voltage according to the reference level of the floating diffusion FD is applied to the gate of the amplification transistor Tb and is output as the output voltage Vout1 of the reference level to the vertical signal line Vlin.

When the output voltage Vout1 of the reference level of the amplification factor A2 is output to the vertical signal line Vlin, if the reset pulse Psc is applied to the gate of the switch transistor Tsc1-1, the input voltage of the operational amplifier OP is clamped with the output voltage and an operation point is set. At this time, the voltage difference with respect to the vertical signal line Vlin is held in the capacitor C1 and the input voltage of the operational amplifier OP is set to zero.

Next, if the level of the switching signal SET-A changes to a low level, the switching signal SET-A is inverted by the inverter V4 and the level thereof becomes a high level. The switch transistor Tsc2-1 is turned on and the amplification factor of the column amplifying circuit 3a is set to A1.

When the output voltage Vout1 of the reference level of the amplification factor A1 is output to the vertical signal line Vlin, if the reset pulse Pcp is applied to the gate of the switch transistor Tcp, the input voltage of the inverting input terminal of the comparator PA is clamped with the output voltage and an operation point is set. At this time, the voltage difference with respect to the output voltage Vout2 from the operational amplifier OP is held in the capacitor C3 and the input voltage of the comparator PA is set to zero.

The reference voltage VREF is maintained to have a constant value. The up-down counter UD is reset.

Next, if the level of the switching signal SET-A changes to a high level, the switching signal SET-A is inverted by the inverter V4 and the level thereof becomes a low level. The switch transistor Tsc2-1 is turned off and the amplification factor of the column amplifying circuit 3a is set to A2.

If the reset pulse AR-C is input to the reset terminal of the up-down counter UD21 through the OR circuit 26, the up-down counter UD21 is reset.

With the output voltage Vout2 of the reference level of the amplification factor A2 being input to the comparator PA through the capacitor C3, a triangular wave is applied as the reference voltage VREF and the output voltage Vout2 of the reference level of the amplification factor A2 and the reference voltage VREF are compared with each other. After the output voltage of the comparator PA is inverted by the inverter V, the output voltage is input as the output voltage Vout4 to one input terminal of the AND circuit N11 and the reference clock CKC passes through the AND circuit N11 and is input to the other input terminal of the AND circuit N24.

At this time, the level of the reset signal R-FF is set to a high level and the potential level of the output terminal Q of the flip-flop F2 becomes a low level. For this reason, if the level of the switching signal SET-A changes to a high level, an output of the AND circuit N21 becomes a high level and is input to one input terminal of the AND circuit N24 through the OR circuit N23. For this reason, a reference clock CKCi passes through the AND circuit N24 and is input to the up-down counter UD21, and the up-down counter 21 executes the down-counting operation.

The high level of the output voltage Vout4 is maintained until the output voltage Vout2 of the reference level of the amplification factor A2 is matched with the level of the reference voltage VREF, the up-down counter UD21 executes the down-counting operation until the level of the output voltage Vout4 is inverted into a low level, and the output voltage Vout2 of the reference level of the amplification factor A2 is converted into a digital value D and is held as the second reference level of the signal amplified with the amplification factor A2 in the up-down counter UD21.

Next, if the level of the read signal READn becomes a high level with the row selection transistor Ta of the pixel PCn being turned on, the read transistor Td is turned on and the charges that are accumulated in the photodiode PD are transmitted to the floating diffusion FD. In addition, a voltage according to the signal level of the floating diffusion FD is applied to the gate of the amplification transistor Tb and is output as the output voltage Vout1 of the signal level to the vertical signal line Vlin.

The level of the reference voltage VREF is set to a level slightly lower than a saturation level of the A/D conversion. After the level of the reset signal R-FF changes to a low level, if the set pulse SET-G is applied to a set terminal of the flip-flop F2, the output level of the comparator PA is input to the flip-flop F2.

In this case, when the logical value '1' is input to the flip-flop F2, the amplification factor of the output voltage Vout2 of the signal level can be determined as A1. When the logical value '0' is input to the flip-flop F2, the amplification factor of the output voltage Vout2 of the signal level can be determined as A2.

Hereinafter, each of the case which the logical value '1' is input to the flip-flop F2 and the case which the logical value '0' is input to the flip-flop F2 will be described.

(Case in which the Logical Value '0' is Input to the Flip-Flop F2)

After the logical value '0' is input to the flip-flop F2, the reset pulse R-BC is applied to the other input terminal of the AND circuit N25. In this case, when the logical value '0' is input to the flip-flop F2, the potential level of the output terminal Q of the flip-flop F1 becomes a low level. For this reason, the reset pulse R-BC is intercepted by the AND circuit 25 and the up-down counter UD21 is not reset.

With the output voltage Vout2 of the signal level of the amplification factor A2 being input to the comparator PA through the capacitor C3, a triangular wave is applied as the reference voltage VREF and the output voltage Vout2 of the signal level of the amplification factor A2 and the reference voltage VREF are compared with each other. After the output voltage of the comparator PA is inverted by the inverter V, the output voltage is input to the output voltage Vout4 to one input terminal to one input terminal of the AND circuit N11 and the reference clock CKC passes through the AND circuit N11 and is input to the other input terminal of the AND circuit N24.

At this time, the potential level of the inverting output terminal NQ of the flip-flop F2 becomes a high level. For this reason, if the level of the switching signal SET-A is set to a high level, an output of the AND circuit N21 becomes a high level and is input to one input terminal of the AND circuit N24 through the OR circuit N23. For this reason, the reference clock CKCi passes through the AND circuit N24 and is input to the up-down counter UD21, and the up-down counter UD21 executes the up-counting operation.

The high level of the output voltage Vout4 is maintained until the output voltage Vout2 of the reference level of the amplification factor A2 is matched with the level of the reference voltage VREF, the up-down counter UD21 executes the down-counting operation until the level of the output voltage Vout4 is inverted into a low level, and the difference between the output voltage Vout2 of the signal level of the amplification factor A2 and the output voltage Vout2 of the reference level is converted into a digital value D and is transmitted to the line memory LM21. As a result, in the line memory LM21, the difference between the second signal level and the second reference level that are sampled from the signal amplified with the amplification factor A2 is held as the signal component of the amplification factor A2 detected by the digital CDS.

Next, if the level of the switching signal SET-A changes to a low level, the switching signal SET-A is inverted by the inverter V4 and the level thereof becomes a high level. The switch transistor Tsc2-1 is turned on and the amplification factor A1 of the column amplifying circuit 3a is set to A1.

At this time, since the potential level of the output terminal Q of the flip-flop F2 becomes a low level, both outputs of the AND circuits N21 and N22 become a low level, a reference clock CKCi after passing through the AND circuit N11 is intercepted by the AND circuit N24 and the up-down counter UD21 does not operate.

When the potential level of the output terminal NQ of the flip-flop F2 is a high level, the value of the gain selection signal GSEL is set to 'H' by the gain selecting unit 34 of FIG. 21. If the value of the gain selection signal GSEL is set to 'H', the switches 36 and 44 are switched to the H side and the output signal Vout11 is output as the output signal Vout8. (Case in which the Logical Value '1' is Input to the Flip-Flop F2)

After the logical value '1' is input to the flip-flop F2, the reset pulse R-BC is applied to the other input terminal of the AND circuit N25. In this case, when the logical value '1' is input to the flip-flop F2, the potential level of the output terminal Q of the flip-flop F2 becomes a high level. Therefore, the reset pulse R-BC passes through the AND circuit N25 and the up-down counter UD21 is reset.

When the level of the switching signal SET-A is set to a high level, the potential level of the inverting output terminal NQ of the flip-flop F2 becomes a low level. Therefore, both outputs of the AND circuits N21 and N22 become a low level, a reference clock CKCi after passing through the AND circuit N11 is intercepted by the AND circuit N24, and the up-down counter UD21 does not operate.

Next, when the level of the switching signal SET-A changes to a low level, the switching signal SET-A is inverted by the inverter V4 and the level thereof becomes a high level. The switch transistor Tsc2-1 is turned on and the amplification factor of the column amplifying circuit 3a is set to A1.

With the output voltage Vout2 of the signal level of the amplification factor A1 being input to the comparator PA through the capacitor C3, a triangular wave is applied as the reference voltage VREF and the output voltage Vout2 of the signal level of the amplification factor A1 and the reference voltage VREF are compared with each other. After the output voltage of the comparator PA is inverted by the inverter V, the output voltage is input as the output voltage Vout4 to one input terminal of the AND circuit N11, and the reference clock CKC passes through the AND circuit N11 and is input to the other input terminal of the AND circuit N24.

At this time, the potential level of the output terminal Q of the flip-flop F2 becomes a high level. For this reason, if the level of the switching signal SET-A is set to a low level, an output of the AND circuit N22 becomes a high level and is input to one input terminal of the AND circuit N24 through the OR circuit N23. For this reason, the reference clock CKCi passes through the AND circuit N24 and is input to the up-down counter UD21, and the up-down counter UD21 executes the up-counting operation.

The high level of the output voltage Vout4 is maintained until the output voltage Vout2 of the signal level of the amplification factor A1 is matched with the level of the reference voltage VREF, the up-down counter UD21 executes the up-counting operation until the level of the output voltage Vout4 is inverted into a low level, and the output voltage Vout2 of the signal level of the amplification factor A1 is converted into a digital value D and is transmitted to the line memory LM21. As a result, in the line memory LM21, the difference between the first signal level and the first reference level that are sampled from the signal amplified with the amplification factor A1 is held as the signal component of the amplification factor A1 detected by the analog CDS.

When the potential level of the output terminal Q of the flip-flop F2 is a high level, a value of a gain selection signal GSEL is set to 'L' by the gain selecting unit 34 of FIG. 21. If the value of the gain selection signal GSEL is set to 'L', the switches 36 and 44 are switched to the L side. After the output signal Vout11 is subtracted by the black level SB, the output signal is amplified with the amplification factor A2 and the output signal is output as the output signal Vout8.

In this case, even when the first reference level and the second reference level are sampled before the amplification factors A1 and A2 of the signals read from the pixels PCn are switched and the first signal level and the second signal level are sampled after the amplification factors A1 and A2 of the signals read from the pixels PCn are switched and the amplification factors A1 and A2 of the signals read from the pixels PCn is switched, the reference levels according to the amplification factors A1 and A2 can be cancelled and an effect of suppressing noise based on the CDS can be improved. Since the line memory LM21 does not need to be provided individually for each of the amplification factors A1 and A2, a circuit scale can be reduced.

The signal component of the signal that is amplified with the amplification factor A1 is detected by the analog CDS and the signal component of the signal that is amplified with the amplification factor A2 is detected by the digital CDS, and the up-down counter UD21 does not need to be provided individually for each of the amplification factors A1 and A2. Therefore, a circuit scale can be reduced.

Fourteenth Embodiment

Figure 24:
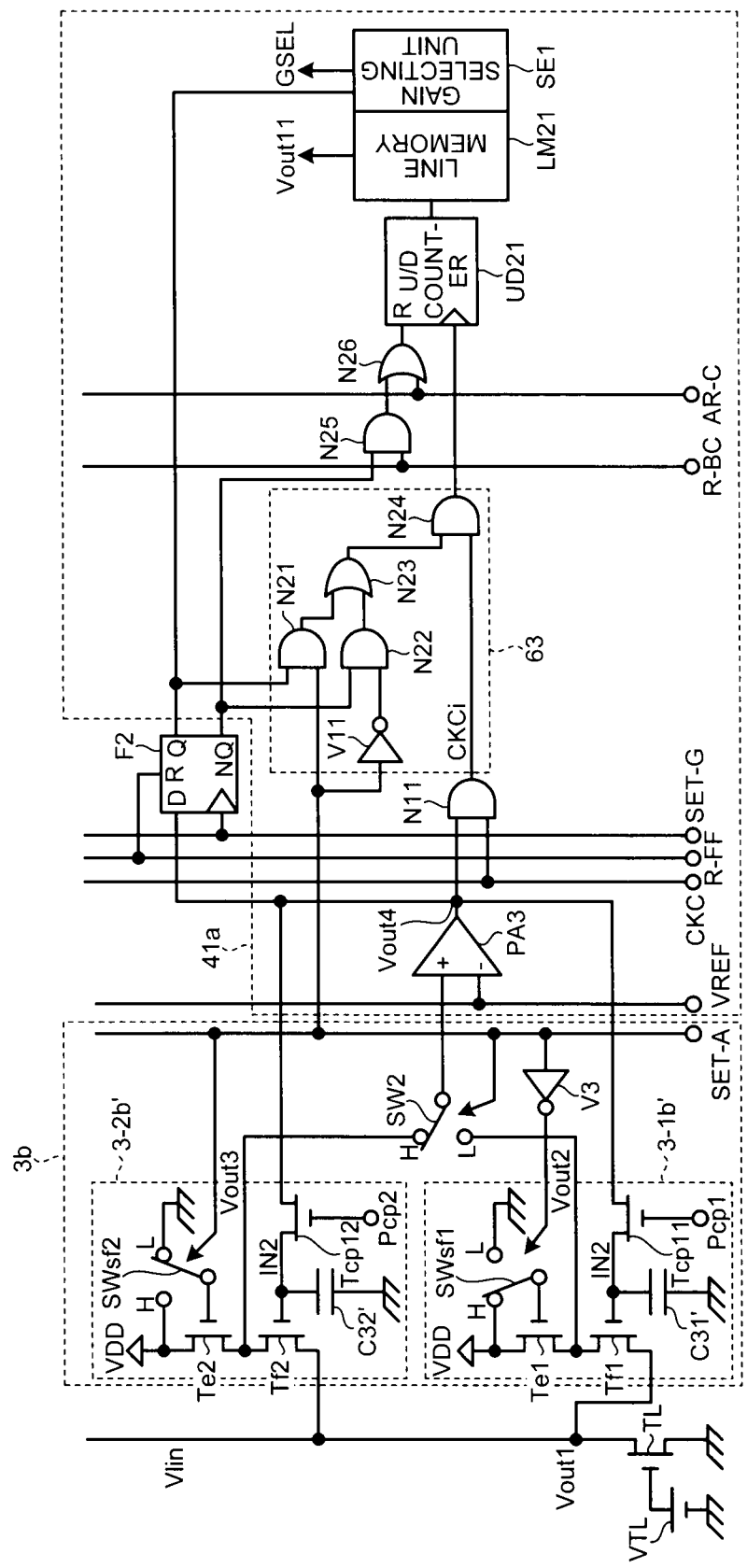
FIG. 24 is a schematic circuit diagram of the configuration of one column of a solid-state imaging device according to a fourteenth embodiment.

FIG. 24 is a circuit diagram of a schematic configuration of one column of a solid-state imaging device according to a fourteenth embodiment.

In FIG. 24, in the solid-state imaging device, the sample and hold signal converting circuit 41a of FIG. 22 is connected to the rear stage of the column amplifying circuit 3b of FIG. 10.

Figure 25:
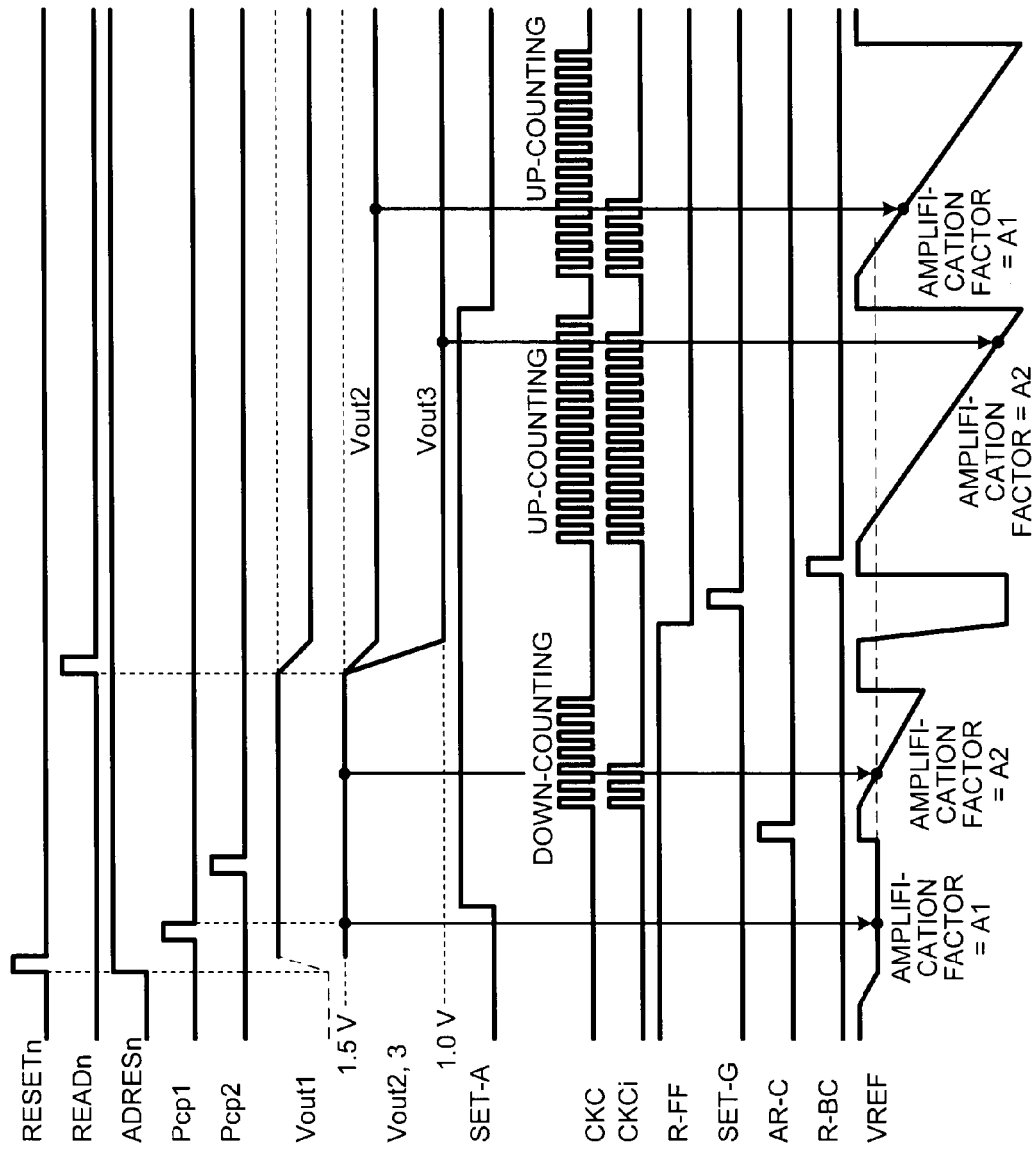
FIG. 25 is a timing chart illustrating a read operation of one pixel of the solid-state imaging device of FIG. 24.

FIG. 25 is a timing chart illustrating a read operation of one pixel of the solid-state imaging device of FIG. 24.

In FIG. 25, the operations of FIGS. 11 and 23 are combined, and the switched capacitor type amplifying circuit is not used and a differential amplifying circuit is used as the column amplifying circuit 3b.

Fifteenth Embodiment

Figure 26:
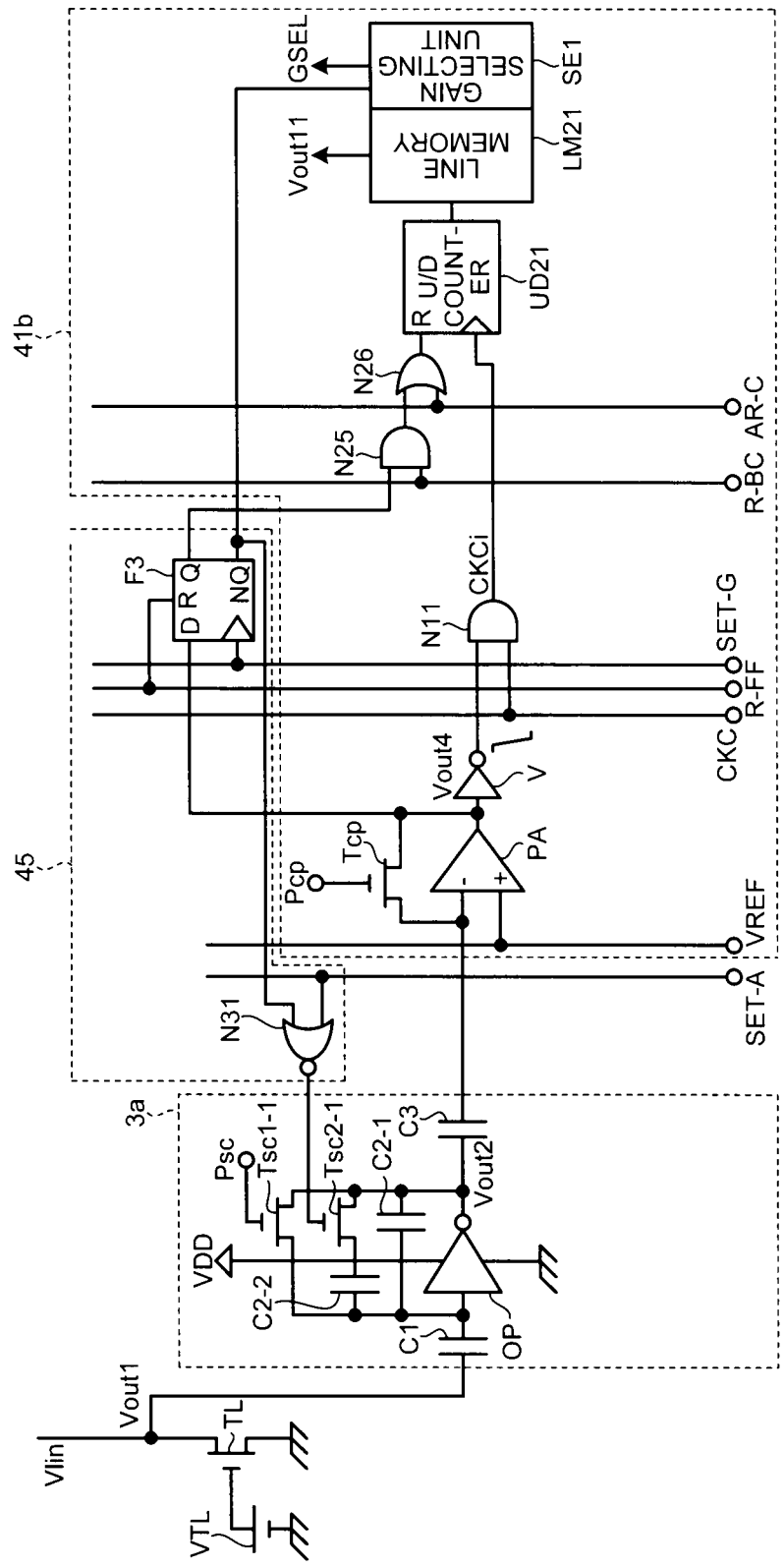
FIG. 26 is a circuit diagram of a schematic configuration of one column of a solid-state imaging device according to a fifteenth embodiment.

FIG. 26 is a circuit diagram of a schematic configuration of one column of a solid-state imaging device according to a fifteenth embodiment.

In FIG. 26, the solid-state imaging device includes a sample and hold signal converting circuit 41b and a gain switching control unit 45, instead of the sample and hold signal converting circuit 41a and the flip-flop F2 of FIG. 22.

In the sample and hold signal converting circuit 41b, the counter input intercepting circuit 63 of the sample and hold signal converting circuit 41a of FIG. 22 is omitted and the output terminal of the AND circuit N11 is connected directly to the input terminal of the up-down counter UD21 without using the counter input intercepting circuit 63.

The gain switching control unit 45 can switch the amplification factor of the signal read from each pixel PCn into A1 or A2, on the basis of the signal level of the signal read from each pixel PCn. The gain switching control unit 45 can determine the signal level of the signal that is read from each pixel PCn, on the basis of the output from the comparator PA.

In this case, in the gain switching control unit 45, a flip-flop F3 that stores values to specify the amplification factors A1 and A2 of the signals read from each pixel PCn and a NOR circuit N31 that switches the amplification factors A1 and A2 of the column amplifying circuit 3*a* on the basis of the values stored in the flip-flop F3 are provided.

The flip-flop F3 of FIG. 26 is different from the flip-flop F2 of FIG. 22 in that an inverting output terminal NQ of the flip-flop F2 is connected to the counter input intercepting circuit 63 and an inverting output terminal NQ of the flip-flop F3 is connected to one input terminal of the NOR circuit N31.

The switching signal SET-A is input to the other input terminal of the NOR circuit N31 and an output terminal of the NOR circuit N31 is connected to the gate of the switch transistor Tsc2-1.

Figure 27:
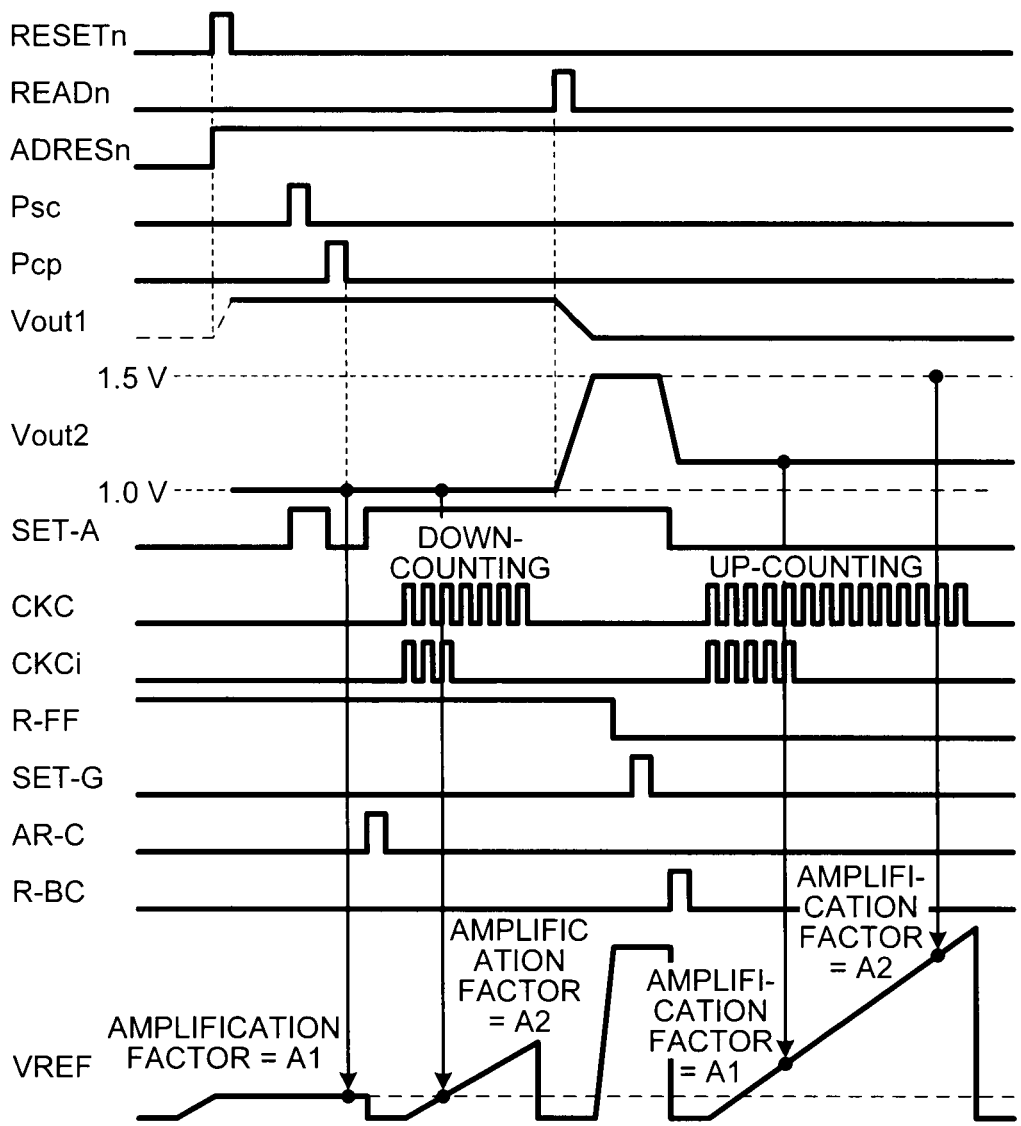
FIG. 27 is a timing chart illustrating a read operation of one pixel of the solid-state imaging device of FIG. 26.

FIG. 27 is a timing chart illustrating a read operation of one pixel of the solid-state imaging device of FIG. 26.

In FIG. 27, the solid-state imaging device is the same as the solid-state imaging device of FIG. 22 in that the output voltage Vout2 of the reference level of the amplification factor A2 is held as the second reference level of the signal amplified with the amplification factor A2 in the up-down counter UD21.

The flip-flop F3 is the same as the flip-flop F2 in that the logical value '0' or '1' is input to the flip-flop F3 according to the signal level of the signal read from each pixel PCn.

Meanwhile, in the solid-state imaging device of FIG. 22, by switching the switching signal SET-A when detecting the signal level, the up-counting operation of the signal level of the amplification factor A1 or the up-counting of the signal level of the amplification factor A2 is executed by the up-down counter UD21. In this case, when the up-counting operation of the signal level of the amplification factor A2 is executed by the up-down counter UD21, the reference clock CKCi that is generated according to the signal level of the amplification factor A2 is not input to the up-down counter UD21 by the counter input intercepting circuit 63, in order to make the up-counting operation of the signal level of the amplification factor A2 not executed by the up-down counter UD21. When the up-counting operation of the signal level of the amplification factor A2 is executed by the up-down counter UD21, the reference clock CKCi that is generated according to the signal level of the amplification factor A1 is not input to the up-down counter UD21 by the counter input intercepting circuit 63, in order to make the up-counting operation of the signal level of the amplification factor A1 not executed by the up-down counter UD21.

Meanwhile, in the solid-state imaging device of FIG. 27, the up-counting operation of the signal level of the amplification factor A1 or the up-counting operation of the signal level of the amplification factor A2 is executed by the up-down counter UD21, on the basis of the value stored in the flip-flop F3 when detecting the signal level. In this case, the amplification factors A1 and A2 of the column amplifying circuit 3*a* are switched on the basis of the value stored in the flip-flop F3 when detecting the signal level, only the comparison operation with the output voltage Vout2 of the signal level of one of the amplification factors A1 and A2 is executed by the comparator PA, and an A/D conversion operation of the signal level of each pixel PCn is executed only once. For this reason, in the solid-state imaging device of FIG. 27, the counter input intercepting circuit 63 of FIG. 22 is not needed.

In this case, the amplification factor of the signal that is read from each pixel PCn is switched to A1 or A2 on the basis of the signal level of the signal read from each pixel PCn, the A/D conversion operation of the signal level of each pixel PCn is executed only once, and a reading process of the solid-state imaging device can be executed at a high speed.

Sixteenth Embodiment

Figure 28:
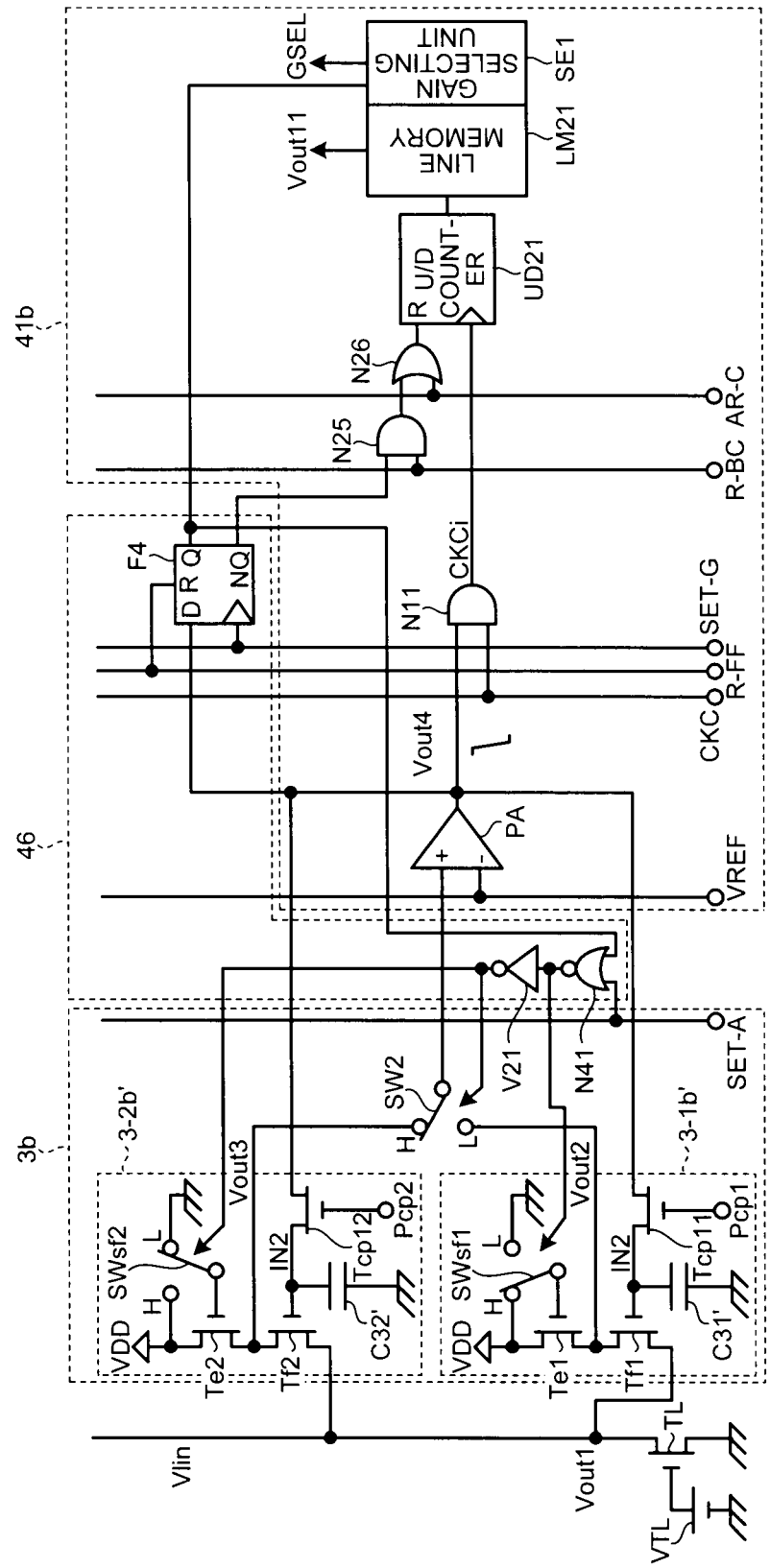
FIG. 28 is a circuit diagram of a schematic configuration of one column of a solid-state imaging device according to a sixteenth embodiment.

FIG. 28 is a circuit diagram of a schematic configuration of one column of a solid-state imaging device according to a sixteenth embodiment.

In FIG. 28, the solid-state imaging device includes a sample and hold signal converting circuit 41*b* and a gain switching control unit 46, instead of the sample and hold signal converting circuit 41*a*, the inverter V3, and the flip-flop F2 of FIG. 24.

The gain switching control unit 46 can switch the amplification factor of the signal read from each pixel PCn into A1 or A2, on the basis of the signal level of the signal read from each pixel PCn. The gain switching control unit 46 can determine the signal level of the signal that is read from each pixel PCn, on the basis of the output of the comparator PA.

In this case, in the gain switching control unit 46, a flip-flop F4 that stores values to specify the amplification factors A1 and A2 of the signals read from each pixel PCn, a NOR circuit N41 that switches the amplification factors A1 and A2 of the column amplifying circuit 3*b* on the basis of the values stored in the flip-flop F4, and an inverter V21 are provided.

The flip-flop F4 of FIG. 28 is different from the flip-flop F2 of FIG. 24 in that an output terminal Q of the flip-flop F2 is connected to the counter input intercepting circuit 63 and an output terminal Q of the flip-flop F4 is connected to one input terminal of the NOR circuit N41.

The switching signal SET-A is input to the other input terminal of the NOR circuit N41 and an output terminal of the NOR circuit N41 is connected to an input terminal of the inverter V21. The switches SW2 and SWsf2 are switched on the basis of an output of the inverter V21. The switch SWsf1 is switched on the basis of an output of the NOR circuit N41.

Figure 29:
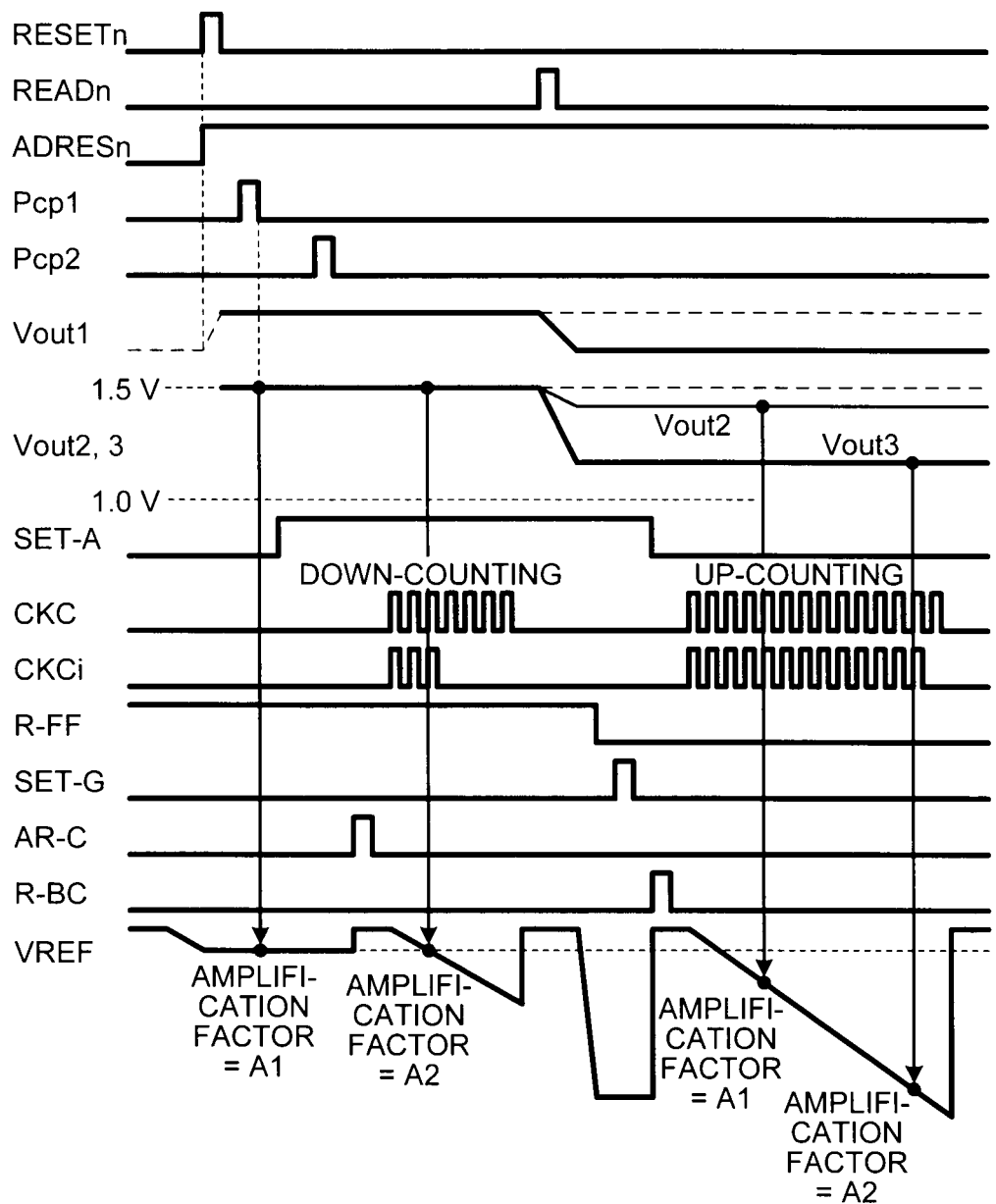
FIG. 29 is a timing chart illustrating a read operation of one pixel of the solid-state imaging device of FIG. 28.

FIG. 29 is a timing chart illustrating a read operation of one pixel of the solid-state imaging device of FIG. 28.

In FIG. 29, the solid-state imaging device is the same as the solid-state imaging device of FIG. 24 in that the output voltage Vout2 of the reference level of the amplification factor A2 is held as the second reference level of the signal amplified with the amplification factor A2 in the up-down counter UD21.

The flip-flop F4 is the same as the flip-flop F2 of FIG. 24 in that the logical value '0' or '1' is input to the flip-flop F4 according to the signal level of the signal read from each pixel PCn.

Meanwhile, in the solid-state imaging device of FIG. 24, by switching the switching signal SET-A when detecting the signal level, the up-counting operation of the signal level of the amplification factor A1 or the up-counting of the signal level of the amplification factor A2 is executed by the up-down counter UD21. In this case, when the up-counting operation of the signal level of the amplification factor A1 is executed by the up-down counter UD21, the reference clock CKCi that is generated according to the signal level of the amplification factor A2 is not input to the up-down counter UD21 by the counter input intercepting circuit 63, in order to make the up-counting operation of the signal level of the amplification factor A2 not executed by the up-down counter UD21. When the up-counting operation of the signal level of the amplification factor A2 is executed by the up-down counter UD21, the reference clock CKCi that is generated according to the signal level of the amplification factor A1 is not input to the up-down counter UD21 by the counter input intercepting circuit 63, in order to make the up-counting operation of the signal level of the amplification factor A1 not executed by the up-down counter UD21.

Meanwhile, in the solid-state imaging device of FIG. 28, the up-counting operation of the signal level of the amplification factor A1 or the up-counting operation of the signal level of the amplification factor A2 is executed by the up-down counter UD21, on the basis of the value stored in the flip-flop F4 when detecting the signal level. In this case, the amplification factors A1 and A2 of the column amplifying circuit 3b are switched on the basis of the value stored in the flip-flop F4 when detecting the signal level, only the comparison operation with the output voltage Vout2 of the signal level of one of the amplification factors A1 and A2 is executed by the comparator PA, and an A/D conversion operation of the signal level of each pixel PCn is executed only once. For this reason, in the solid-state imaging device of FIG. 28, the counter input intercepting circuit 63 of FIG. 24 is not needed.

In this case, the amplification factor of the signal that is read from each pixel PCn is switched to A1 or A2 on the basis of the signal level of the signal read from each pixel PCn, the A/D conversion operation of the signal level of each pixel PCn is executed only once, and a reading process of the solid-state imaging device can be executed at a high speed.

Seventeenth Embodiment

Figure 30:
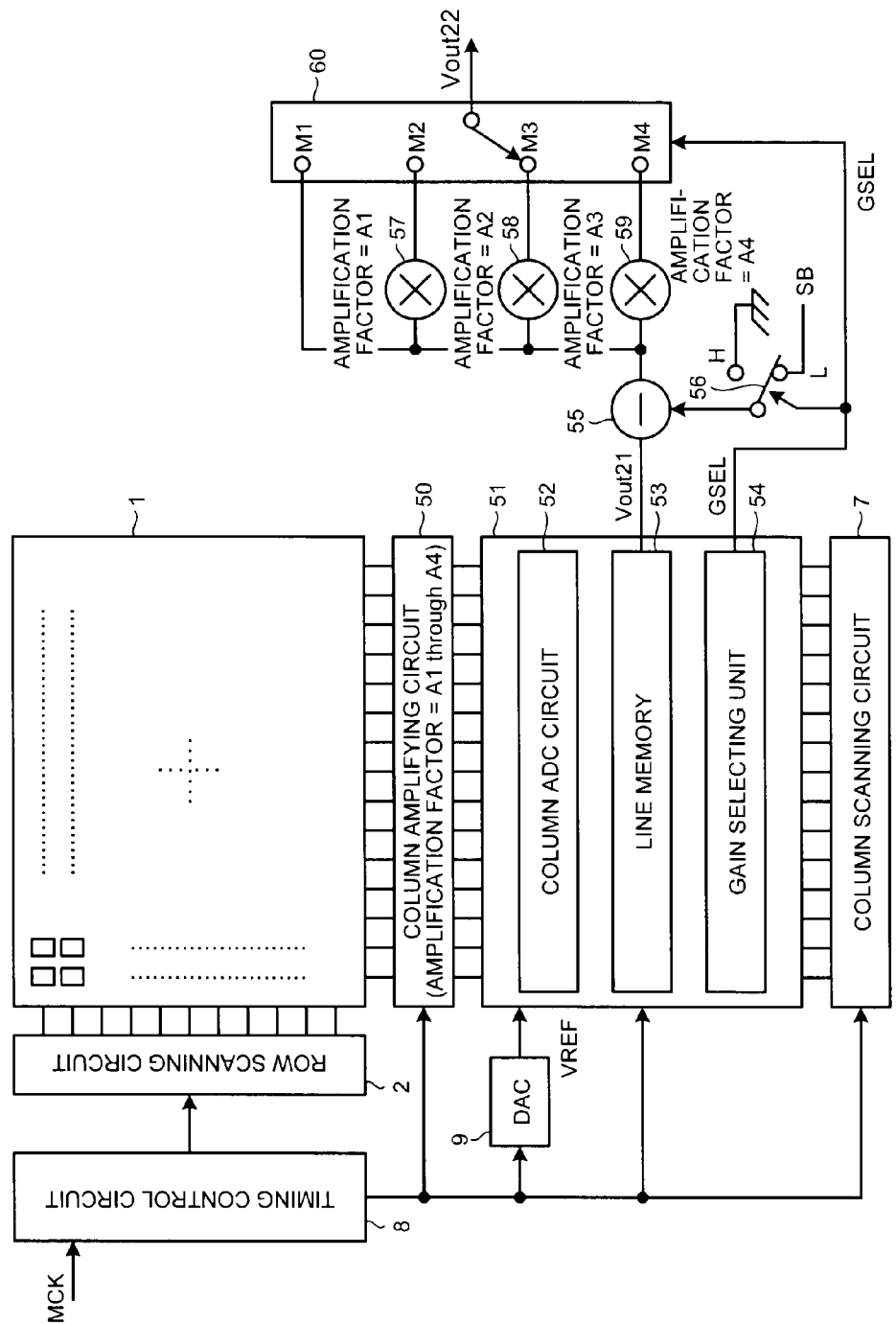
FIG. 30 is a block diagram of a schematic configuration of a solid-state imaging device according to a seventeenth embodiment.

FIG. 30 is a block diagram of a schematic configuration of a solid-state imaging device according to a seventeenth embodiment.

In FIG. 30, the solid-state imaging device includes a column amplifying circuit 50, a sample and hold signal converting circuit 51, multipliers 57 to 59, and a selector 60, instead of the column amplifying circuit 3, the sample and hold signal converting circuit 31, the multiplier 35, and the switch 36 of FIG. 16. Further, the solid-state imaging device includes a subtractor 55 that adjusts a black level with respect to a signal component of each pixel PCn and a switch 56 that supplies a black level SB to the subtractor 55 on the basis of a gain selection signal GSEL.

In this case, the column amplifying circuit 50 can switch the amplification factors A1 to A4 (A1<A2<A3<A4) of the signals read from each pixel PCn and amplify the signals for each column. In the description below, in order to simplify the description, it is assumed that A1 is 1, A2 is 2, A3 is 4, and A4 is 8.

The sample and hold signal converting circuit 51 samples first to fourth reference levels from the signals amplified with the amplification factors A1 to A4 and samples signal level from the signal amplified with any one of the amplification factors A1 to A4, on the basis of the signal level of the signal read from each pixel PC, and can detects a signal component of each pixel PC by the CDS. For example, signal components of the signals that are amplified with the amplification factors A1 and A2 can be detected by the analog CDS and signal components of the signals that are amplified with the amplification factors A3 and A4 can be detected by the digital CDS.

In the sample and hold signal converting circuit 51, a column ADC circuit 52 is provided. The column ADC circuit 52 can execute the up-counting operation on the basis of the comparison result of the signals of the signal levels amplified with the amplification factors A1 and A2 and read from the pixels PC and the reference voltage VREF and calculate the difference between the reference level and the signal level of the analog CDS. The column ADC circuit 52 can execute the up-counting operation and the down-counting operation on the basis of the comparison result of the signals of the signal levels amplified with the amplification factors A3 and A4 and read from the pixels PC and the reference voltage VREF and calculate the difference between the reference level and the signal level of the digital CDS.

In the sample and hold signal converting circuit 51, a line memory 53 that stores a count value of the column ADC circuit 52 with respect to the signal amplified with any one of the amplification factors A1 to A4 by the amount of amount of horizontal pixels and a gain selecting unit 54 that selects the amplification factor from the amplification factors A1 to A4 to amplify the signal from each pixel PC are provided.

The multipliers 57 to 59 can multiply the output signals Vout21 from the sample and hold signal converting circuit 51 with the amplification factors A2 to A4. The selector 60 can switch the output signal Vout22 to any one of the terminals M1 to M4, on the basis of the selection result obtained by the gain selecting unit 54.

When A1 is selected as the amplification factor of the signal level of the signal read from each pixel PC, the switch 56 is switched to the L side and the selector 60 is switched to the terminal M4. In the sample and hold signal converting circuit 51, the signal component is detected from the signal read from each pixel PC by the analog CDS and is output as the output voltage Vout21. The subtractor 55 subtracts the black level SB from the output signal, the multiplier 59 multiplies the output signal with the amplification factor A4, and the output signal is output as the output signal Vout22.

Meanwhile, when A2 is selected as the amplification factor of the signal level of the signal read from each pixel PC, the switch 56 is switched to the L side and the selector 60 is switched to the terminal M3. In the sample and hold signal converting circuit 51, the signal component is detected from the signal read from each pixel PC by the digital CDS and the output signal is output as the output signal Vout21. The subtractor 55 subtracts the black level SB from the output signal, the multiplier 58 multiplies the output signal with the amplification factor A3, and the output signal is output as the output signal Vout22.

Meanwhile, when A3 is selected as the amplification factor of the signal level of the signal read from each pixel PC, the switch 56 is switched to the H side and the selector 60 is switched to the terminal M2. In the sample and hold signal converting circuit 51, the signal component is detected from the signal read from each pixel PC by the digital CDS and the output signal is output as the output signal Vout21. The subtractor 58 multiplies the output signal with the amplification factor A2, and the output signal is output as the output signal Vout22.

Meanwhile, when A4 is selected as the amplification factor of the signal level of the signal read from each pixel PC, the switch 56 is switched to the H side and the selector 60 is switched to the terminal M1. In the sample and hold signal converting circuit 51, the signal component is detected from the signal read from each pixel PC by the digital CDS and the output signal Vout21 is output as the output signal Vout22.

In this case, even when the first to fourth reference levels are sampled whenever the amplification factors A1 to A4 of the signals read from the pixel PCn are switched and the signal level of any one of the amplification factors A1 to A4 is sampled according to the signal levels of the signals read from the pixels PCn and the amplification factors A1 to A4 of the signals read from the pixels PCn are switched, the reference levels according to the amplification factors A1 to A4 can be cancelled and an effect of suppressing noise based on the CDS can be improved. Since the line memory LM21 does not need to be provided individually for each of the amplification factors A1 to A4, a circuit scale can be reduced.

The signal components of the signals that are amplified with the amplification factors A1 and A2 are detected by the analog CDS and the signal components of the signals that are amplified with the amplification factors A3 and A4 are detected by the digital CDS, and the up-down counter does not need to be provided individually for each of the amplification factors A1 to A4. Therefore, a circuit scale can be reduced.

Eighteenth Embodiment

Figure 31:
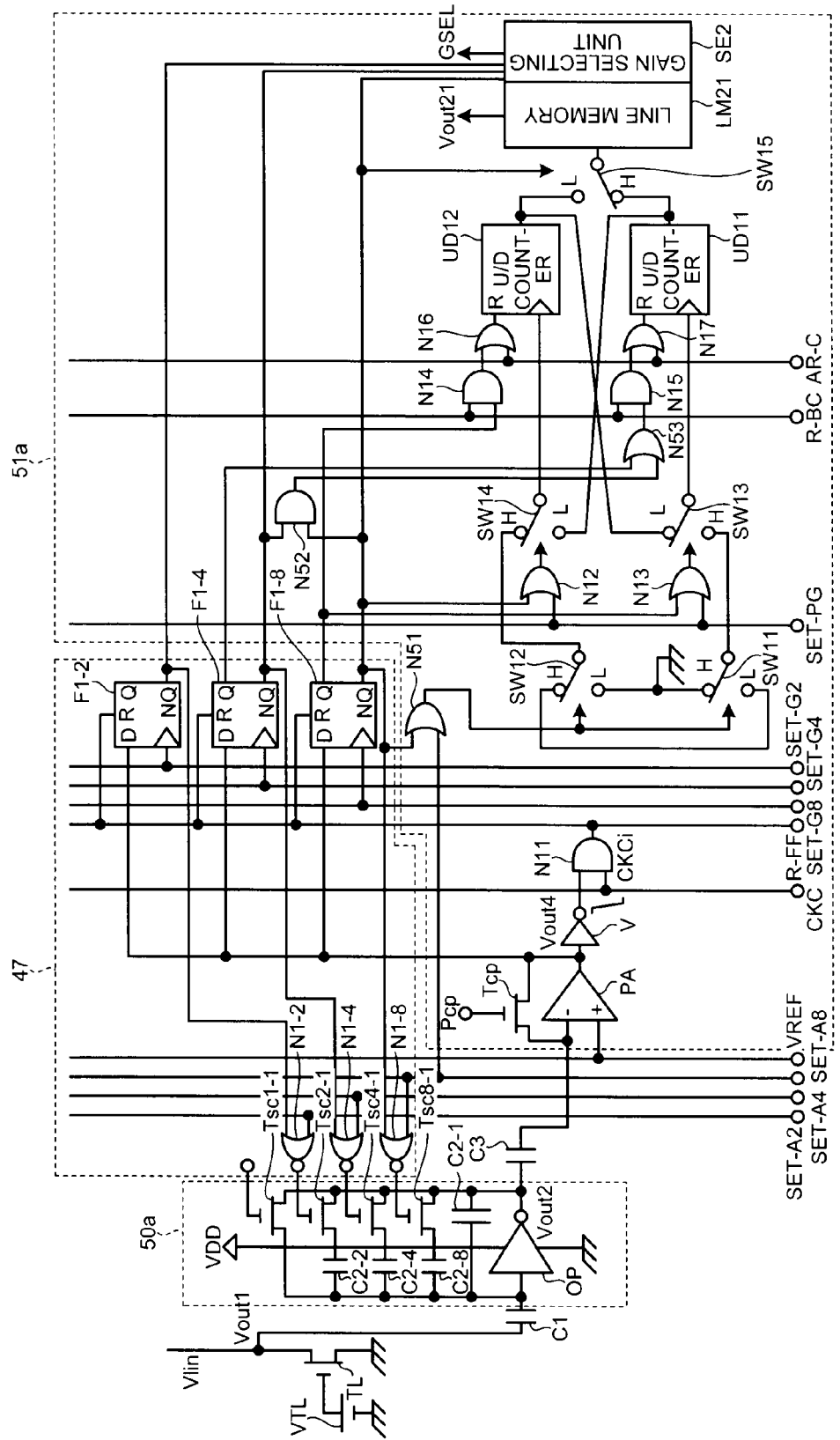
FIG. 31 is a circuit diagram of a schematic configuration of one column of a solid-state imaging device according to an eighteenth embodiment.

FIG. 31 is a circuit diagram of a schematic configuration of one column of a solid-state imaging device according to an eighteenth embodiment.

In FIG. 31, the solid-state imaging device includes a column amplifying circuit 50a, a sample and hold signal converting circuit 51a, and a gain switching control unit 47, instead of the column amplifying circuit 3a, the sample and hold signal converting circuit 41b, and the gain switching control unit 45 of FIG. 26.

The column amplifying circuit 50a can switch the amplification factors A1 to A4 of the signals read from each pixel PCn in four steps and amplify the signals for each column.

In this case, in the column amplifying circuit 50a, in order to switch the amplification factors A1 to A4 in the four steps, capacitors C2-4 and C2-8 and switch transistors Tsc4-1 and Tsc8-1 are added to the column amplifying circuit 3a of FIG. 26.

The sample and hold signal converting circuit 51a has almost the same configuration as that of the sample and hold signal converting circuit 31a of FIG. 17. However, the gain selecting unit SE1 of FIG. 17 selects the amplification factors A1 and A2 on the basis of a value stored in the flip-flop F1 and the gain selecting unit SE2 of FIG. 31 selects the amplification factors A1 to A4 on the basis of values stored in the flip-flops F1-2, F1-4, and F1-8. In the sample and hold signal converting circuit 51a, an AND circuit N52 and an OR circuit N53 are additionally provided to reset the up-down counter UD11 on the basis of the values stored in the flip-flops F1-4 and F1-8, when the reset pulse R-BC is input.

The gain switching control unit 47 can switch the amplification factors of the signals read from each pixel PCn into A1 to A4, on the basis of the signal levels of the signals read from each pixel PCn. The gain switching control unit 47 can switch the signal level of the signal read from each pixel PCn, on the basis of the output of the comparator PA.

In this case, in the gain switching control unit 47, flip-flops F1-2, F1-4, and F1-8 that stores values to specify the amplification factors A1 to A4 of the signals read from each pixel PCn and NOR circuits N1-2, N1-4, and N1-8 that switch the amplification factors A1 to A4 of the column amplifying circuit 3a on the basis of the values stored in the flip-flops F1-2, F1-4, and F1-8 are provided.

In this case, a set pulse SET-G2 is input to a set terminal of the flip-flop F1-2, a set pulse SET-G4 is input to a set terminal of the flip-flop F1-4, and a set pulse SET-G8 is input to a set terminal of the flip-flop F1-8.

An inverting output terminal NQ of the flip-flop F1-2 is connected to one input terminal of the NOR circuit N1-2, an inverting input terminal NQ of the flip-flop F1-4 is connected to one input terminal of the NOR circuit N1-4, and an inverting output terminal NQ of the flip-flop F1-8 is connected to one input terminal of the NOR circuit N1-8.

A switching signal SET-A2 is input to the other input terminal of the NOR circuit N1-2, a switching signal SET-A4 is input to the other input terminal of the NOR circuit N1-4, and a switching signal SET-A8 is input to the other input terminal of the NOR circuit N1-8.

An output terminal of the NOR circuit N1-2 is connected to a gate of the switch transistor Tsc2-1, an output terminal of the NOR circuit N1-4 is connected to a gate of the switch transistor Tsc4-1, and an output terminal of the NOR circuit N1-8 is connected to a gate of the switch transistor Tsc8-1.

Figure 32:
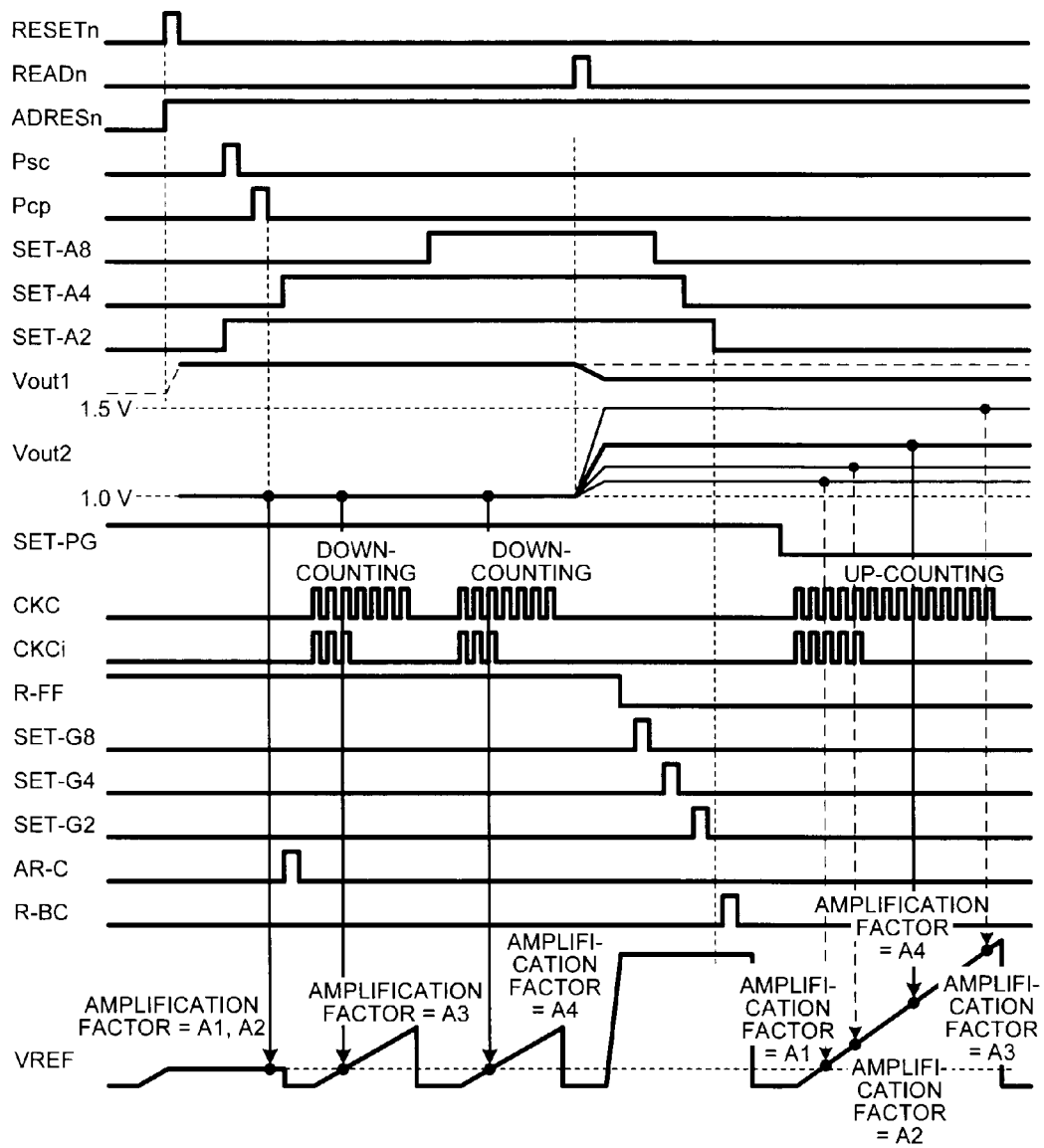
FIG. 32 is a timing chart illustrating a read operation of one pixel of the solid-state imaging device of FIG. 31.

FIG. 32 is a timing chart illustrating a read operation of one pixel of the solid-state imaging device of FIG. 31.

In FIG. 32, after the reset signal RESETn is applied, the switching signals SET-A2, SET-A4, and SET-A8 sequentially rise and the amplification factor of the column amplifying circuit 50a is switched in the order of A1→A2→A3→A4.

The reference level is sampled for each of the amplification factors A1 to A4 of the column amplifying circuit 50a, and the first reference level of the amplification factor A1, the second level of the amplification factor A2, the third reference level of the amplification factor A3, and the fourth reference level of the amplification facto A4 are held in the sample and hold signal converting circuit 51a.

In this case, in order to decrease the number of up-down counters UD11 and UD12, when the amplification factors are A1 and A2, the signal component is detected by the analog CDS, and when the first reference level of the amplification factor A1 and the second reference level of the amplification factor A2 are sampled, the up-down counters UD11 and UD12 are not operated.

Since the signal level is low when the amplification factors A3 and A4, the down-counting operation is executed by the up-down counters UD11 and UD12 when sampling the third reference level of the amplification factor A3 and the fourth reference level of the amplification factor A4, and the signal component is detected by the digital CDS.

Next, after the read signal READn is applied, the switching signals SET-A8, SET-A4, and SET-A2 sequentially fall and the amplification factor of the column amplifying circuit 50a is switched in the order of A4→A3→A2→A1.

At this time, the level of the reference level VERF is set to a level slightly lower than the saturation level of the A/D conversion. When the amplification factor of the column amplifying circuit 50a is A4, the set pulse SET-G8 is applied to the set terminal of the flip-flop F1-8. When the amplification factor of the column amplifying circuit 50a is A3, the set pulse SET-G4 is applied to the set terminal of the flip-flop F1-4. When the amplification factor A2 of the column amplifying circuit 50a is A2, the set pulse SET-G2 is applied to the set terminal of the flip-flop F1-2.

In this case, since the level of the reference level VERF is set to a level slightly lower than the saturation level of the A/D conversion, if the output voltage Vout2 of the signal level of the amplification factor A4 is saturated, the level of the output voltage of the comparator PA becomes a high level and a logical value '1' is input to the flip-flop F1-8. Meanwhile, if the output voltage Vout2 of the signal level of the amplification factor A4 is not saturated, the level of the output voltage of the comparator PA becomes a low level and a logical value '0' is input to the flip-flop F1-8.

If the output voltage Vout2 of the signal level of the amplification factor A3 is saturated, the level of the output voltage of the comparator PA becomes a high level and a logical value '1' is input to the flip-flop F1-4. Meanwhile, if the output voltage Vout2 of the signal level of the amplification factor A3 is not saturated, the level of the output voltage of the comparator PA becomes a low level and a logical value '0' is input to the flip-flop F1-4.

If the output voltage Vout2 of the signal level of the amplification factor A2 is saturated, the level of the output voltage of the comparator PA becomes a high level and a logical value '1' is input to the flip-flop F1-2. Meanwhile, if the output voltage Vout2 of the signal level of the amplification factor A2 is not saturated, the level of the output voltage of the comparator PA becomes a low level and a logical value '0' is input to the flip-flop F1-2.

When the logical value '1' is input to the flip-flops F1-2, F1-4, and F1-8, the output voltage Vout2 of the signal level of the amplification factor A2 is saturated. Therefore, the amplification factor of the signal level can be determined as A1. When the logical value '0' is input to the flip-flop F1-2, the output voltage Vout2 of the signal level of the amplification factor A3 is saturated and the output voltage Vout2 of the signal level of the amplification factor A2 is not saturated. Therefore, the amplification factor of the signal level can be determined as A2. When the logical value '0' is input to the flip-flop F1-4, the output voltage Vout2 of the signal level of the amplification factor A2 is saturated and the output voltage Vout2 of the signal level of the amplification factor A3 is not saturated. Therefore, the amplification factor of the signal level can be determined as A3. When the logical value '0 is input to the flip-flop F1-8, the output voltage Vout2 of the signal level of the amplification factor A4 is not saturated. Therefore, the amplification factor of the signal level can be determined as A4.

When the amplification factor of the signal level is determined as A1, the amplification factor of the column amplifying circuit 50a is switched to A1. When the amplification factor of the signal level is determined as A2, the amplification factor of the column amplifying circuit 50a is switched to A2. When the amplification factor of the signal level is determined as A3, the amplification factor of the column amplifying circuit 50a is switched to A3. When the amplification factor of the signal level is determined as A4, the amplification factor of the column amplifying circuit 50a is switched to A4.

If the output voltage Vout1 of the signal level is amplified with the amplification of any one of A1 to A4, the output voltage Vout2 of the signal level is generated and is input to the comparator PA. The up-down counters UD11 and UD12 execute the up-counting operation on the basis of the comparison result of the comparator PA and the signal component is detected by the CDS.

In this case, even when the amplification factors A1 to A4 of the column amplifying circuit 50a are switched on the basis of the values stored in the flip-flops F1-2, F1-4, and F1-8 when detecting the signal level and only the comparison operation with the output voltage Vout2 of the signal level of any one of the amplification factors A1 to A4 is executed by the comparator PA and the amplification factors A1 to A4 are switched in the four steps, an A/D conversion operation of the signal level of each pixel PCn can be executed only once.

In the eighteenth embodiment described above, the signal components of the signals that are amplified with the amplification factors A1 and A2 are detected by the analog CDS and the signal components of the signals that are amplified with the amplification factors A3 and A4 are detected by the digital CDS. However, the signal components of the signals that are amplified with the amplification factor A1 may be detected by the analog CDS and the signal components of the signals that are amplified with the amplification factors A2 to A4 may be detected by the digital CDS. Alternatively, the signal components of the signals that are amplified with the amplification factors A1 to A3 may be detected by the analog CDS and the signal components of the signals that are amplified with the amplification factor A4 may be detected by the digital CDS. Alternatively, the signal components of the signals that are amplified with the amplification factors A1 to A4 may be detected by the digital CDS.

In the eighteenth embodiment described above, the configuration of the solid-state imaging device of FIG. 26 where the amplification factors are switched in the two steps of A1 and A2 is changed to the configuration where the amplification factors are switched in the four steps of A1 to A4. However, the configuration of the solid-state imaging device of FIG. 28 where the amplification factors are switched in the two steps of A1 and A2 may be changed to the configuration where the amplification factors may be switched in the four steps of A1 to A4.

In the embodiments described above, the up-down counter is used in the circuit that operates the difference between the reference level and the signal level of the signal as the digital CDS processing. Alternatively, a circuit that holds the reference level and the signal level in different line memories, respectively, and operates the difference between the read output signals may be provided. Alternatively, a counter type operation processing circuit that counts the reference level by the up-down counter, inverts a count value by an inversion control signal, up counts the signal level, and uses the two's complement may be provided.

In the embodiments described above, the amplification factors are switched in the two steps of A1 and A2 or the four steps of A1 to A4. However, a method that switches the amplification factors in two or more steps may be applied.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A solid-state imaging device, comprising:
a pixel array unit in which pixels are disposed in a matrix;
a column amplifying circuit that is disposed at an end of the pixel array unit and amplifies a signal read from each pixel;
an amplification factor switching circuit that switches an amplification factor of at least a unit signal of a unit pixel to first and second amplification factors;
a comparator circuit that executes A/D conversion on the signals amplified by the column amplifying circuit;
a first up-down counter circuit that counts a digital value of a signal which is obtained by amplifying a digital signal of an output of the comparator circuit with the first amplification factor;
a second up-down counter circuit that counts a digital value of a signal which is obtained by amplifying a digital signal of an output of the comparator circuit with the second amplification factor; and
a plurality of line memories that store the digital values counted by the first up-down counter circuit and the second up-down counter circuit respectively,
wherein a plurality of signals read from the plurality of line memories are output in parallel.

2. The solid-state imaging device of claim 1, further comprising:

a synthesizing unit that synthesizes the plurality of output signals.

3. The solid-state imaging device of claim 2, wherein the synthesizing unit includes an amplifying circuit that amplifies the output signal having a small amplification factor.

* * * * *